US012061208B2

(12) United States Patent
Yamashita et al.

(10) Patent No.: US 12,061,208 B2
(45) Date of Patent: Aug. 13, 2024

(54) AUTOMATIC ANALYSIS DEVICE

(71) Applicant: HITACHI HIGH-TECH CORPORATION, Tokyo (JP)

(72) Inventors: Taichiro Yamashita, Tokyo (JP); Takenori Okusa, Tokyo (JP); Susumu Sakairi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 765 days.

(21) Appl. No.: 17/265,231

(22) PCT Filed: Jun. 21, 2019

(86) PCT No.: PCT/JP2019/024692
§ 371 (c)(1),
(2) Date: Feb. 2, 2021

(87) PCT Pub. No.: WO2020/059231
PCT Pub. Date: Mar. 26, 2020

(65) Prior Publication Data
US 2021/0349116 A1    Nov. 11, 2021

(30) Foreign Application Priority Data

Sep. 21, 2018    (JP) ................................. 2018-176761

(51) Int. Cl.
*B01L 99/00*    (2010.01)
*B01L 3/00*    (2006.01)
(Continued)

(52) U.S. Cl.
CPC ............ *G01N 35/025* (2013.01); *B01L 3/523* (2013.01); *G01N 21/13* (2013.01);
(Continued)

(58) Field of Classification Search
None
See application file for complete search history.

(56) References Cited

U.S. PATENT DOCUMENTS

2001/0028863 A1    10/2001    Kitagawa
2012/0195808 A1    8/2012    Arras et al.
(Continued)

FOREIGN PATENT DOCUMENTS

| JP | 2013-524190 A | 6/2013 |
| JP | 2017-075789 A | 4/2017 |
| WO | 2011/074472 A1 | 6/2011 |

OTHER PUBLICATIONS

International Search Report of PCT/JP2019/024692 dated Sep. 10, 2019.
(Continued)

*Primary Examiner* — Paul S Hyun
(74) *Attorney, Agent, or Firm* — MATTINGLY & MALUR, PC

(57) ABSTRACT

The automatic analysis device includes: a reagent tank that holds a reagent container that contains a reagent; and a lid opening/closing device including a lid opening/closing member configured to be movable in a first direction parallel to a vertical direction and a second direction perpendicular to the first direction. The lid opening/closing member has a first member for opening a lid of the reagent container and a second member for closing the lid. The lid opening/closing member is configured to be movable between a first position and a second position, the first position located above the reagent container and the second position located below the first position in the first direction such that the bottom surface of the lid opening/closing member comes into contact with the reagent container, and the lid opening/closing member is configured to be movable between the second (Continued)

A—A CROSS-SECTIONAL VIEW position and a third position that is away from the second position in the second direction.

11 Claims, 37 Drawing Sheets

(51) Int. Cl.
  *G01N 21/13* (2006.01)
  *G01N 35/00* (2006.01)
  *G01N 35/02* (2006.01)
  *G01N 35/10* (2006.01)
  G01N 21/01 (2006.01)
  G01N 35/04 (2006.01)

(52) U.S. Cl.
  CPC .... *G01N 35/1002* (2013.01); *B01L 2300/041* (2013.01); *G01N 2021/0112* (2013.01); *G01N 2021/0187* (2013.01); *G01N 2035/0441* (2013.01); *G01N 2035/0443* (2013.01); *G01N 2035/0444* (2013.01)

(56) References Cited

U.S. PATENT DOCUMENTS

| | | |
|---|---|---|
| 2012/0328475 A1 | 12/2012 | Sakairi et al. |
| 2013/0064735 A1 | 3/2013 | Arras et al. |
| 2018/0188275 A1 | 7/2018 | Noda et al. |

OTHER PUBLICATIONS

Extended European Search Report received in corresponding European Application No. 19863894.2 dated May 19, 2022.

A—A CROSS-SECTIONAL VIEW

B—B CROSS-SECTIONAL VIEW

C—C CROSS-SECTIONAL VIEW

D—D CROSS-SECTIONAL VIEW

D-D CROSS-SECTIONAL VIEW

D-D CROSS-SECTIONAL VIEW

D—D CROSS-SECTIONAL VIEW

D—D CROSS-SECTIONAL VIEW

D—D CROSS-SECTIONAL VIEW

D—D CROSS-SECTIONAL VIEW

D—D CROSS-SECTIONAL VIEW

D—D CROSS-SECTIONAL VIEW

SECOND POSITION

B—B CROSS-SECTIONAL VIEW

FOURTH POSITION

AUTOMATIC ANALYSIS DEVICE

TECHNICAL FIELD

The present disclosure relates to an automatic analysis device.

BACKGROUND ART

The automatic analysis device is a device that automatically analyzes a sample such as blood or urine, and performs measurement by dispensing a predetermined amount of reagent from a reagent container in a reagent cooling box and mixing it with the sample. Generally, the opening for sucking the reagent from the reagent container is provided with a lid for preventing evaporation, deterioration, liquid leakage, etc. of the reagent, and the automatic analysis device is provided with a lid opening and closing device that opens and closes the lid of the reagent container.

As an automatic analysis device provided with such a lid opening and closing device, PTL 1 discloses, "An automatic analysis device, comprising: a reagent cooling box for storing a reagent container for containing a reagent used for analysis; a reagent container opening and closing device that is provided in the reagent cooling box to open/close a lid provided in an opening arranged to protrude upward the reagent container; a reagent loader mechanism that loads and unloads the reagent container into and from the reagent cooling box, and an insertion direction limiting mechanism that is provided in a reagent container control mechanism, which sets the lid of the opening of the reagent container to be in a half-open state when the reagent container is inserted to the reagent loader mechanism and limits the insertion of the reagent container into the reagent container control mechanism in a direction other than a predetermined direction" (see claim 1).

Further, PTL 2 discloses, "An automatic analysis device for chemically analyzing a reagent, comprising: a container transport device capable of mounting a plurality of sets of reagent containers containing reagents used for sample analysis; and a reagent container lid opening and closing device that opens/closes a lid of a reagent container at a dispensing stirring position on the container transport device, wherein the reagent container lid opening and closing device includes a unit base, a hook base that is connected to the unit base, a lid opening and closing drive device that moves the hook base to the unit base in parallel with an opening and closing direction of the lid of the reagent container, a plurality of hooks provide on the hook base, and a plurality of hook drive devices that individually swing these hooks with respect to the hook base and engages/disengages the corresponding hook with respect to the lid of each reagent container" (see claim 1).

CITATION LIST

Patent Literature

PTL 1: JP 2017-075789 A
PTL 2: WO 2011/074472

SUMMARY OF INVENTION

Technical Problem

However, the reagent container lid opening and closing device disclosed in PTL 1 requires a space for the entire reagent container to move horizontally when the reagent container is inserted or discharged with respect to the reagent loader mechanism, so there is a limit to the miniaturization of the reagent container lid opening and closing device.

Further, in PTL 2, since the lid opening and closing drive device for moving the hook base in parallel with the opening and closing direction of the lid and the plurality of hook drive devices are provided, the lid of each reagent container can be opened/closed individually, but the structure is complicated and it is difficult to miniaturize.

Therefore, the present disclosure provides an automatic analysis device having a simple structure and capable of miniaturization.

Solution to Problem

An automatic analysis device of the present disclosure includes: a reagent storage chamber that stores a reagent container containing a reagent; and a lid opening and closing device that includes a lid opening and closing member configured to be movable in a first direction parallel to a vertical direction and to be movable in a second direction perpendicular to the first direction. The lid opening and closing member includes a first member and a second member that are integrated with each other, the first member opening a lid of the reagent container, and the second member closing the lid. The lid opening and closing member is configured to be movable between a first position and a second position, the first position being a position above the reagent container, the second position being a position that is moved down from the first position in the first direction until a bottom surface of the lid opening and closing member comes into contact with the reagent container. The lid opening and closing member is configured to be movable between the second position and a third position being a position that is moved from the second position in the second direction. In a case where the lid opening and closing member moves from the second position to the third position, the lid is opened by the first member. In a case where the lid opening and closing member moves from the third position to the second position, the lid is closed by the second member.

Other features of the disclosure will be clear from the description and the accompanying drawings. In addition, embodiments of the disclosure are achieved and realized by elements, combinations of various elements, the following detailed description, and the attached claims.

It is necessary to understand that the description of this specification is given only as a typical example, and does not limit the scope of claims or applications of the disclosure.

Advantageous Effects of Invention

According to the present disclosure, it is possible to provide an automatic analysis device having a simple structure and capable of miniaturization. Objects, configurations, and effects besides the above description will be apparent through the explanation on the following embodiments.

BRIEF DESCRIPTION OF DRAWINGS

FIG. 17 shows diagrams illustrating a configuration of the lid opening and closing cam member, in which FIG. 17(a) is a top view, FIG. 17(b) is a diagram shown in an A arrow direction of FIG. 17(a), FIG. 17(c) is a D-D cross-sectional view of FIG. 17(a), FIG. 17(d) is a diagram shown in a B arrow direction of FIG. 17(a), and FIG. 17(e) is a bottom view.

DESCRIPTION OF EMBODIMENTS

Hereinafter, embodiments of the present disclosure will be described with reference to the drawings.

First Embodiment

In the following, a Z axis is taken in the vertical direction (first direction), an X axis is taken in the direction orthogonal to the Z axis and parallel to the longitudinal direction of a lid opening and closing device 22 of an automatic analysis device 1 (second direction), and a Y axis is taken in the direction orthogonal to the X axis (third direction). In addition, the positive and negative sides of the X axis are "right" and "left", respectively, the positive and negative sides of the Y axis are "rear" and "front", respectively, and the positive and negative sides of the Z axis are "upper" and "lower", respectively.

Figure 1:
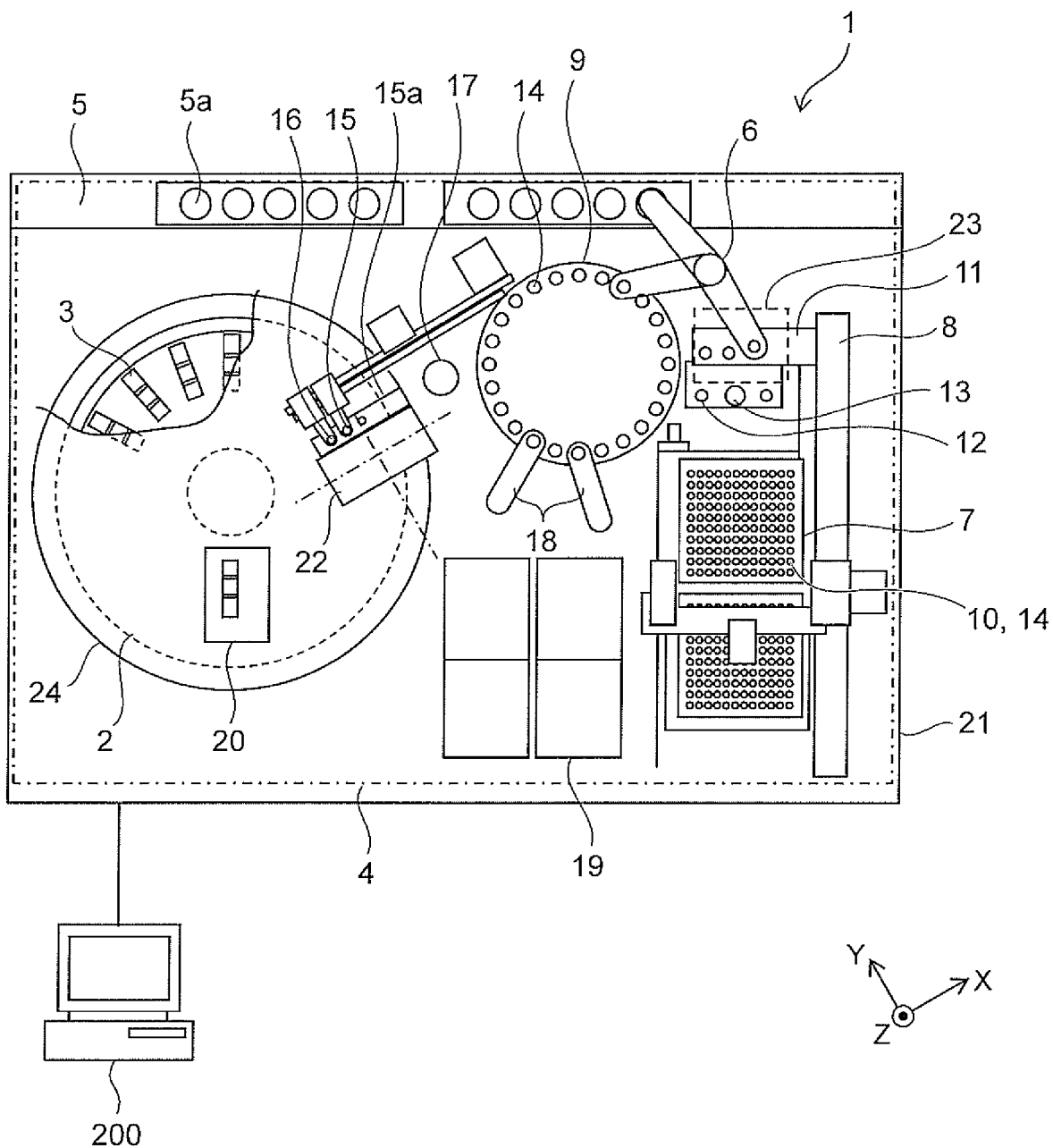
FIG. 1 is a plan view illustrating an automatic analysis device according to a first embodiment.
Figure 2:
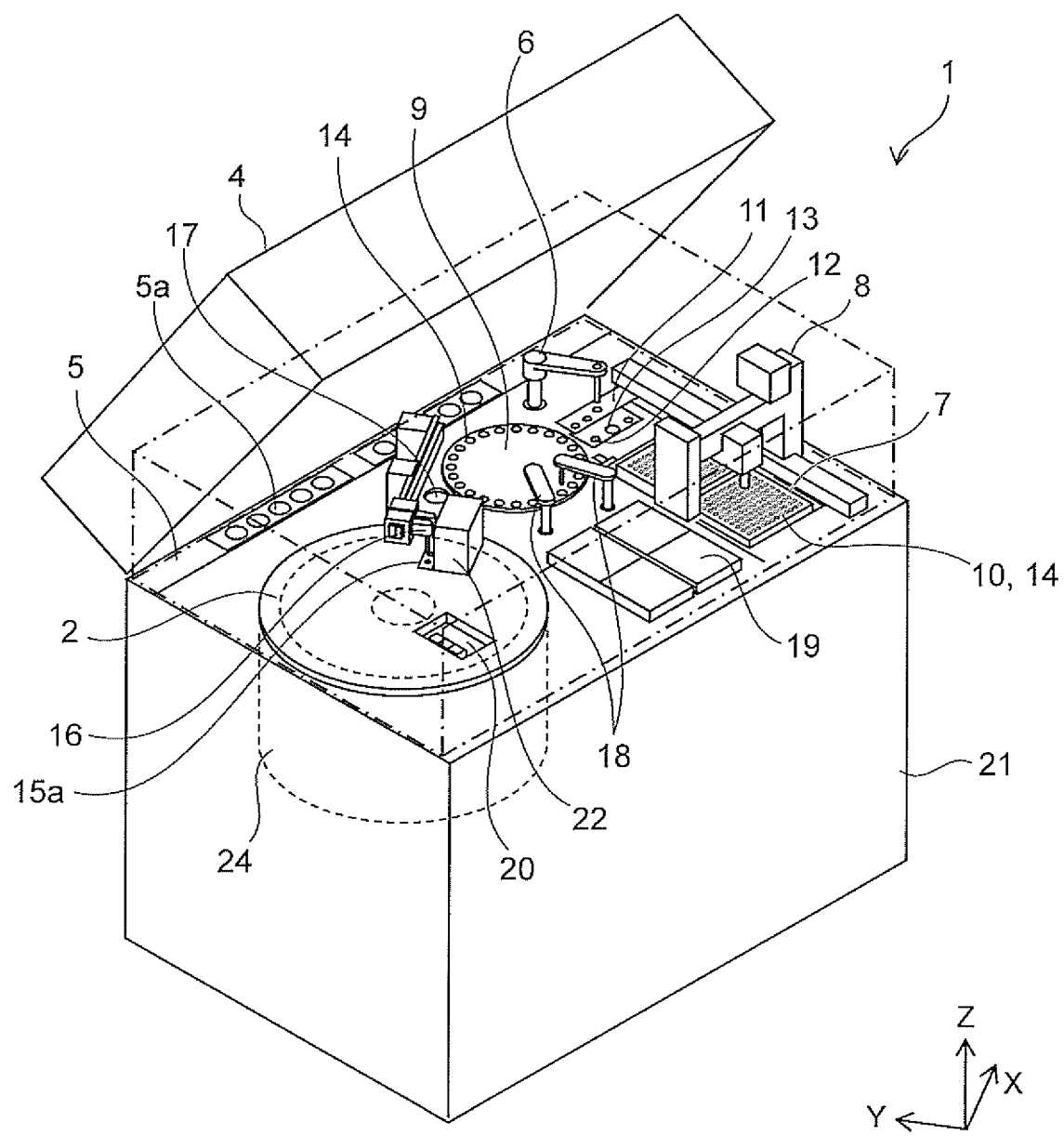
FIG. 2 is a perspective view illustrating the automatic analysis device according to the first embodiment.

The overall configuration of the automatic analysis device 1 according to the first embodiment will be described with reference to FIGS. 1 and 2. FIG. 1 is a plan view illustrating the automatic analysis device 1 according to the first embodiment. FIG. 2 is a perspective view illustrating the automatic analysis device 1 according to the first embodiment.

As shown in FIGS. 1 and 2, the automatic analysis device 1 includes a reagent disk 2, a safety cover 4, a sample transport unit 5, a sample dispensing unit 6, a chip rack 7, a transport unit 8, an incubator 9, a sample dispensing chip buffer 11, a waste hole 12, a stirring unit 13, a reagent dispensing probe 15, a stirring unit 16, a cleaning unit 17, a reaction solution dispensing probe 18, a detecting portion 19, a housing 21, a lid opening and closing device 22, a waste box 23, and a reagent cooling box 24 (reagent storage).

The housing 21 has a substantially rectangular parallelepiped shape, and contains the sample transport unit 5, the cleaning unit 17, the waste box 23, the reagent cooling box 24, a substrate and a flow path (not shown), and the like.

The safety cover 4 is supported on one side of the upper surface of the housing 21 by, for example, a hinge, and is configured to be openable and closable around the hinge. The chain line in FIGS. 1 and 2 shows the state in which the safety cover 4 is closed. The safety cover 4 is provided with an interlock such as a solenoid, and holds the safety cover 4 closed by energizing the solenoid while the automatic analysis device 1 is in operation. While the automatic analysis device 1 is stopped, the solenoid is de-energized and the safety cover 4 can be opened.

The sample transport unit 5 is configured by, for example, a belt conveyor, a rack handler, or the like, moves a sample 5a in the automatic analysis device 1, and transports the sample 5a to the range of motion of the sample dispensing unit 6.

The chip rack 7 is configured to be detachable from the automatic analysis device 1, and is arranged on the upper surface of the automatic analysis device 1 by an operator with a plurality of sample dispensing chips 10 and a plurality of reaction vessels 14 placed therein.

The transport unit 8 is configured to be movable in the plane direction and the Z-axis direction, and is configured to be movable above the chip rack 7, a part of the incubator 9, the sample dispensing chip buffer 11, the waste hole 12, and the stirring unit 13. As the transport unit 8, for example, a three-axis robot or the like can be used. The transport unit 8 grips the reaction vessels 14 one by one from the chip rack 7 and moves them to the incubator 9. Further, the transport unit 8 grips the sample dispensing chips 10 one by one from the chip rack 7 and moves them to the sample dispensing chip buffer 11.

The sample dispensing chip buffer 11 is a buffer on which the sample dispensing chip 10 held by the transport unit 8 is temporarily placed. The sample dispensing chip buffer 11 is configured so that a plurality of sample dispensing chips 10 can be placed.

The incubator 9 has a substantially disk shape and is configured to be rotatable. The incubator 9 holds a plurality of reaction vessels 14 along the circumferential direction, and each reaction vessel 14 can be moved to a predetermined position by the rotation of the incubator 9.

The sample dispensing unit 6 moves to the upper part of the sample dispensing chip buffer 11, grips any one of the sample dispensing chips 10, moves to the upper part of the sample 5a, and absorbs the sample 5a inside the sample dispensing chip 10. Then, the sample 5a moves to the upper part of the reaction vessel 14 on the incubator 9, and is discharged from the inside of the sample dispensing chip 10 into the reaction vessel 14. After that, the sample dispensing unit 6 moves to the upper part of the waste hole 12 and drops the sample dispensing chip 10 into the inside of the waste hole 12.

The waste box 23 is arranged below the waste hole 12 and stores the discarded sample dispensing chips 10 and the reaction vessel 14. When the waste box 23 is full, the operator can pull out the waste box 23 and discard the contents.

The reagent cooling box 24 has a substantially cylindrical shape and contains the reagent disk 2. A reagent container loading port 20 for attaching/detaching a reagent container 3 to/from the reagent disk 2 is provided on the upper surface of the reagent cooling box 24. Further, the reagent container loading port 20 is provided with an openable and closable reagent container loading port lid (not shown), and an interlock using a solenoid or the like is provided. The reagent cooling box 24 has a heat insulating function in order to control the reagent container 3 to a constant temperature.

The reagent disk 2 forms a slot for holding a plurality of reagent containers 3 radially along the circumferential direction. The reagent disk 2 is configured to be rotatable around a central axis extending in the Z-axis direction, and by rotating the reagent disk 2, each reagent container 3 is moved to a predetermined position. For example, by rotating the reagent disk 2, the reagent container 3 containing a target reagent can be moved to the reagent dispensing position 15a.

The configuration of the reagent container 3 will be described later. The reagent container 3 may contain magnetic particles for stirring the reagent.

The lid opening and closing device 22 is arranged above the reagent cooling box 24 along the longitudinal direction of the reagent dispensing position 15a. The lid opening and closing device 22 is configured to be able to open/close a lid 25 of the reagent container 3 located at the reagent dispensing position 15a. The details of the lid opening and closing device 22 will be described later.

The reagent dispensing probe 15 is configured to be movable in the XY axis direction (horizontal direction) by, for example, an actuator. In the reagent dispensing probe 15, a predetermined amount of reagent is absorbed from the reagent container 3 by a reagent dispensing pipette (not shown) after the lid 25 of the reagent container 3 located at the reagent dispensing position 15a is opened by the lid opening and closing device 22, and is dispensed into the reaction vessel 14 held in the incubator 9. After that, the lid opening and closing device 22 closes the lid 25.

The stirring unit 16 is provided above the reagent dispensing position 15a and includes a magnetic particle stirring arm that is rotatable around a central axis extending in the Z-axis direction. At the lower end portion of the magnetic particle stirring arm, for example, a paddle-shaped or spiral magnetic particle stirring unit is provided. The magnetic particle stirring arm stirs the reagent by lowering and rotating the magnetic particle stirring unit in the reagent containing the magnetic particles. To prevent precipitation of magnetic particles in the reagent, the magnetic particle stirring arm stirs the reagent just before the reagent is dispensed by the reagent dispensing probe 15. After stirring, the magnetic particle stirring arm moves to the cleaning unit 17 containing the cleaning liquid, and the magnetic particle stirring unit is rotated for cleaning.

The reaction vessel 14 into which the predetermined reagent and the sample 5a are dispensed is controlled to a predetermined temperature by the incubator 9, and the reaction is promoted for a predetermined time. The reagent and the reaction solution of sample 5a are supplied from the reaction vessel 14 to the detecting portion 19 by the reaction solution dispensing probe 18, and the physical properties thereof are detected by the detecting portion 19.

Examples of the physical properties include, but are not limited to, the amount of light emitted, the amount of scattered light, the amount of transmitted light, the current value, and the voltage value. The detecting portion 19 may perform analysis while holding the reaction solution in the reaction vessel 14.

The reaction vessel 14 containing the reaction solution for which the analysis by the detecting portion 19 has been completed is moved to the upper part of the waste hole 12 by the transport unit 8 and is discarded in the waste hole 12. Depending on the type of measurement, one reaction vessel 14 may be used for a plurality of times of measurements. In that case, the reaction vessel 14 is washed after discarding the reaction solution in the reaction vessel 14 for which the analysis has been completed.

As shown in FIG. 1, a host computer 200 is connected to the automatic analysis device 1, and a series of operations of the above configuration of the automatic analysis device 1 is controlled by the host computer 200.

Figure 3:
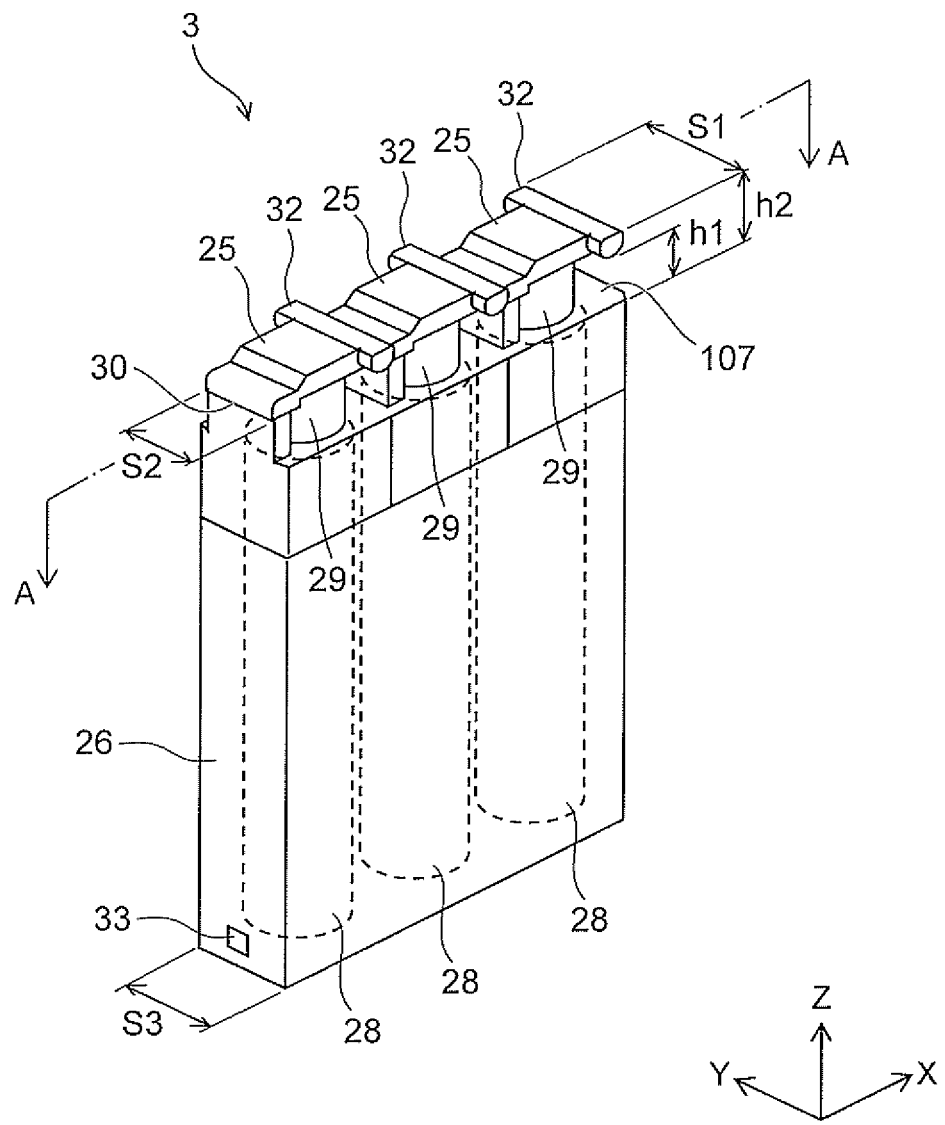
FIG. 3 is a perspective view illustrating a configuration of a reagent container.

FIG. 3 is a perspective view illustrating the configuration of the reagent container 3. As shown in FIG. 3, the reagent container 3 includes a lid 25, a reagent container case 26, and a container 28. The reagent container case 26 has a substantially rectangular parallelepiped outer shape, and has a maximum length in the Z-axis direction and a minimum length in the Y-axis direction. The length of the reagent container case 26 in the Y-axis direction is set to S3.

A cylindrical opening portion 29 and the lid 25 corresponding to the opening portion 29 are provided on the upper surface of each container 28. The length of the lid 25 in the Y-axis direction is set to S2. The left end (first side) of the lid 25 in the X-axis direction is a hinge 30, and the lid 25 is configured to be openable and closable around the hinge 30. At the right end (second side) of the lid 25 in the X-axis direction, a lid tip protrusion 32 (protrusion portion) having a length in the Y-axis direction of S1 (S1>S2) is provided.

Figure 4:
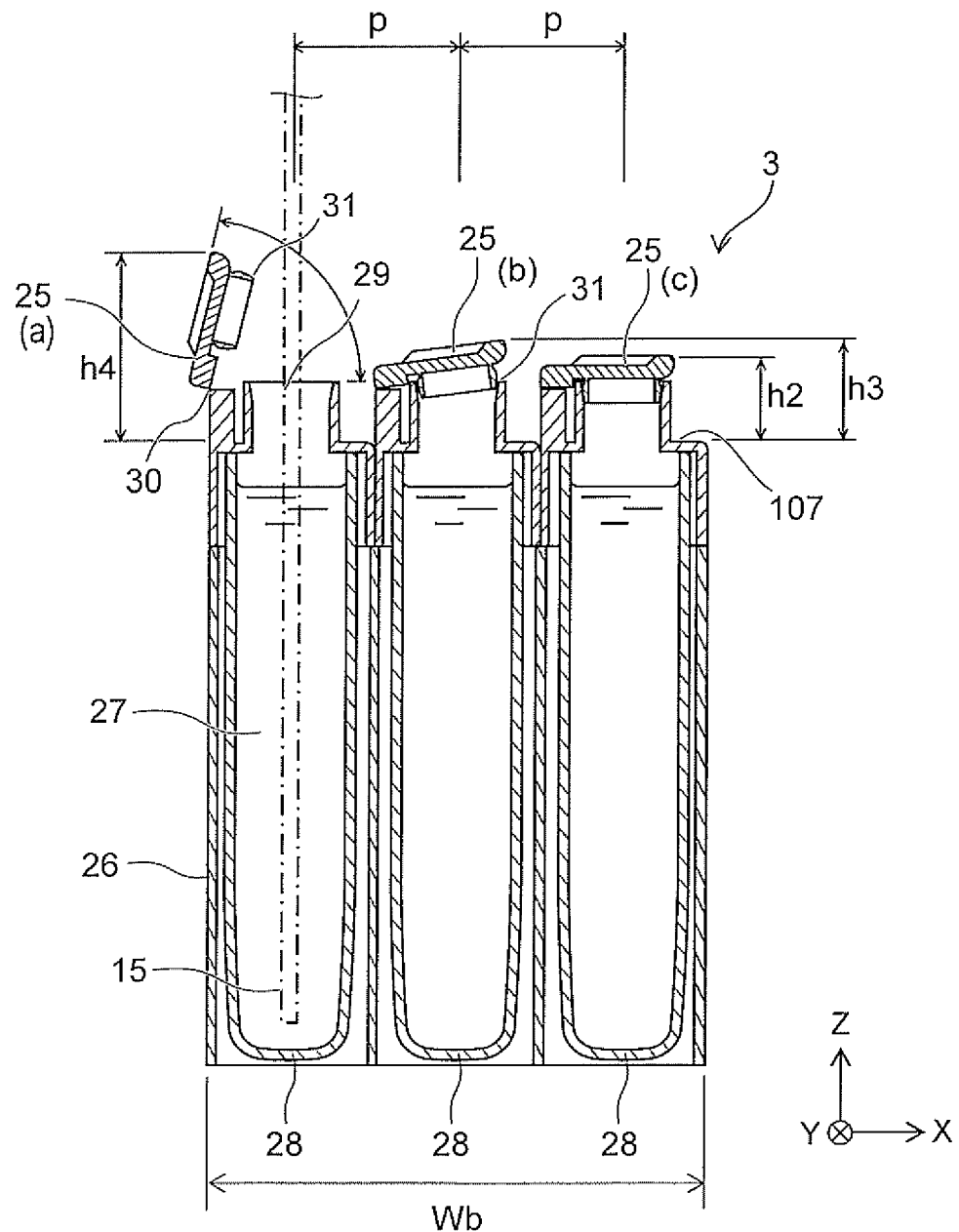
FIG. 4 is an A-A cross-sectional view of FIG. 3.

As shown in FIG. 3, the reagent container 3 may be provided with an information description unit such as an RFID tag 33 that describes the type of reagent, and when the reagent container 3 is set on the reagent disk 2, the type of the reagent in the reagent container 3 may be discriminated by an information identification unit such as the RFID tag reader 34 (not shown in FIGS. 3 and 4). When the reagent container 3 is correctly set in the reagent disk 2, the RFID tag reader 34 reads the information of the RFID tag 33 and transmits the information to the host computer 200, and the host computer 200 registers the reagent type in the system.

FIG. 4 is a cross-sectional view taken along line A-A of FIG. 3, showing a fully open state (a), a half-open state (b), and a fully closed state (c) of the lid 25. As shown in FIG. 4, the container 28 stores the reagent solution 27, and three of them are stored inside the reagent container case 26 at equal intervals along the X-axis direction at a pitch p. The container 28 may be detachable from the reagent container case 26. Since the three containers 28 are provided close to each other, the length Wb of the reagent container 3 in the X-axis direction is approximately equal to (3×p). A substantially disk-shaped sealing portion 31 is provided in the lower surface of the lid 25, and when the lid 25 is closed, the sealing portion 31 meshes with the inner peripheral portion of the opening portion 29 to seal the opening portion 29.

In the fully open state (a) of the lid 25, the lid 25 is rotated around the hinge 30 and is at a fully open angle, for example, a position that is 75° or more open from the horizontal. At this time, the maximum height of the lid tip protrusion 32 is h4 from the upper surface 107 of the reagent container case 26. In the fully open state, the opening portion 29 is open, and the reagent dispensing probe 15 is lowered into the container 28 so that the reagent solution 27 can be sucked.

The half-open state (b) of the lid 25 is a closed state in which the once opened lid 25 is lightly pushed into the opening portion 29, and the outer circumference of the sealing portion 31 is in contact with the inner circumference of the opening portion 29. At this time, the maximum height of the lid tip protrusion 32 is h3 from the upper surface 107 of the reagent container case 26. Evaporation of the reagent solution 27 can be prevented in the half-open state. The lid 25 can be opened with a weak force from the half-open state.

In the fully closed state (c) of the lid 25, the sealing portion 31 is pushed all the way into the opening portion 29, and the lid 25 is completely closed. In the fully closed state, the maximum height of the lid tip protrusion 32 is h2 from the upper surface 107 of the reagent container case 26, and the height of the lower surface of the lid tip protrusion 32 is h1 (h4>h3>h2>h1).

In the unused reagent container 3, all the lids 25 are in the fully closed state, and each container 28 is sealed. When opening the lid 25 from the fully closed state, since the sealing portion 31 is in a state of being completely fitted to the opening portion 29, a strong opening force is required, and the sealing portion 31 is separated from the opening portion 29, and then the lid 25 rotates around the hinge 30 with a weak force.

Next, the configuration of the lid opening and closing device 22 will be described with reference to FIGS. 5 to 10.

Figure 5:
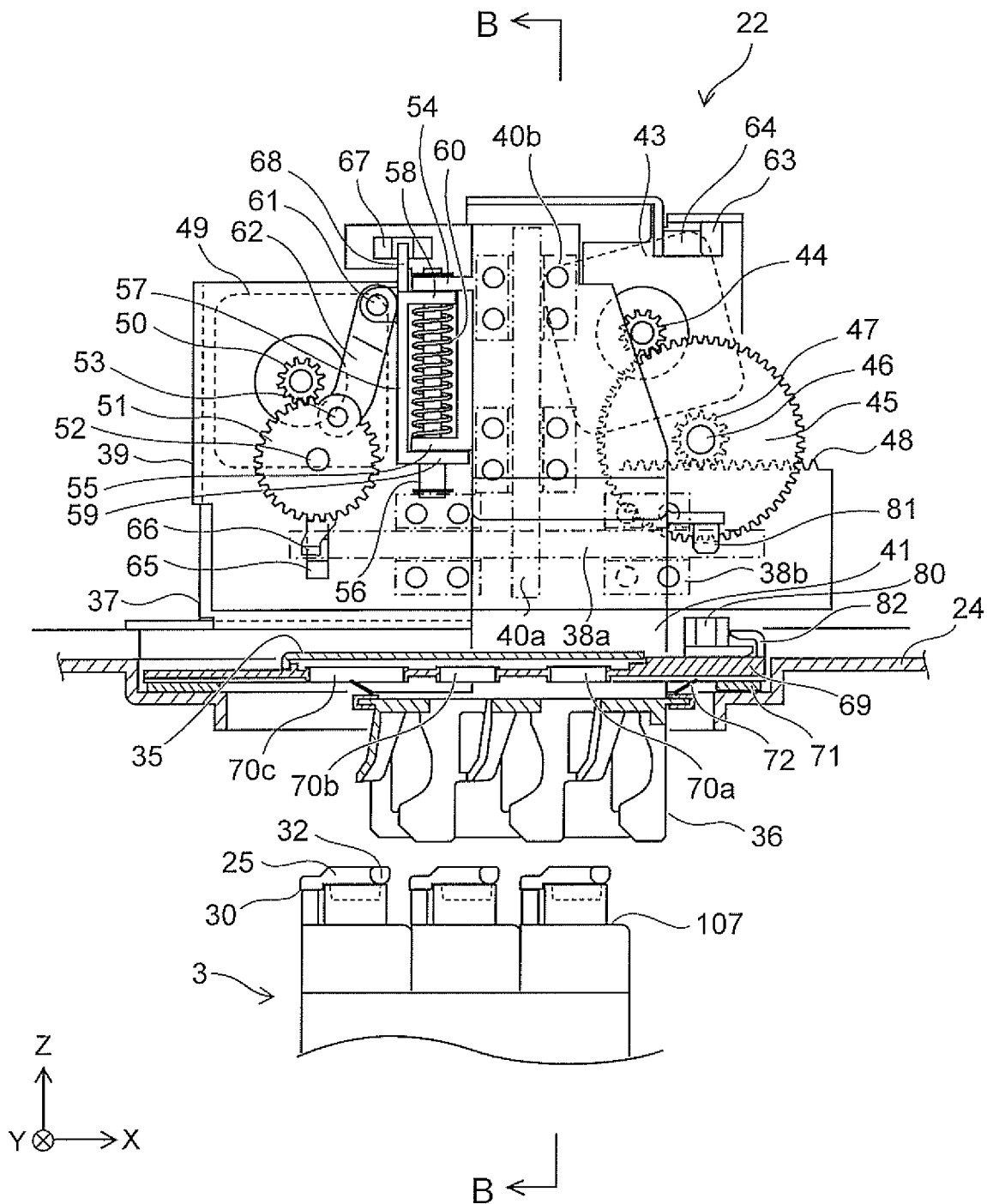
FIG. 5 is a front view illustrating a lid opening and closing device in which a lid opening and closing cam member is positioned at a first position.
Figure 6:
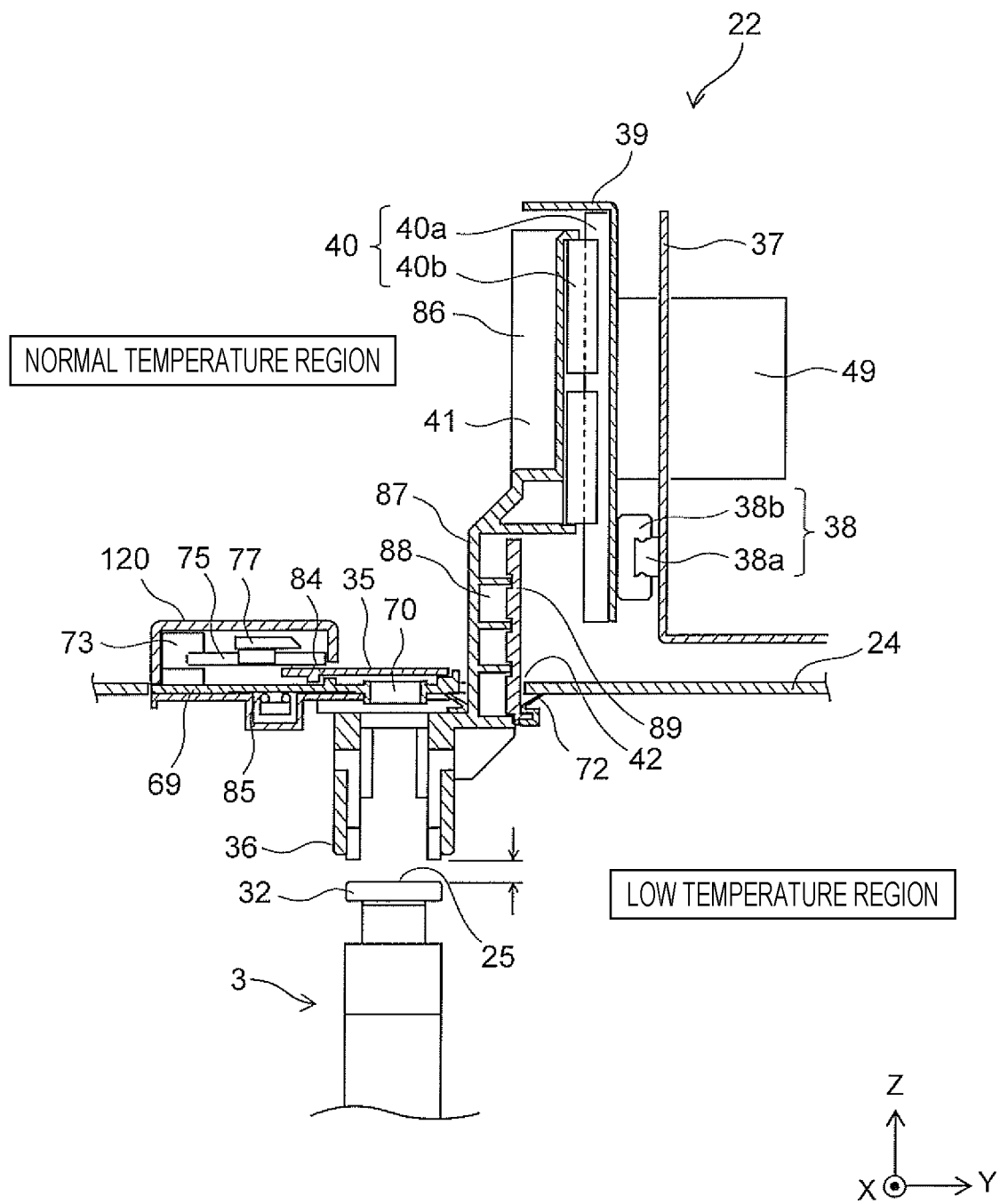
FIG. 6 is a B-B cross-sectional view of FIG. 5 in which the lid opening and closing cam member is positioned at the first position.
Figure 7:
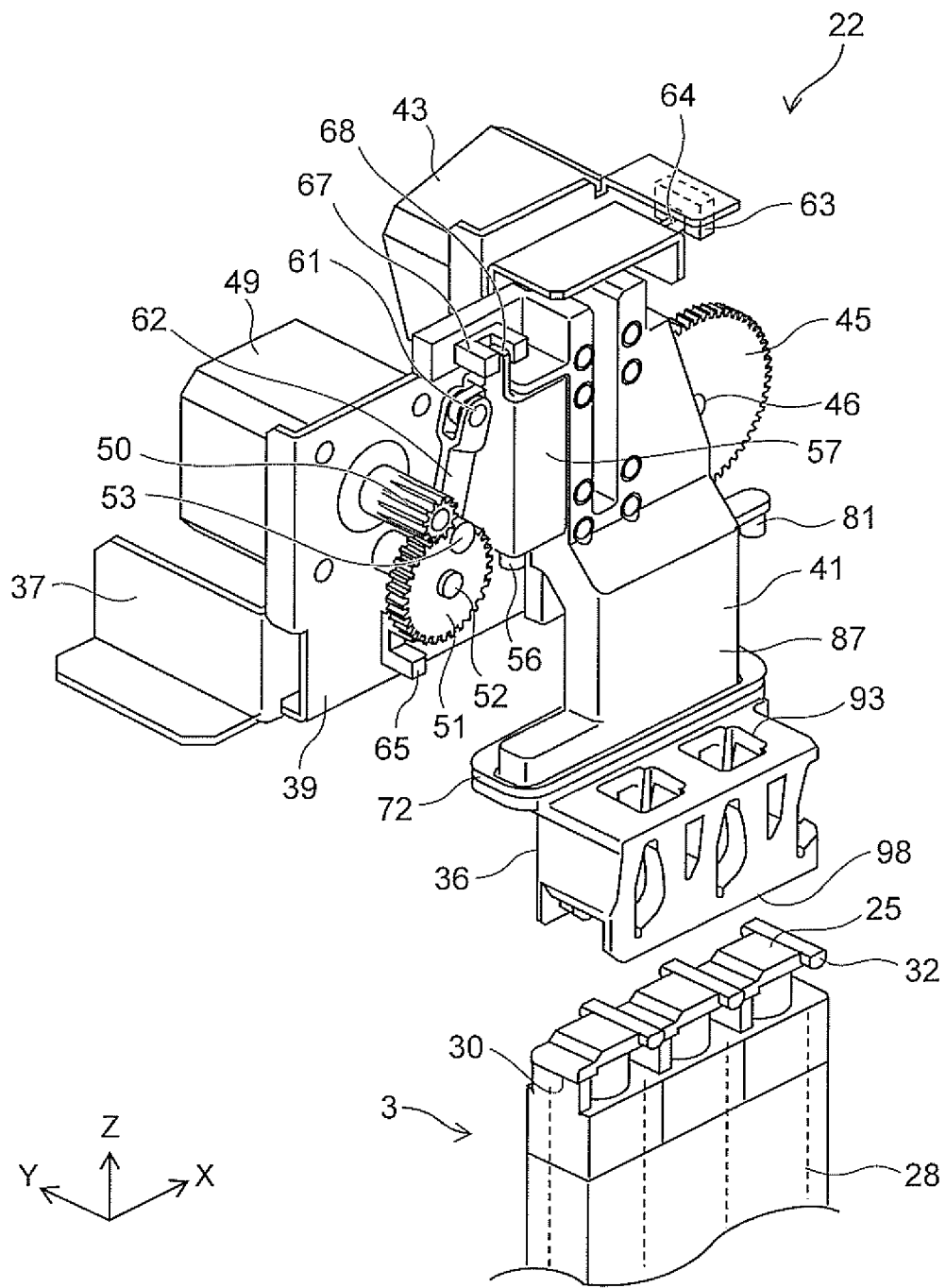
FIG. 7 is a perspective view illustrating the lid opening and closing device in which the lid opening and closing cam member is positioned at the first position.
Figure 8:
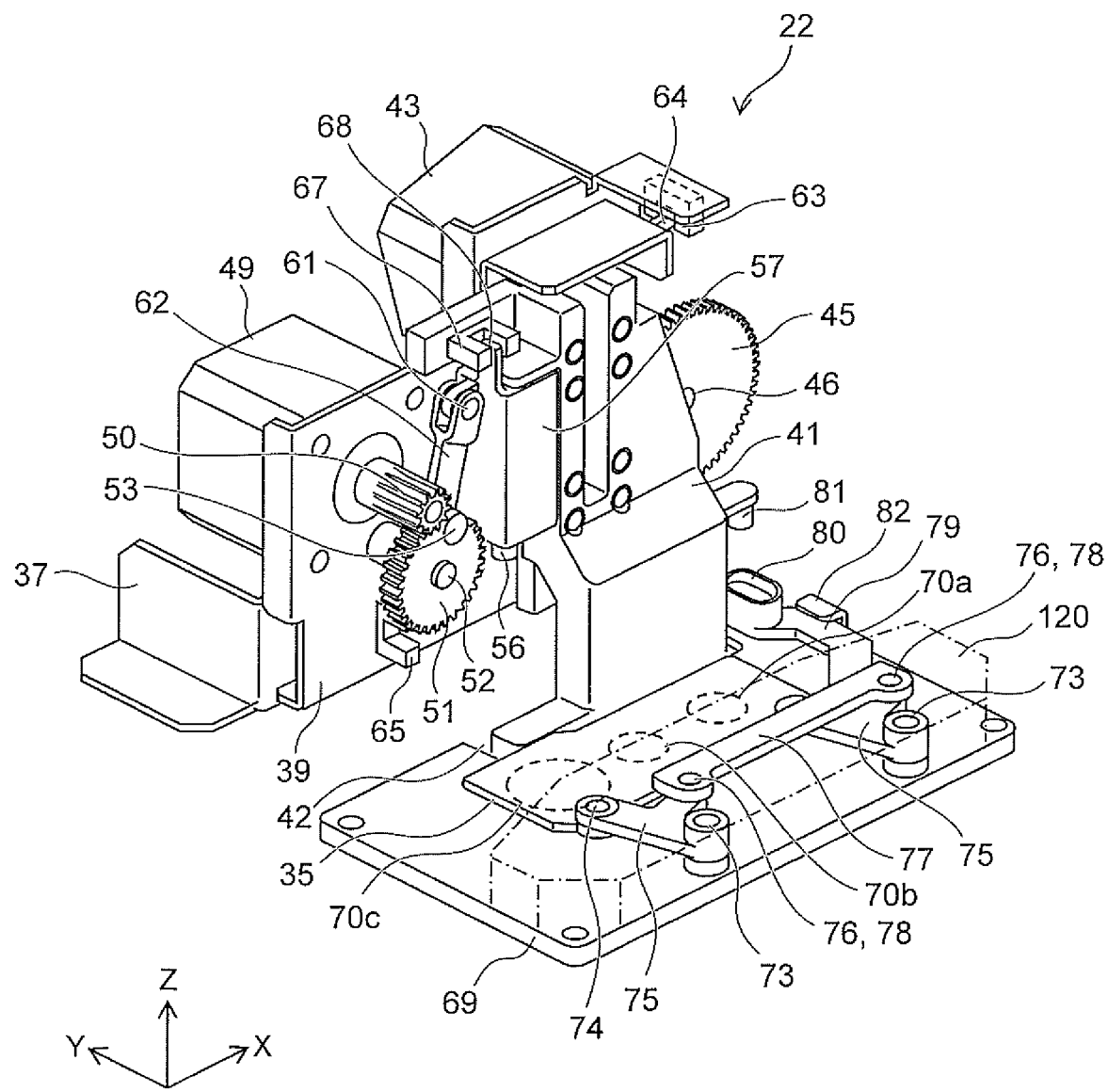
FIG. 8 is a perspective view illustrating the lid opening and closing device and a dispensing hole cover.
Figure 9:
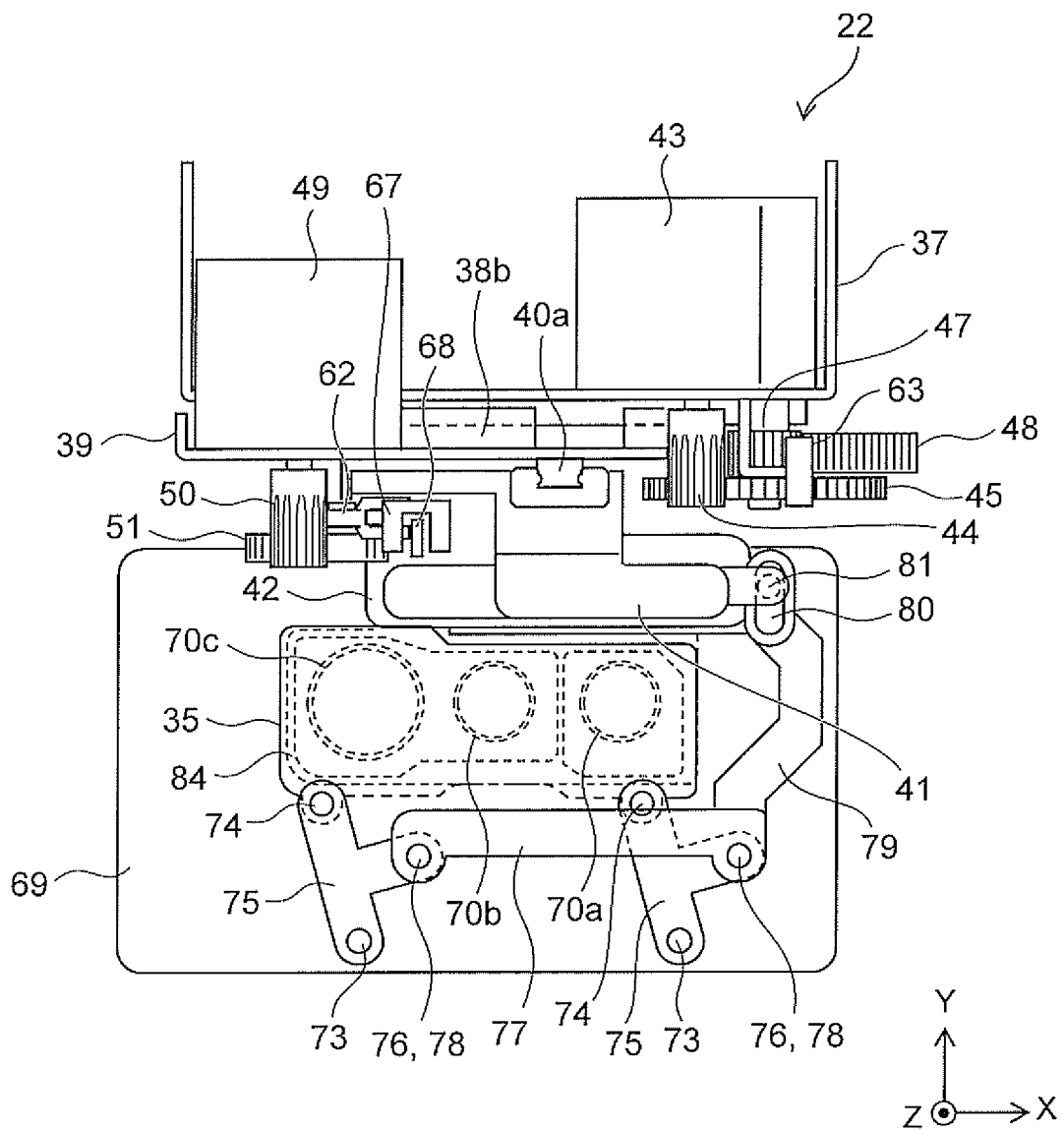
FIG. 9 is a plan view illustrating the lid opening and closing device and the dispensing hole cover.
Figure 10:
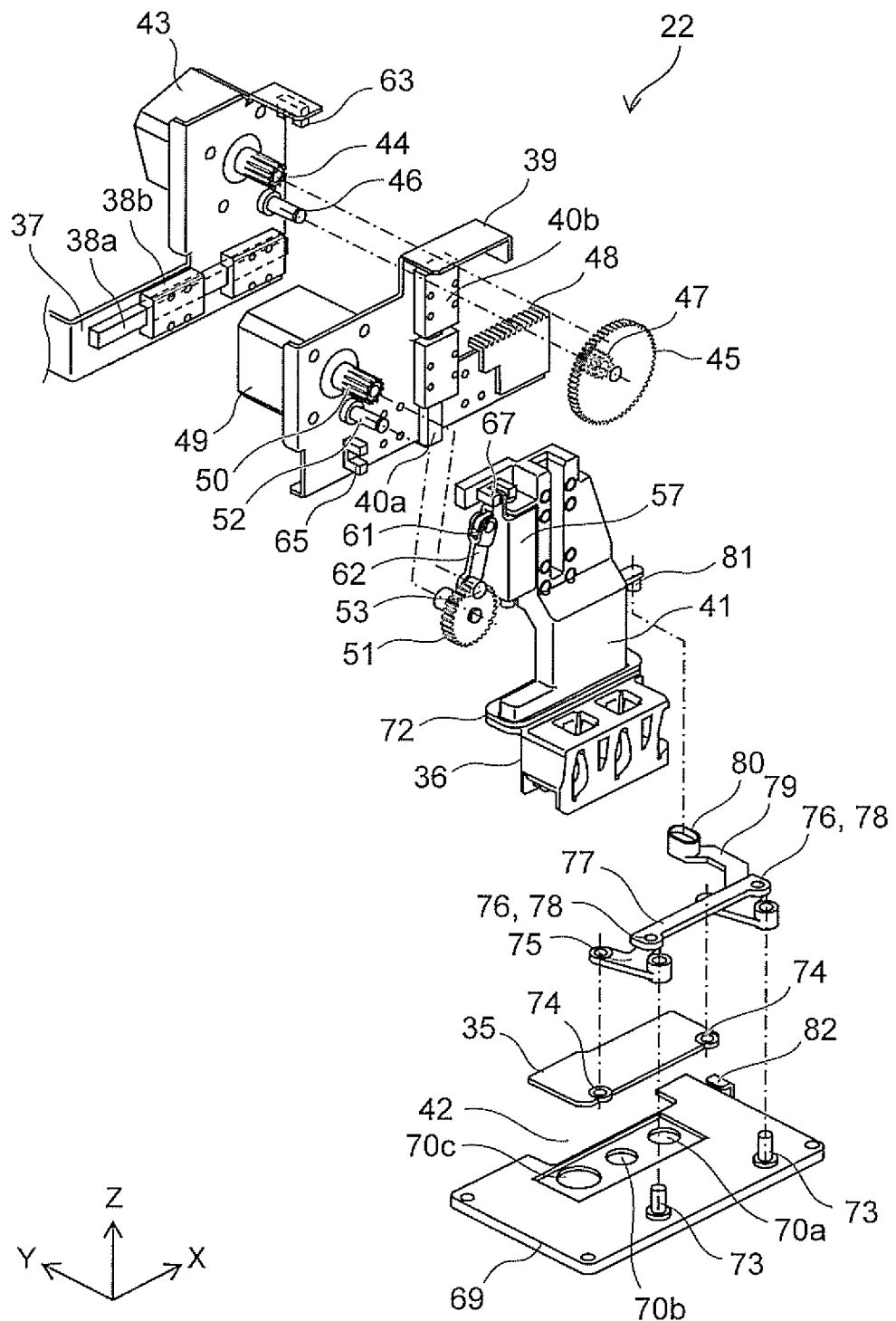
FIG. 10 is an exploded perspective view illustrating the lid opening and closing device and the dispensing hole cover.

FIGS. 5 to 10 show a state in which the reagent container 3 is set in the reagent disk 2. FIG. 5 is a front view of the lid opening and closing device 22, and FIG. 6 is a cross-sectional view taken along line B-B of FIG. 5. FIGS. 7 and 8 are perspective views of the lid opening and closing device 22. Here, FIG. 7 is a diagram in which the reagent cooling box 24 and a dispensing hole cover 69 provided at the reagent dispensing position 15a of the reagent cooling box 24 are omitted, and FIG. 8 illustrates the dispensing hole cover 69, and on the other hand, is a diagram in which the reagent container 3 and the lid opening and closing cam member 36 are omitted. FIG. 9 is a top view of the lid opening and closing device 22, and FIG. 10 is an exploded perspective view of the lid opening and closing device 22.

The lid opening and closing device 22 includes a lid opening and closing cam member 36 (lid opening and closing member), a fixed frame 37, a fixed rail 38a (first rail), a slide portion 38b, an X-slide frame 39 (first frame), and a fixed rail 40a (second rail), a slide portion 40b, and a Z-slide frame 41 (second frame).

The lid opening and closing cam member 36 is arranged between the lid 25 and the reagent cooling box 24, and a gap is provided between the bottom surface of the lid opening and closing cam member 36 and the upper surface of the lid 25. In other words, the height of the lid opening and closing cam member 36 in the Z-axis direction is smaller than the gap between the lid 25 and the reagent cooling box 24. As a result, the reagent disk 2 containing the reagent container 3 can be rotated.

The fixed frame 37 is substantially parallel to the XZ plane and is fixed to the upper surface of the reagent cooling box 24. The fixed frame 37 has a substantially U-shape when viewed from above, and has a substantially L-shape when viewed from the Y-axis direction.

The fixed rail 38a extends in the X-axis direction and is fixed to the lower end portion of the fixed frame 37. The slide portion 38b is configured to be movable in the X-axis direction along the fixed rail 38a. The fixed rail 38a and the slide portion 38b form an X-rail 38 that enables the X-slide frame 39 to move in the X-axis direction. The X-slide frame 39 is substantially parallel to the XZ plane, is fixed to the slide portion 38b, and is configured to be movable in the X-axis direction with respect to the fixed frame 37 together with the slide portion 38b.

The fixed rail 40a extends in the Z-axis direction and is fixed to the central portion of the X-slide frame 39. The slide portion 40b is configured to be movable in the Z-axis direction along the fixed rail 40a. The fixed rail 40a and the slide portion 40b form a Z-rail 40 that enables the Z-slide frame 41 to move in the Z-axis direction.

The Z-slide frame 41 is substantially parallel to the XZ plane, is fixed to the slide portion 40b, extends in the Z-axis direction, and has the lower end located inside the reagent cooling box 24. The lower end portion of the Z-slide frame 41 is connected to the lid opening and closing cam member 36, and is configured to be movable in the Z-axis direction integrally with the lid opening and closing cam member 36. With the above configuration, the X-slide frame 39 moves in the X-axis direction, and the Z-slide frame 41 moves in the Z-axis direction, so that the lid opening and closing cam member 36 moves together with the Z-slide frame 41 in the X-axis direction and in the Z-axis direction.

As shown in FIG. 6, the Z-slide frame 41 is provided such that the upper side above the reagent cooling box 24 is in a room temperature region, and the lower side is the low temperature reagent cooling box 24 over different temperature regions. As shown in FIG. 6, the lid opening and closing device 22 includes a heater 85 on the lower surface of the dispensing hole cover 69. The heater 85 heats the periphery of dispensing holes 70a to 70c and the slide shutter 35 to prevent such dew condensation.

Next, the configuration for driving the X-slide frame 39 in the X-axis direction will be described. The lid opening and closing device 22 includes an X-motor 43 (first motor) that is a drive source for the X-slide frame 39. Further, the lid opening and closing device 22 includes a motor pinion 44, an idler gear 45, an idler support shaft 46, an X-pinion 47, and a rack 48 as a first transmission unit for transmitting the driving force of the X-motor 43 to the X-slide frame 39.

The X-motor 43 is fixed to the fixed frame 37. The X-motor 43 is, for example, a stepping motor, which is rotationally driven by a predetermined angle in response to a drive signal input from the host computer 200. The amount of movement of the X-slide frame 39 is controlled by the number of pulses of the drive signal input to the X-motor 43. Further, the moving speed of the X-slide frame 39 is controlled by the pulse frequency of the drive signal input to the X-motor 43. In the X-motor 43, the output shaft extending in the Y-axis direction penetrates the fixed frame 37.

The motor pinion 44 is fixed to the output shaft of the X-motor 43. The idler support shaft 46 extends in the Y-axis direction and is fixed to the fixed frame 37. The idler gear 45 is rotatably supported with respect to the idler support shaft 46. The idler gear 45 is a gear having a larger number of teeth than the motor pinion 44, and meshes with the motor pinion 44 to reduce the rotation of the X-motor 43.

The X-pinion 47 has a smaller number of teeth than the idler gear 45, is pivotally supported by the idler support shaft 46, and rotates coaxially and integrally with the idler gear 45.

The rack 48 is provided at one end (right end) of the X-slide frame 39, extends in the X-axis direction, and meshes with the X-pinion 47.

With such a configuration, when the X-motor 43 is rotationally driven, the driving force is transmitted to the X-slide frame 39 via the motor pinion 44, the idler gear 45, the X-pinion 47, and the rack 48, and the X-slide frame 39 moves in the X-axis direction together with the rack 48.

Next, the configuration for driving the Z-slide frame in the Z-axis direction will be described. The lid opening and closing device 22 includes a Z-motor 49 (second motor) that is a drive source for the Z-slide frame 41. Further, the lid opening and closing device 22 includes a motor pinion 50, a crank gear 51, a crank gear support shaft (crankshaft), a crank pin 53 (first pin), a first protrusion portion 54, a second protrusion portion 55, a slider shaft 56, a slider 57 (moving member), a slider spring 60, a slider pin 61 (second pin), and a connecting rod 62 as a second transmission unit for transmitting the driving force of the Z-motor 49 to the Z-slide frame 41.

The Z-motor 49 is fixed to the X-slide frame 39. The Z-motor 49 is, for example, a stepping motor, which rotates by a predetermined angle in response to a drive signal input from the host computer 200. The amount of movement of the Z-slide frame 41 is controlled by the number of pulses of the drive signal input to the Z-motor 49. Further, the moving speed of the Z-slide frame 41 is controlled by the pulse frequency of the drive signal input to the Z-motor 49. The output shaft of the Z-motor 49 extends in the Y-axis direction and penetrates the X-slide frame 39.

The motor pinion 50 is fixed to the output shaft of the Z-motor 49. The crank gear support shaft 52 extends in the Y-axis direction and is fixed to the X-slide frame 39.

The crank gear 51 is rotatably supported with respect to the crank gear support shaft 52. The crank gear 51 is a gear having a larger number of teeth than the motor pinion 50, and meshes with the motor pinion 50 to reduce the rotation of the Z-motor 49. The crank pin 53 extending in the Y-axis direction is provided near the outer circumference of the crank gear 51, and the crank pin 53 makes a planetary motion around the crank gear support shaft 52.

The first protrusion portion 54 is formed in a substantially plate shape parallel to the XY plane, and is provided at the upper end portion of the Z-slide frame 41. Further, the Z-slide frame 41 is provided with a substantially plate-shaped second protrusion portion 55 parallel to the XY plane below the first protrusion portion 54.

The first protrusion portion 54 and the second protrusion portion 55 are provided with a through hole for passing the slider shaft 56 through. The slider shaft 56 extends in the Z-axis direction so as to penetrate the first protrusion portion 54 and the second protrusion portion 55 in the Z-axis direction.

The slider 57 is configured to be movable in the Z-axis direction along the slider shaft 56. The upper end portion of the slider 57 is a substantially plate-shaped first slider protrusion portion 58 parallel to the XY plane, and is arranged so as to be in contact with the lower surface of the first protrusion portion 54. Similar to the first slider protrusion portion 58, a substantially plate-shaped second slider protrusion portion 59 parallel to the XY plane is provided at the lower end portion of the slider 57.

The first slider protrusion portion 58 and the second slider protrusion portion 59 are provided with through holes for penetrating the slider shaft 56. The slider spring 60 is provided along the slider shaft 56 between the lower surface of the first slider protrusion portion 58 and the second protrusion portion 55, and urges the first slider protrusion portion 58 and the second protrusion portion 55 to separate from each other. The slider spring 60 is, for example, a compression spring.

The slider pin 61 extending in the Y-axis direction is provided on the negative X-axis side of the upper end portion of the slider 57. One end of the connecting rod 62 is rotatably connected to the crank pin 53 provided in the crank gear 51, and the other end of the connecting rod 62 is rotatably connected to the slider pin 61 provided in the slider 57. In this way, the crank gear 51 and the slider 57 are connected via the connecting rod 62.

With such a configuration, when the Z-motor 49 is rotationally driven, the driving force is transmitted to the Z-slide frame 41 in the order of the motor pinion 50, the crank gear 51, the connecting rod 62, the slider 57, and the slider spring 60, and the Z-slide frame 41 moves along the fixed rail 40a in the Z-axis direction.

Here, in the transmission path of the driving force of the Z-motor 49, the Z-motor 49 side is the upstream side and the Z-rail 40 side is the downstream side. Since the Z-slide frame 41 is located downstream of the slider 57 and the slider spring 60 and is directly attached to the Z-rail 40, the Z-slide frame 41 can accurately move in the Z-axis direction even when the slider 57 is displaced to compress the slider spring 60. The actions of the slider 57 and the slider spring 60 will be described later.

As the Z-slide frame 41 moves in the Z-axis direction by driving the Z-motor 49, the lid opening and closing cam member 36 also moves in the Z-axis direction. In the following, driving the Z-motor 49 in the upward direction of the lid opening and closing cam member 36 may be referred to as "driving in the ascending direction". Further, driving the Z-motor 49 in the descending direction of the lid opening and closing cam member 36 may be referred to as "driving in the descending direction".

Next, the configuration for discriminating the positions of the X-slide frame 39 and the Z-slide frame 41 and the orientation of the reagent container 3 will be described. The lid opening and closing device 22 includes a first detecting unit 63 and a first detecting lever 64 for determining the position of the X-slide frame 39, a second detecting unit 65 and a second detecting lever 66 for determining the position of the Z-slide frame 41, and a third detecting unit 67 and a third detecting lever 68 for determining the orientation of the reagent container 3.

The detecting units 63, 65, and 67 are optical detecting units, each of which is formed in a substantially U shape, and the recesses form an optical path. The detecting units 63, 65, and 67 are in a light-shielding state (OFF) when the detecting levers 64, 66, and 68 are inserted into the optical path, respectively, and are in a light-transmitting state (ON) when the detecting levers 64, 66, and 68 are retracted from the optical path. The detecting units 63, 65, and 67 output signals for discriminating between the light-transmitting state (ON) and the light-shielding state (OFF) to the host computer 200.

The first detecting unit 63 is arranged at the upper end and the right end of the fixed frame 37. As shown in FIG. 5, the first detecting lever 64 is provided at the end (right end) in X-axis direction of the X-slide frame 39, and blocks the optical path (first optical path) of the first detecting unit 63 when the position in the X-axis direction of the X-slide frame 39 is maximized.

In this way, the position of the X-slide frame 39 in which the first detecting unit 63 is turned off is called the "X origin position". When the X-motor 43 is driven and the X-slide frame 39 moves from the X origin position in the negative X-axis direction, the first detecting unit 63 is changed from OFF to ON, so that the host computer 200 can determine that the X-slide frame 39 has moved.

The second detecting unit 65 is provided below the crank gear 51 of the X-slide frame 39. As shown in FIG. 5, the second detecting lever 66 is pivotally supported by the crank gear support shaft 52 on the back surface of the crank gear 51, and rotates around the crank gear support shaft 52 according to the drive of the Z-motor 49. The second detecting lever 66 extends outward from the outer circumference of the crank gear 51. The second detecting lever 66 blocks the optical path (second optical path) of the second detecting unit 65 when the crank gear support shaft 52, the crank pin 53, and slider pin 61 are arranged substantially on a straight line and the position of the slider 57 and the Z-slide frame 41 in the Z-axis direction is maximized. In this way, the position of the Z-slide frame 41 in which the second detecting unit 65 is turned off is called the "Z origin position". When the Z-motor 49 is driven and the crank gear 51 rotates clockwise, the second detecting unit 65 is changed from OFF to ON, so the host computer 200 can determine that the Z-slide frame 41 has descended from the Z origin position.

When the Z-slide frame 41 is at the Z origin position, the crank gear support shaft 52, the crank pin 53, and the slider pin 61 are arranged substantially in a straight line, and the connecting rod 62 becomes a tension rod to firmly support the slider pin 61 with respect to the crank gear support shaft 52. As a result, even if the power supply to the Z-motor 49 is cut off and the Z-motor 49 does not generate a driving torque, the Z-slide frame 41 does not descend due to its own weight, and the Z origin position can be maintained.

In the present specification, the position of the Z-slide frame 41 when the X-slide frame 39 is located at the X origin position and the Z-slide frame 41 is located at the Z origin position is referred to as an "origin position". Further, the position of the lid opening and closing cam member 36 when the Z-slide frame 41 is located at the origin position is referred to as a "first position".

The third detecting unit 67 is provided at the upper end portion of the Z-slide frame 41 and above the slider 57. The third detecting lever 68 extends in the Z-axis direction from the first slider protrusion portion 58 of the slider 57 and blocks the optical path (third optical path) of the third detecting unit 67. In the third detecting unit 67, when the slider 57 descends relative to the Z-slide frame 41, the third detecting lever 68 retracts from the optical path and is turned ON. As will be described later, when the reagent container 3 is set in the opposite direction, the slider 57 descends relative to the Z-slide frame 41, and the third detecting unit 67 is turned on.

Next, the configuration of the dispensing hole cover 69 will be described. As shown in FIGS. 5 to 10, the reagent cooling box 24 includes the dispensing hole cover 69 above the lid opening and closing cam member 36 of the lid opening and closing device 22. As shown in FIGS. 5 and 6, the dispensing hole cover 69 is attached to the upper surface of the reagent cooling box 24 via, for example, a sponge-like rubber seal 71 to prevent the inflow of outside air into the reagent cooling box 24.

In the dispensing hole cover 69, three dispensing holes 70a to 70c for lowering the reagent dispensing probe 15 into the container 28 are bored in a row along the X-axis direction. The dispensing holes 70a to 70c face the opening portion 29 of the reagent container 3 set in the reagent disk 2.

The upper surface of the reagent cooling box 24 and the dispensing hole cover 69 are provided with a pillar moving opening 42 (opening) through which the Z-slide frame 41 penetrates and the Z-slide frame 41 moves in the X-axis direction and the Z-axis direction. The pillar moving opening 42 has a substantially rectangular shape with the X-axis direction as the longitudinal direction, and has a gap between the pillar moving opening 42 and the Z-slide frame 41.

An airtight seal 72 is provided around the Z-slide frame 41 at the connection portion of the Z-slide frame 41 with the lid opening and closing cam member 36. The airtight seal 72 is arranged at a position where the pillar moving opening 42 is closed from below when the Z-slide frame 41 is located at the origin position. The upper surface side of the airtight seal 72 is, for example, a thin-walled, flexible, fin-shaped packing, which deforms when it comes into contact with the periphery of the pillar moving opening 42 from the lower surface side of the reagent cooling box 24 and the dispensing hole cover 69, and closes the pillar moving opening 42 without any gap. As a result, it is possible to prevent outside air having a temperature difference from entering the reagent cooling box 24 through the pillar moving opening 42, and moisture and foreign matter in the outside air from entering.

The dispensing hole cover 69 includes the slide shutter (dispensing hole opening and closing unit) and a link mechanism for moving the slide shutter 35, such as an arm support shaft 73, a shutter shaft 74, a link arm 75, a connecting link shaft 76, a connecting link 77, a shutter interlocking arm 79, a shutter interlocking pin receiving portion 80, and an arm pressing pawl 82.

The slide shutter 35 is arranged above the dispensing holes 70a to 70c so as to cover the dispensing holes 70a to 70c, and is configured to be slidable in the XY plane. The slide shutter 35 is provided with a pair of shutter shafts 74 that protrudes in the Z-axis direction and is arranged on the front side along the X-axis direction. A pair of arm shafts 73 protruding in the Z-axis direction is juxtaposed in the dispensing hole cover 69 along the X-axis direction. The distance between the pair of shutter shafts 74 is equal to the distance between the pair of arm shafts 73.

One end of the link arm 75 is rotatably supported by each of the pair of arm shafts 73, and the other end is pivotally supported by the shutter shaft 74. The link arm 75 has a substantially T-shape protruding in the positive X-axis direction with respect to the line connecting the arm support shaft 73 and the shutter shaft 74, and the connecting link shaft 76 protruding in the Z-axis direction is provided in the tip portion protruding in the positive X-axis direction.

The connecting link 77 extends in the X-axis direction, and a pair of connecting link shaft holes 78 is provided at both ends in the X-axis direction. The distance between the pair of connecting link shaft holes 78 is equal to the distance between the pair of arm shafts 73 provided in the dispensing hole cover 69. The connecting link shaft 76 is rotatably supported in the connecting link shaft hole 78.

Since the distance between the pair of arm shafts 73, the distance between the pair of shutter shafts 74, and the distance between the pair of connecting link shafts 76 are equal to each other, the pair of link arms 75 are kept parallel to each other and are respectively rotate around the arm shafts 73. Further, the connecting link 77 and the slide shutter 35 swing around the arm support shaft 73 while maintaining parallelism with each other.

The shutter interlocking arm 79 extends in the Y-axis direction as a whole, and has a bent shape so as not to block the dispensing holes 70a to 70c when the slide shutter 35 is fully opened. One end of the shutter interlocking arm 79 is connected to the connecting link 77, the other end is located to the right of the Z-slide frame 41, and an open shutter interlocking pin receiving portion 80 is provided. The shutter interlocking pin receiving portion 80 has a substantially oval shape whose length in the Y-axis direction is larger than the length in the X-axis direction.

The Z-slide frame 41 is provided with a substantially cylindrical shutter interlocking pin 81 protruding downward. The shutter interlocking pin 81 is located above the shutter interlocking pin receiving portion 80, and engages with the shutter interlocking pin receiving portion 80 with a gap when the Z-slide frame 41 is lowered. When the Z-slide frame 41 moves while the shutter interlocking pin 81 is fitted with the shutter interlocking pin receiving portion 80, the connecting link 77 moves via the shutter interlocking pin 81 and the shutter interlocking pin receiving portion 80, and the link arm 75 rotates around the arm support shaft 73 via the connecting link shaft 76 to move the slide shutter 35.

The arm pressing pawl 82 is provided above the shutter interlocking arm 79 with an appropriate gap to prevent the shutter interlocking arm 79 from floating.

As shown in FIGS. 6 and 8, the arm support shaft 73, the shutter shaft 74, the link arm 75, the connecting link shaft 76, and the connecting link 77 are covered by a link portion cover 120.

Figure 11:
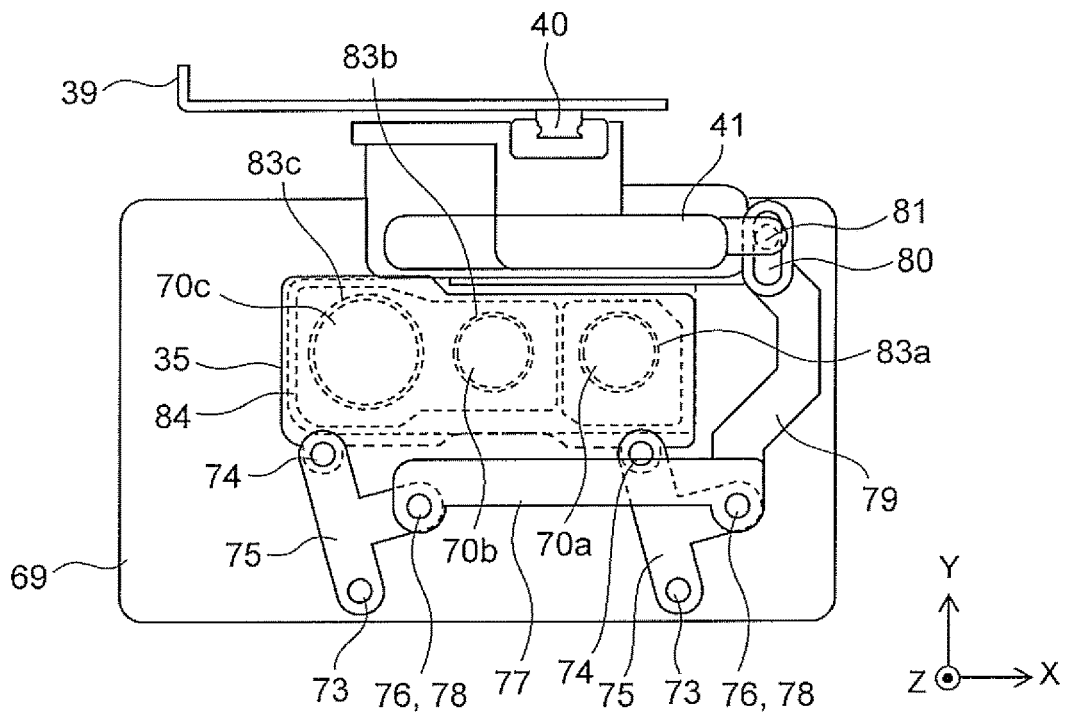
FIG. 11 is a plan view illustrating a configuration of the dispensing hole cover in which a slide shutter is closed.
Figure 12:
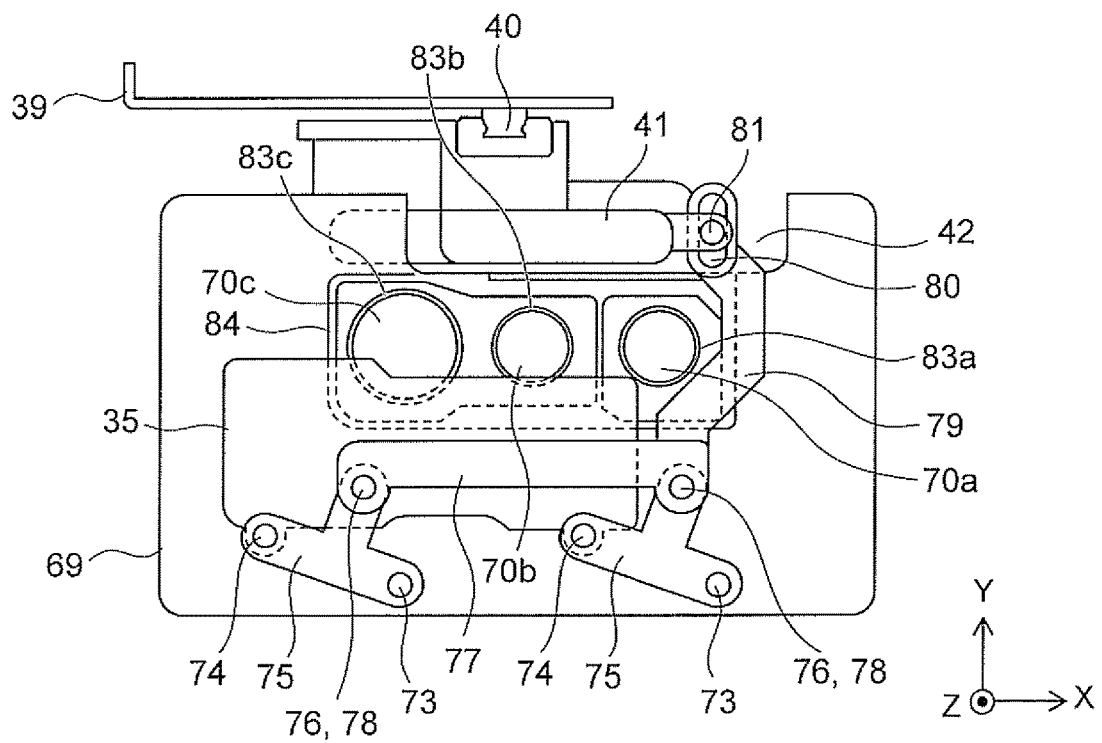
FIG. 12 is a plan view illustrating a configuration of the dispensing hole cover in which a slide shutter is in a half-open state.
Figure 13:
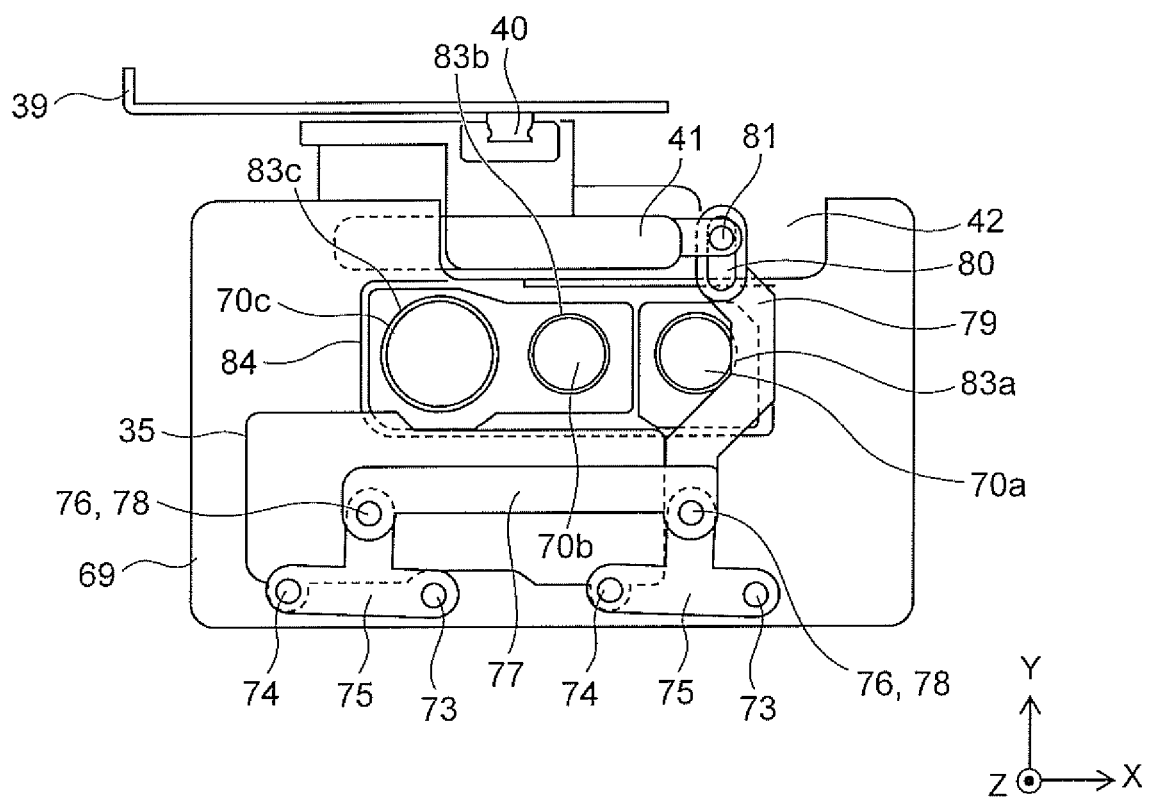
FIG. 13 is a plan view illustrating a configuration of the dispensing hole cover in which a slide shutter is opened.

Next, the relationship between the operation of the Z-slide frame 41 and the operation of the slide shutter 35 will be described with reference to FIGS. 11 to 13. FIGS. 11 to 13 are plan views showing the configuration of the dispensing hole cover 69, and the motor, gear, and the like are not shown.

FIG. 11 shows a state in which the Z-slide frame 41 is lowered from the origin position and the shutter interlocking pin 81 is engaged with the shutter interlocking pin receiving portion 80. At this time, the lid opening and closing cam member 36 is located at the "second position". The details of the second position will be described later.

As shown in FIG. 11, the state in which the slide shutter 35 covers the dispensing holes 70a to 70c is referred to as a "covered state". Dispensing hole ribs 83a to 83c having a height of 1 mm or less are provided around the dispensing holes 70a to 70c to prevent foreign matter from falling into the reagent disk 2 from the dispensing holes 70a to 70c.

Outside the dispensing hole ribs 83a to 83c and inside the outer circumference of the slide shutter 35 in the covered state, the height in the Z-axis direction is higher than that of the dispensing hole ribs 83a to 83c. For example, a shutter rib 84 having a height larger than 1 mm is provided. The slide shutter 35 in the covered state is supported in contact with the shutter rib 84, and the lower surface of the slide shutter 35 has a gap from the dispensing hole ribs 83a to 83c.

FIG. 12 shows a state in which the X-slide frame 39 and the Z-slide frame 41 move in the negative X-axis direction. The shutter interlocking arm 79 moves together with the Z-slide frame 41 in the negative X-axis direction, that is, in the direction approaching the dispensing holes 70a to 70c. Since the pair of connecting link shafts 76 rotates around the arm shafts 73 via the pair of link arms 75 that remains parallel to each other and draws an arcuate locus, the connecting link 77 moves along the arcuate locus of the connecting link shaft 76 while keeping parallel to the covered state.

Since the pair of shutter shafts 74 draws an arcuate locus that rotates around the arm shafts 73 via the pair of link arms 75 that remain parallel to each other, the slide shutter 35 moves along the arcuate locus of the shutter shaft 74 while keeping parallel to the covered state.

In FIG. 12, the slide shutter 35 is moving in the front left direction as compared with the covered state shown in FIG. 11, and the dispensing holes 70a to 70c are partially opened.

FIG. 13 shows a state in which the X-slide frame 39 and the Z-slide frame 41 are most moved in the negative X-axis direction. At this time, the lid opening and closing cam member 36 is located at a "third position". The details of the third position will be described later.

The shutter shaft 74 rotates to a position where it is aligned substantially in the negative X-axis direction with respect to the arm support shaft 73, and the slide shutter 35 is at a fully open position in which all the dispensing holes 70a to 70c are opened. As shown in FIG. 13, since the shutter interlocking arm 79 has a bent shape, the dispensing holes 70a to 70c are not closed when the slide shutter 35 is fully opened. When the slide shutter 35 is fully opened, the slide shutter 35 is housed in the link portion cover 120 while maintaining the state of being placed on the shutter rib 84.

As described above, when the Z-slide frame 41 moves in the negative X-axis direction from the state where the lid opening and closing cam member 36 is at the second position, the slide shutter 35 moves from the covered state to the fully open position to open the dispensing holes 70a to 70c.

On the other hand, when the Z-slide frame 41 moves in the positive X-axis direction from the state where the lid opening and closing cam member 36 is at the third position, the slide shutter 35 moves from the fully open position to the covered state and covers the dispensing holes 70a to 70c.

Since the slide shutter 35 moves while being mounted on the shutter rib 84, the lower surface of the slide shutter 35 moves while maintaining a gap from the dispensing hole ribs 83a to 83c. Therefore, when the slide shutter 35 is closed, there is no risk that the rear side of the slide shutter 35 pushes foreign matter into the dispensing holes 70a to 70c and drops the foreign matter, so that a highly reliable automatic analysis device can be provided.

When the Z-slide frame 41 is at the origin position, the slide shutter 35 is placed on the shutter rib 84 to cover the dispensing holes 70a to 70c, so that it is possible to prevent outside air having a different temperature from entering the reagent cooling box 24 from the dispensing holes 70a to 70c, and moisture and foreign matter in the outside air from entering the reagent cooling box 24.

Figure 14:
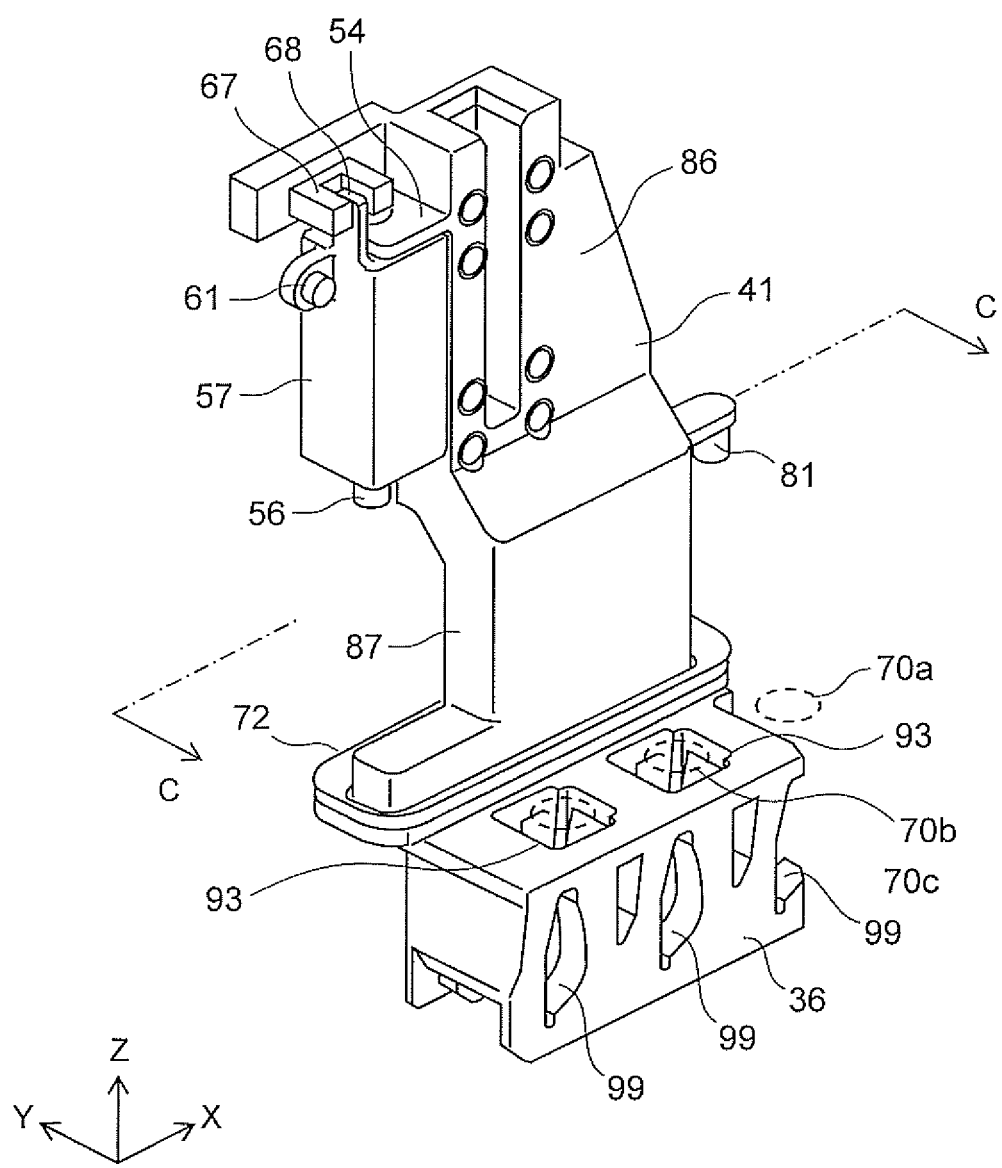
FIG. 14 is a perspective view illustrating a configuration of a Z-slide frame.

Next, the configuration of the Z-slide frame 41 will be described with reference to FIGS. 14 and 15. FIG. 14 is a perspective view of the Z-slide frame 41 as viewed from the upper left front.

As shown in FIG. 14, the Z-slide frame 41 is configured by a support portion 86 and a pillar portion 87. The support portion 86 is arranged above the pillar portion 87 and is attached to the slide portion 40b. The support portion 86 is arranged outside the reagent cooling box 24, and the ambient temperature is, for example, about 20° C. at room temperature.

The pillar portion 87 is arranged between the support portion 86 and the lid opening and closing cam member 36, and the lower end thereof is connected to the lid opening and closing cam member 36 via the airtight seal 72. The lid opening and closing cam member 36 is arranged in the reagent cooling box 24, and the ambient temperature is as low as, for example, about 5° C. That is, the pillar portion 87 is arranged across different temperature zones, with the upper portion under normal temperature condition and the lower portion under low temperature condition.

Here, since it is desirable to stably maintain the inside of the reagent cooling box 24 at a low temperature, it is desirable to reduce the thermal conduction from the outside of the reagent cooling box 24 via the pillar portion 87. Therefore, the material of the pillar portion 87 preferably has a low thermal conductivity, and is preferably a resin material rather than a metal material.

Figure 15:
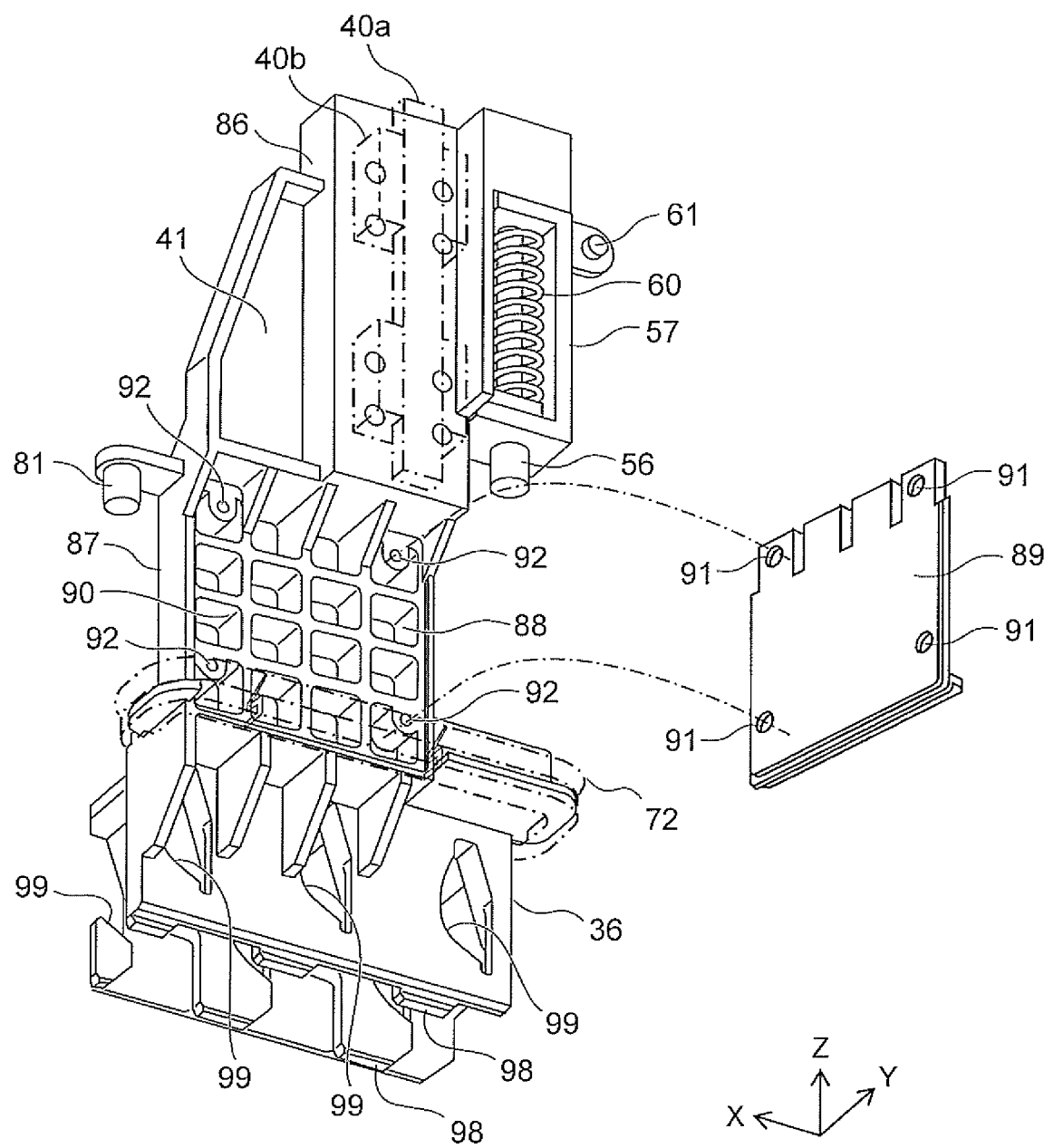
FIG. 15 is a rear perspective view illustrating a configuration of the Z-slide frame.

FIG. 15 is a perspective view of the Z-slide frame 41 as viewed from the lower right rear. As shown in FIG. 15, the pillar portion 87 includes a plurality of cells 88 which are air layers separated by grid-like ribs 90. The rear surface of the pillar portion 87 is closed by a pillar back lid 89, whereby the flow between the inside of the cell 88 and the outside air is blocked, and the cell 88 can be used as a heat insulating layer. Further, since the rib 90 can prevent the convection of the air in the cell 88 in the Z-axis direction, the amount of heat flowing into the reagent cooling box 24 via the pillar portion 87 is reduced, and the temperature inside the reagent cooling box 24 can be maintained stably.

Further, by screwing the pillar back lid 89 to the pillar portion 87 in thread holes 91 and 92, which are arranged at the four corners of the pillar back lid 89, using screws (not shown), the bending rigidity and the torsional rigidity of the pillar portion 87 can be increased, and the deformation when receiving an external force can be prevented. As a result, the operation of opening and closing the lid 25 is stable, and a highly reliable automatic analysis device can be provided.

As described above, in this embodiment, the lid opening and closing cam member 36 is integrally provided at the lower end portion of the pillar portion 87 of the Z-slide frame 41, but the lid opening and closing cam member 36 may be separated from the Z-slide frame 41, and fastened to the pillar portion 87 with screws or rivets. In this case, the pillar portion 87 straddling different temperature zones may be made of a resin material, and the lid opening and closing cam member 36 may be made of a metal material such as stainless steel.

Figure 16:
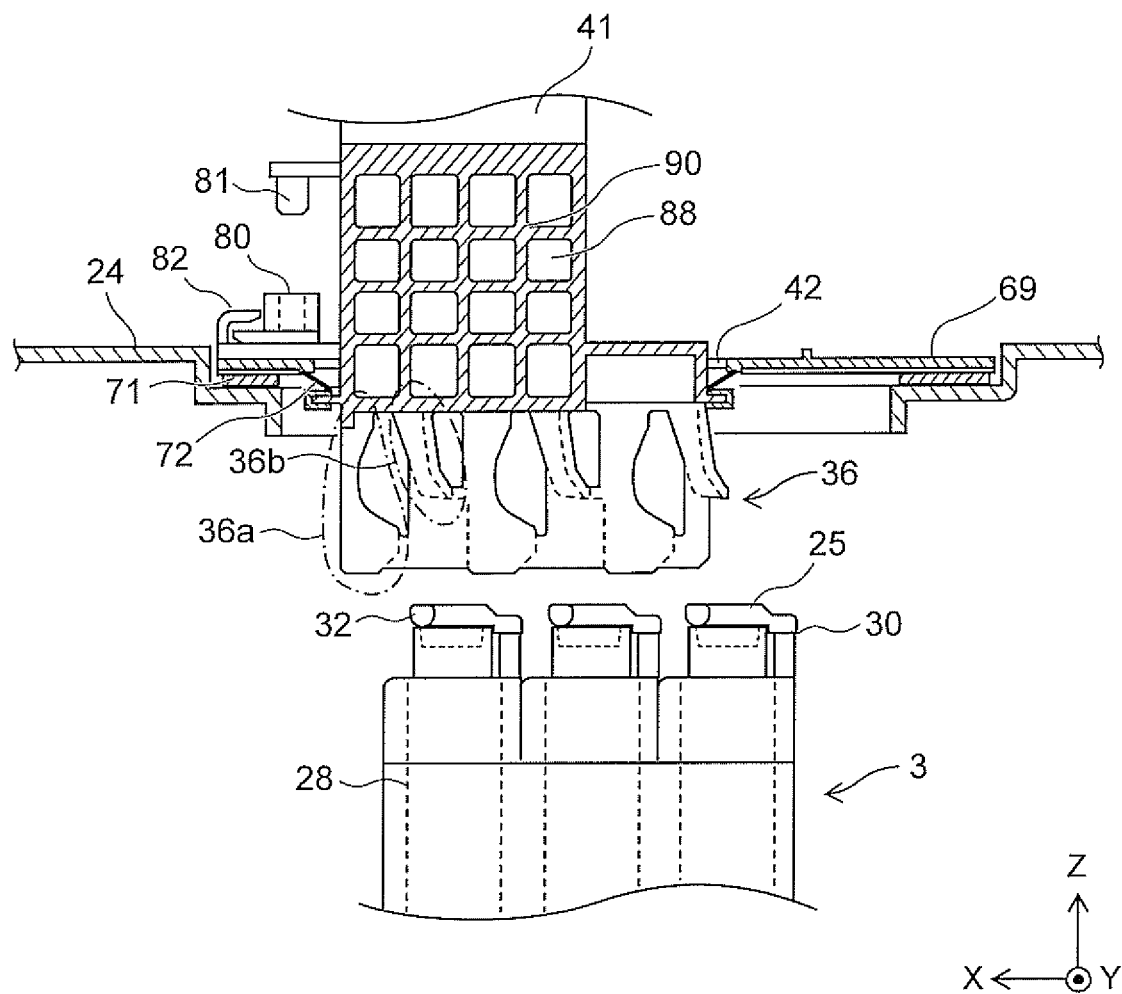
FIG. 16 is a C-C cross-sectional view of FIG. 14.

Next, the configuration of the lid opening and closing cam member 36 will be described with reference to FIGS. 16 to 19. FIG. 16 is a C-C cross-sectional view of FIG. 14. As shown in FIG. 16, the lid opening and closing cam member (lid opening and closing member) integrally includes a lid opening cam portion 36a (first member) and a lid closing cam portion 36b (second member). The lid opening cam portion 36a opens the lid 25 from the fully closed or half-open state to the fully open state. The lid closing cam portion 36b closes the lid 25 from the fully open state to the half-open state.

Figure 17:
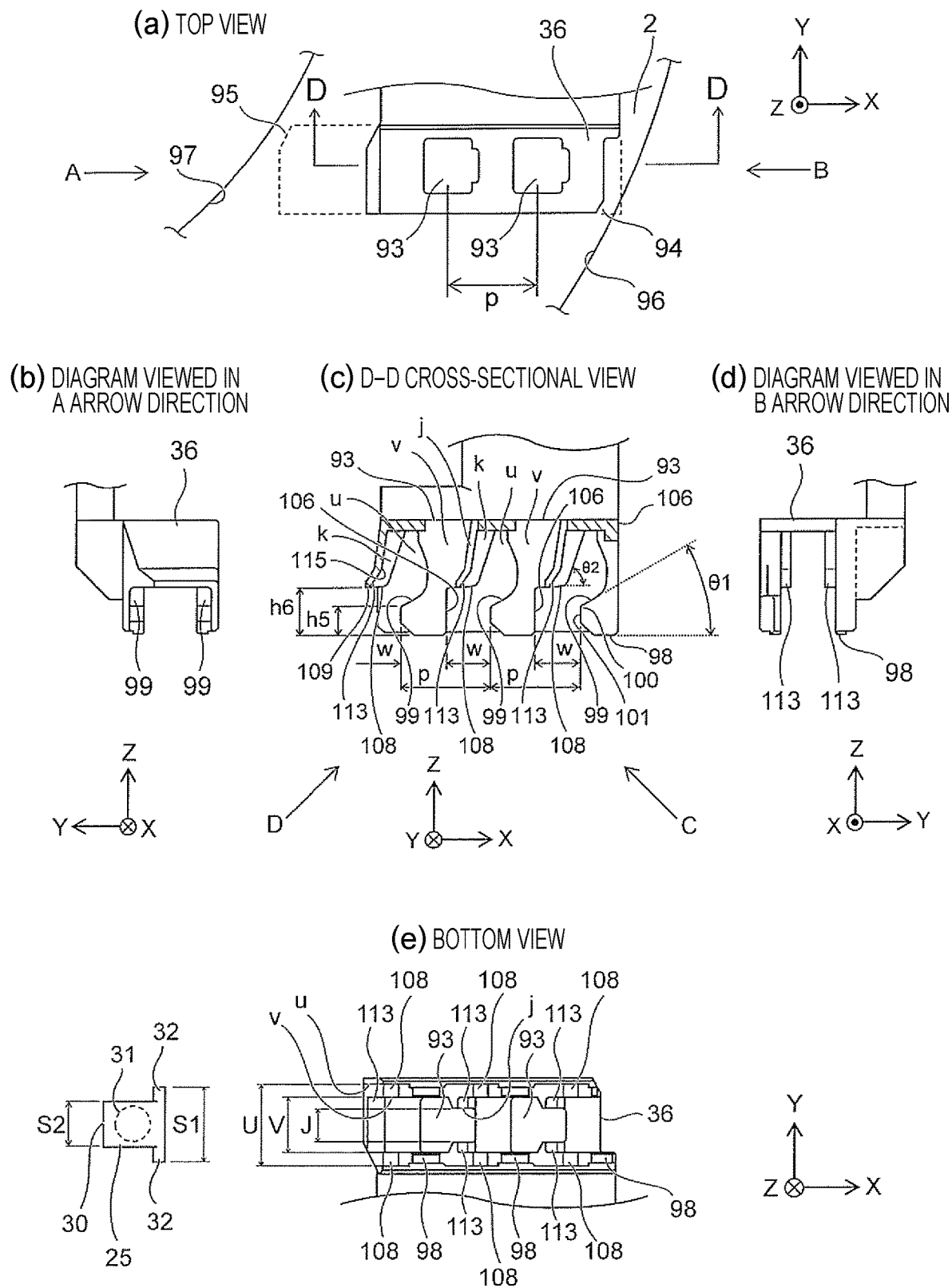

FIG. 17 shows diagrams illustrating the configuration of the lid opening and closing cam member 36, in which FIG. 17(a) is a top view of the lid opening and closing cam member 36, FIG. 17(b) is a diagram shown in an A arrow direction of FIG. 17(a), FIG. 17(c) is a D-D cross-sectional view of FIG. 17(a), FIG. 17(d) is a diagram shown in a B arrow direction of FIG. 17(a), and FIG. 17(e) is a bottom view. FIG. 18(a) is a diagram shown in a C arrow direction of FIG. 17(c) and FIG. 18(b) is a diagram shown in a D arrow direction of FIG. 17(c).

Figure 18:
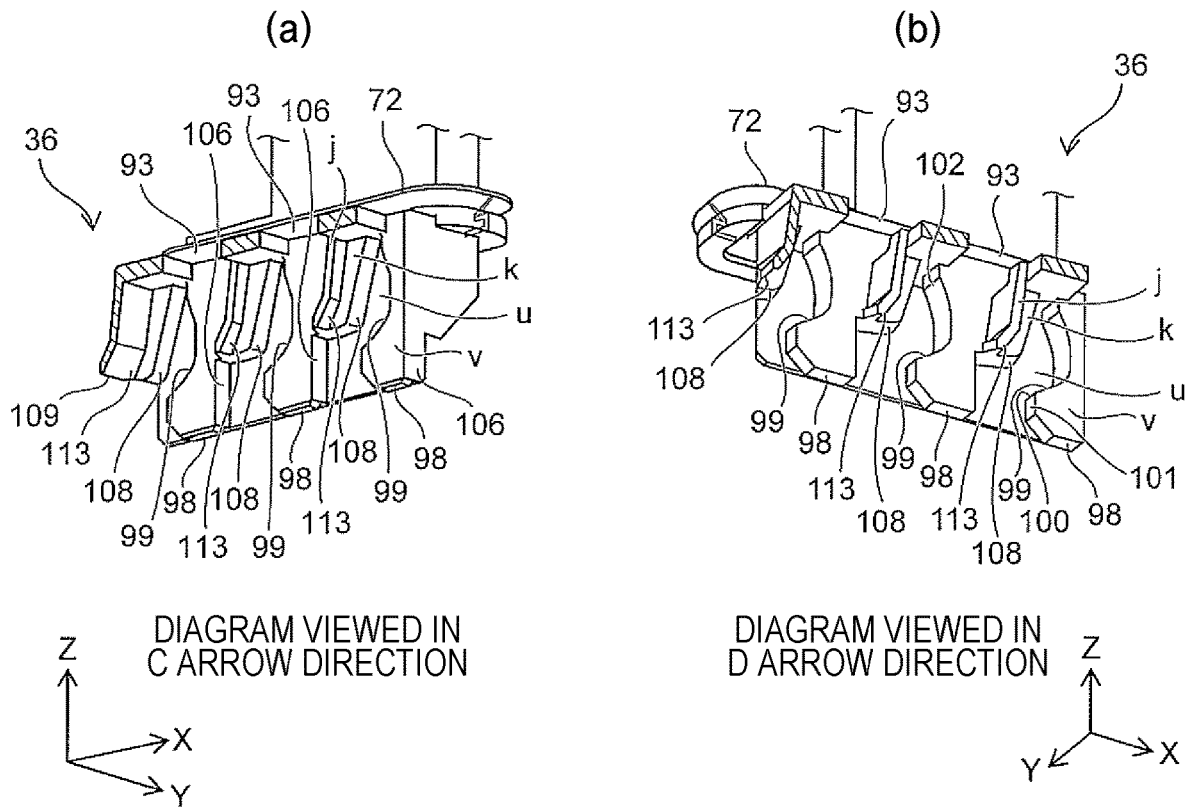
FIG. 18(a) is a diagram shown in a C arrow direction of FIG. 17(c) and FIG. 18(b) is a diagram shown in a D arrow direction of FIG. 17(c).

As shown in FIGS. 17(a) and 18, upper surface openings 93 are provided on the upper surface of the lid opening and closing cam member 36 at intervals of a pitch p, and when the lid 25 is opened, the upper surface openings 93 are arranged to be located directly above the openings 29 of the reagent container 3.

As will be described later, the lid opening and closing cam member 36 moves in the X-axis direction to open/close the lid 25. Therefore, the lid opening and closing cam member 36 becomes a shape such that a corner portion 94 adjacent to an outer circumferential inner wall 96 of the reagent disk 2 when moving to the first position, and a corner portion 95 adjacent to an inner circumferential outer wall 97 of the reagent disk 2 when moving to the third position are deleted. As a result, the gap between the reagent disk 2 and the lid opening and closing cam member 36 is secured, and the lid opening and closing cam member 36 can be moved in the X-axis direction while minimizing the reagent disk 2.

As shown in FIG. 17(c), the lid opening cam portion 36a and the lid closing cam portion 36b correspond to the three lids 25 arranged in the reagent container 3 along the X-axis direction at a pitch p. Three pairs are arranged along the X-axis direction at a pitch p, respectively. A pair of lid opening cam portions 36a and a pair of lid closing cam portions 36b are arranged substantially symmetrically in the Y-axis direction with the upper surface opening 93 interposed therebetween. The lid opening cam portion 36a and the lid closing cam portion 36b face each other.

As shown in FIG. 17(e), a lid opening and closing cam member bottom portion 98, which is the bottom surface of the lid opening and closing cam member 36, is arranged outside the range of interval V (S2<V<S1) larger than the length S2 of the lid 25 in the Y-axis direction and smaller than the length S1 of the lid tip protrusion 32 in the Y-axis direction. When the lid opening and closing cam member 36 is lowered from the state where the lid opening and closing cam member bottom portion 98 is located above the lid tip protrusion 32, the lid opening and closing cam member bottom portion 98 comes into contact with the lid tip protrusion 32. On the other hand, when the lid opening and closing cam member 36 is lowered from a state where the lid opening and closing cam member bottom portion 98 is located other than above the lid tip protrusion 32, the lid opening and closing cam member bottom portion 98 comes into contact with the upper surface 107 of the reagent container case 26. As a result, the lid opening and closing cam member bottom portion can slide along the upper surface 107 in the X-axis direction.

Figure 19:
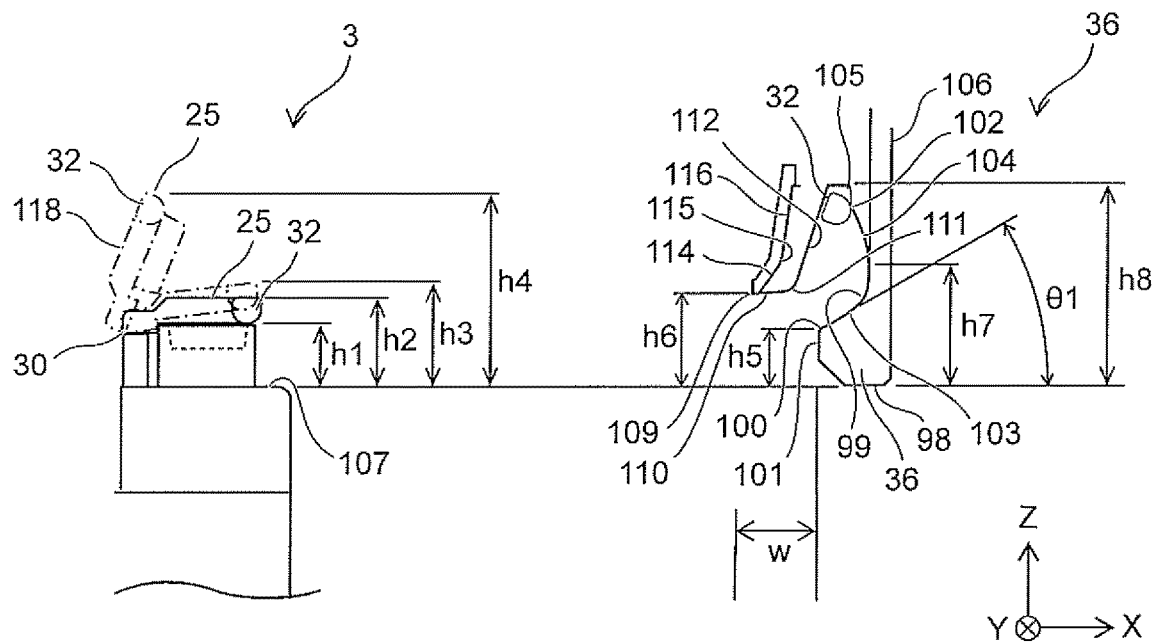
FIG. 19 is a front schematic diagram illustrating a relationship between a lid and the lid opening and closing cam member.

The lid opening cam portion 36a includes a lid opening cam curved surface 99 that abuts on the lid tip protrusion 32 when the lid 25 is opened. The lid opening cam curved surface 99 is a curved surface that divides the v-plane provided at the interval V (S2<V<S1) in the Y-axis direction and the u-plane provided at the interval U (S1<U) in the Y-axis direction. As shown in FIG. 17(c), 18, or 19, the lid opening cam curved surface 99 has a substantially arcuate curved surface in which a first region 103 and a second region 104 are smoothly connected, stretches in the Z-axis direction as a whole, and curved in the X-axis direction.

FIG. 19 is a schematic front view of the lid opening and closing cam member 36 and the lid 25, and shows a schematic configuration of the lid opening cam portion 36a and the lid closing cam portion 36b. As shown in FIG. 19, the tip surface 101 of the lid opening cam portion 36a extends downward from the opening tip portion 100 arranged at a height h5 (h5<h1) from the lid opening and closing cam member bottom portion 98. The first region 103 is a curved surface that extends from the opening tip portion 100 at an angle θ1 (0°<θ1<90°) with respect to the lid opening and closing cam member bottom portion 98, and gradually changes the angle up to about 90° at a height h7. The second region 104 is a curved surface that extends at an angle greater than 90° above the height h7 and reaches an upper end point 102.

The lid opening cam curved surface 99 extends in the Z-axis direction to a height h8 above the upper end point 102, and forms a space 105 in which the lid tip protrusion 32 is arranged when the lid 25 enters the fully open state. The height h8 is larger than a height h4 of the lid tip protrusion 32 when the lid 25 is in the fully open state.

Here, the first region 103 and the second region 104 are smoothly connected at a height h7, but the first region 103 and the second region 104 may be connected by a straight line extending in the Z-axis direction or may be connected by a straight line different from the vertical one.

The region between the tip surface 101 and an opening cam member back surface 106 facing the tip surface 101 is defined as a region w. Since a length U of the lid opening and closing cam member 36 in the Y-axis direction is larger than the length S1 of the lid tip protrusion 32, the lid opening and closing cam member 36 can be lowered until the lid opening and closing cam member bottom portion 98 comes into contact with the upper surface 107 of the reagent container case 26 in the positional relationship where the lid tip protrusion 32 is located below the region w.

By having the above configuration of the lid opening cam portion 36a, the lid tip protrusion 32 comes into contact from the first region 103 of the lid opening cam curved surface 99 to the second region 104 (from the lower end portion to the upper end portion) when the lid 25 is opened. As a result, the lid opening cam portion 36a can open the lid 25.

The lid closing cam portion 36b includes a first step 108 that abuts on the lid tip protrusion 32 when the lid 25 is closed, and a second step 113 that abuts on the lid back surface 118. As shown in FIG. 17(e), the first step 108 is a step which partitions a k-plane provided at the interval V in the Y-axis direction (S2<V<S1) and a u-plane provided at the interval U in the Y-axis direction (S1<U). The first step 108 projects in the positive X-axis direction as compared with the second step 113.

The first step 108 includes a third region 110 (lower end) which extends substantially horizontally in the X-axis direction from a closed tip portion 109, a bent portion 111 which is provided at the right end of the third region 110, and a fourth region 112 which extends at an angle θ2 (0°<θ2<90°, θ1<θ2) larger than the angle θ1 with the bent portion 111 as a boundary to be connected to a space 105. The closed tip portion 109 is provided on the negative X-axis side with respect to the tip surface 101 of the lid opening cam curved surface 99, and is arranged at a height h6 substantially equal to the height h3 of the lid tip protrusion 32 when the lid 25 is in the half-open state. The third region 110 does not have to be horizontal and may be slightly inclined to the upper right.

The second step 113 includes a fifth region 114 which extends in the upper right direction from the closed tip portion 109, and a sixth region 116 which extends in the upper right direction at an angle closer to 90° than the fifth region 114 with the bent portion 115 as a boundary. The second step 113 is a step provided between the j-plane and the k-plane provided at an interval J (J<S2, J<V<U) smaller than the length S2 of the lid 25 in the Y-axis direction, and comes into contact with the lid back surface 118 when the lid 25 is closed.

The lid closing cam portion 36b has the above configuration, so that when the lid 25 is closed, the lid tip protrusion 32 sequentially abuts thereon in the fourth region 112 (the upper end portion) of the first step 108 to face downward from above, and the lid back surface 118 sequentially abuts thereon in the fifth region 114 (the lower end portion) of the second step 113 to face downward from above. As a result, the lid closing cam portion 36b can close the lid 25 to the half-open state.

Next, the operation of opening the lid 25 by the lid opening and closing cam member 36 will be described with reference to FIGS. 20 to 24. FIGS. 20 to 24 are cross-sectional views taken along line D-D of FIG. 17(a), showing the relationship between the lid 25 and the lid opening and closing cam member 36 in the operation of opening the lid 25.

Figure 20:
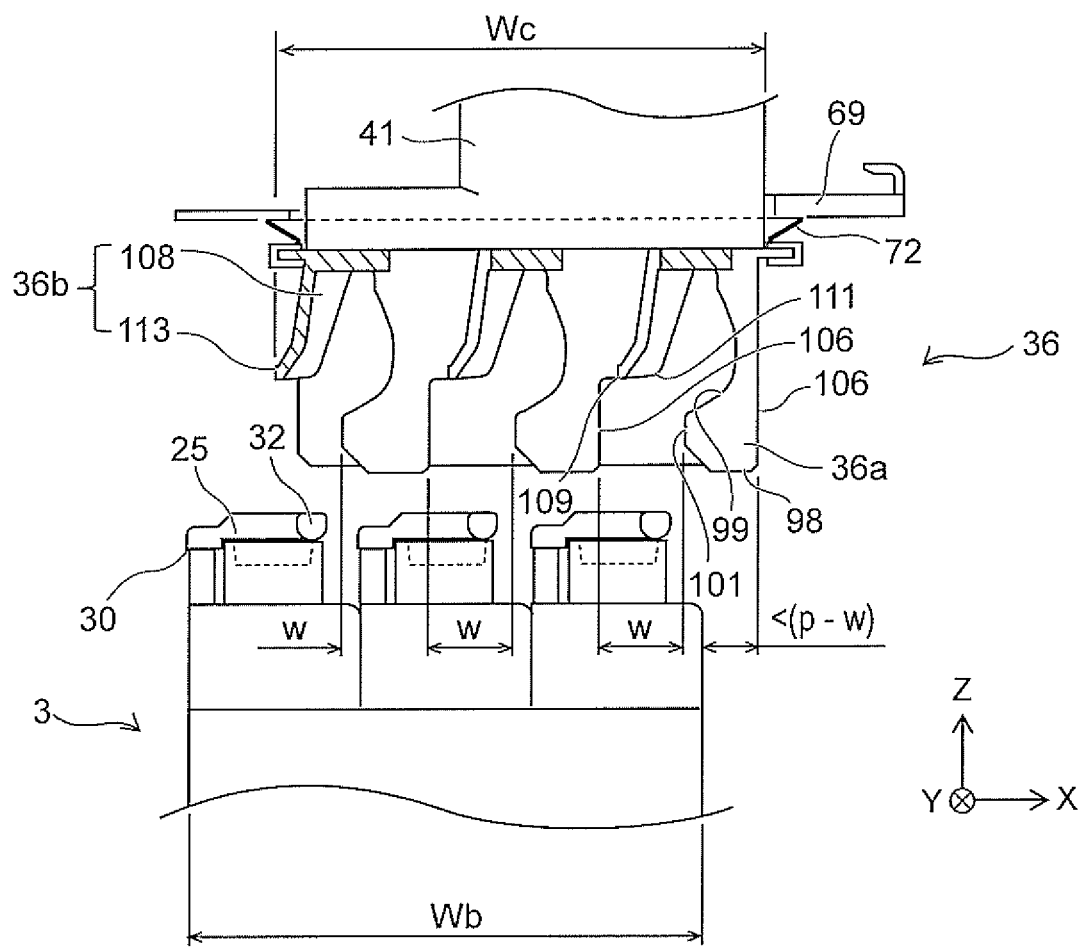
FIG. 20 is a D-D cross-sectional view of FIG. 17(a) in which the lid opening and closing cam member is positioned at the first position.

FIG. 20 shows the state at the start of the opening operation, in which the lid opening and closing cam member 36 is at the first position where it is most raised together with the Z-slide frame 41. The pillar moving opening 42 of the dispensing hole cover 69 is sealed from below by the airtight seal 72. At this time, the lid opening and closing cam member bottom portion 98 is located above the upper surface of the lid 25, and the lid tip protrusion 32 is located below the region w between the tip surface 101 and the opening cam member back surface 106.

The length We of the lid opening and closing cam member 36 in the X-axis direction is substantially equal to a length Wb of the reagent container 3 in the X-axis direction. The convex amount of the lid opening and closing cam member 36 with respect to the right end surface of the reagent container 3 in the positive X-axis direction is smaller than the difference (p−w) between the pitch p of the container 28 and the region w, for example, ½ or less of the pitch p of the container 28. Therefore, since the distance between the inner surface of the outer wall of the reagent disk 2 and the reagent container 3 can be reduced, the outer diameter of the reagent disk 2 can be reduced and a small automatic analysis device can be realized.

Figure 21:
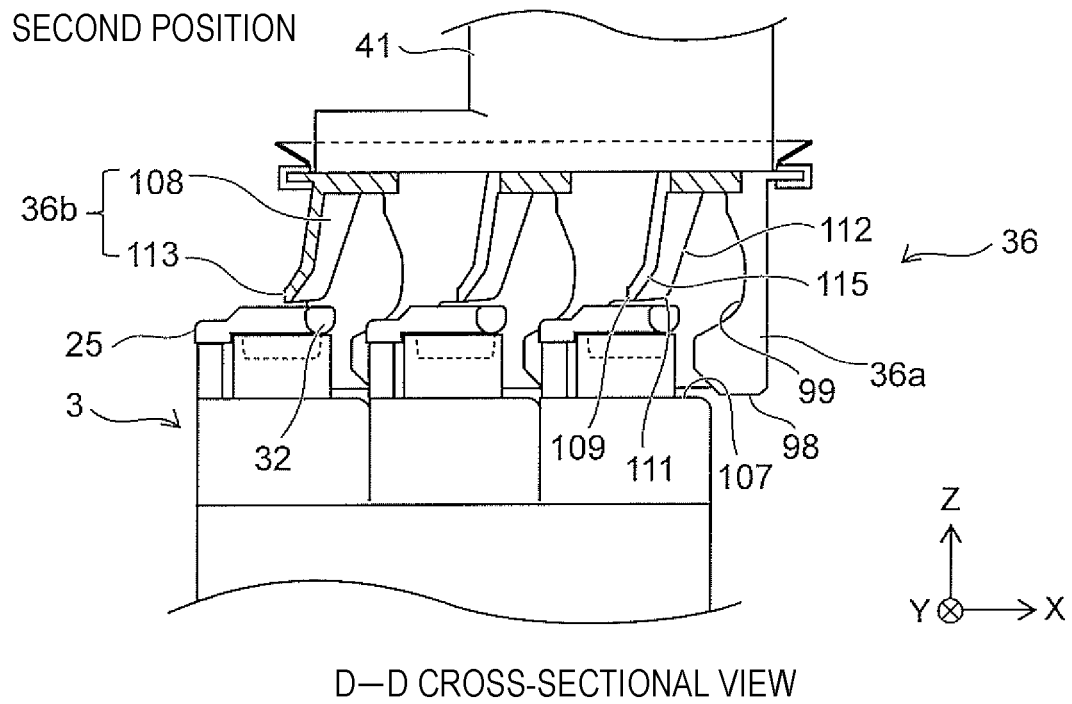
FIG. 21 is a D-D cross-sectional view of FIG. 17(a) in which the lid opening and closing cam member is positioned at a second position.

FIG. 21 shows a state in which the lid opening and closing cam member 36 is lowered from the first position by driving the Z-motor 49, and the lid opening and closing cam member bottom portion 98 is in contact with the upper surface 107 of the reagent container case 26. At this time, the lid opening and closing cam member 36 is at the second position. That is, the first position and the second position have the same positional relationship in the X-axis direction, but differ only in the position in the Z-axis direction.

The first step 108 and the second step 113 of the lid closing cam portion 36b are above the lid 25 when the lid opening and closing cam member 36 is located at the second position.

Figure 22:
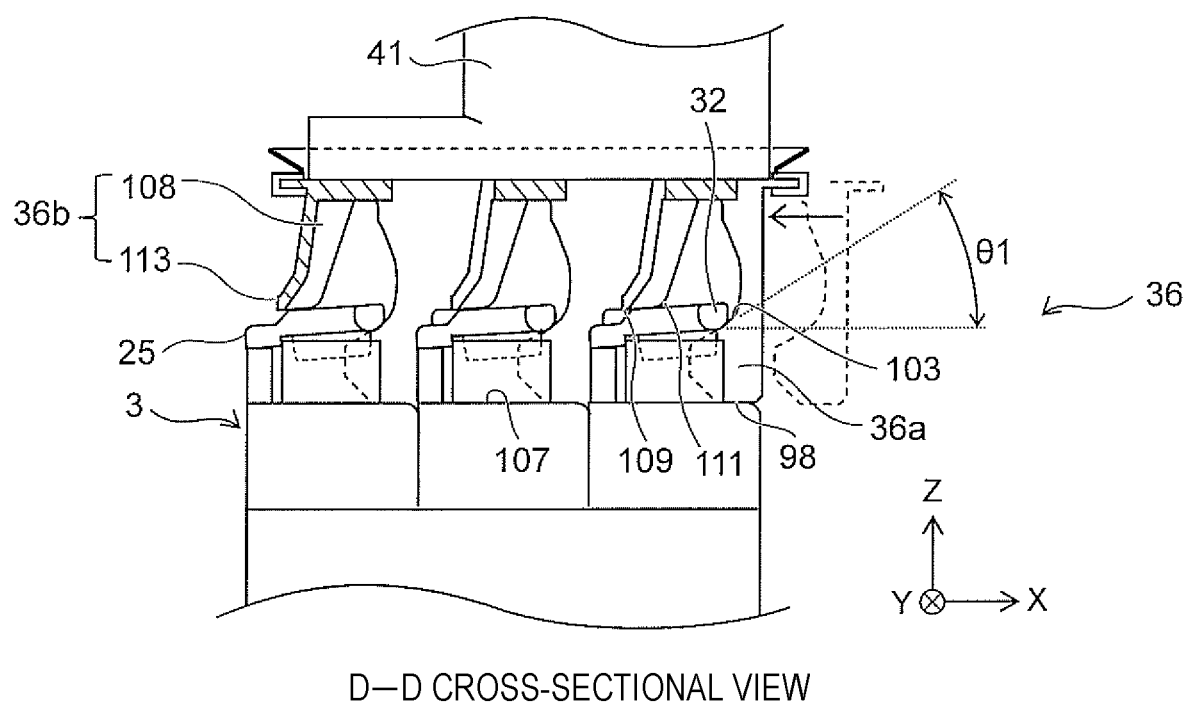
FIG. 22 is a D-D cross-sectional view of FIG. 17(a) in which the lid opening and closing cam member is moving from the second position to a third position.

In FIG. 22, the X-motor 43 is driven to move the lid opening and closing cam member 36 from the second position in the negative X-axis direction, and the first region 103 of the lid opening cam curved surface 99 abuts on the lower surface of the lid tip protrusion 32. The lid opening and closing cam member 36 moves in the negative X-axis direction while the lid opening and closing cam member bottom portion 98 is in contact with the upper surface 107 of the reagent container case 26.

At this time, the contact angle of the first region 103 with respect to the lid tip protrusion 32 becomes the angle θ1. The smaller the angle θ1, the larger the upward component force generated in the lid tip protrusion 32, that is, the lid opening force, which is preferable. On the other hand, if the angle θ1 is made too small, the amount of movement of the lid opening and closing cam member 36 required to open the lid 25 in the negative X-axis direction becomes excessive. Therefore, for example, it is preferable to set the angle θ1 to about 30°.

Figure 23:
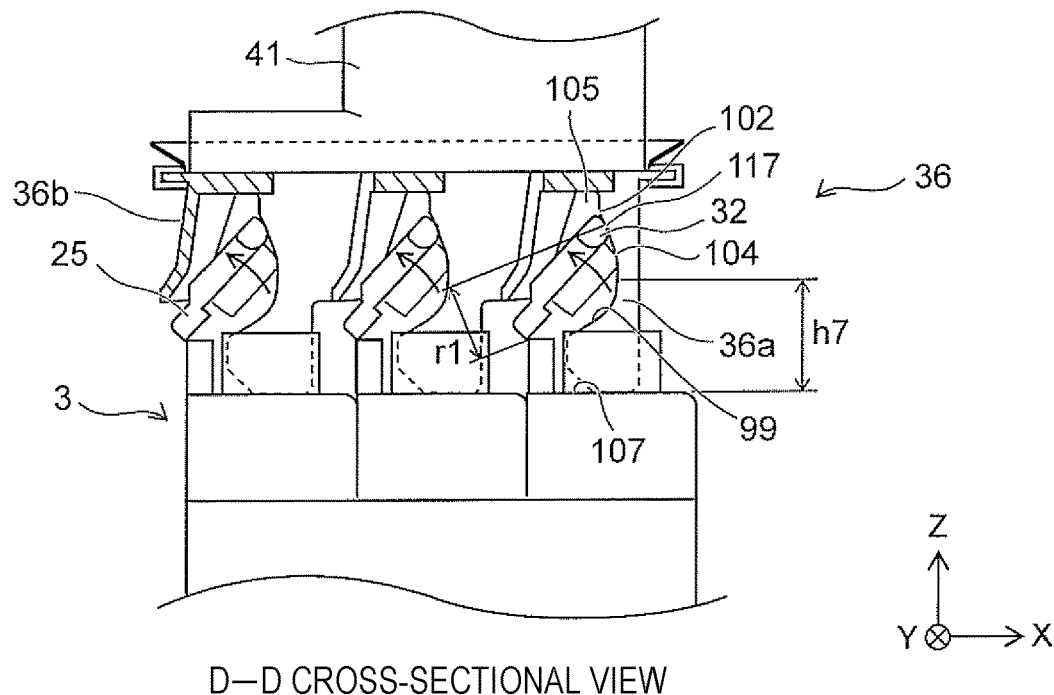
FIG. 23 is a D-D cross-sectional view of FIG. 17(a) in which the lid opening and closing cam member is moving from the second position to the third position.

FIG. 23 shows a state in which the lid 25 is being opened by driving the X-motor 43 to further move the lid opening and closing cam member 36 in the negative X-axis direction. A contact point 117 between the lid opening cam curved surface 99 and the lid tip protrusion 32 is in the second region 104 above the height h7. Since the second region 104 of the lid opening cam curved surface 99 is inclined at an angle larger than 90°, the amount of movement of the lid tip protrusion 32 in the negative X-axis direction is larger than the amount of movement of the lid opening and closing cam member 36 in the negative X-axis direction. As a result, the lid 25 can be greatly opened with a small amount of movement of the lid opening and closing cam member 36 in the negative X-axis direction. That is, since the amount of movement of the lid opening and closing cam member 36 can be reduced, it is suitable for miniaturization in the X-axis direction. Here, the force received by the lid tip protrusion 32 from the contact point 117 acts in the normal direction of the contact point 117 and in the direction of opening the lid 25. The normal line of the contact point 117 and the hinge 30 are separated by a distance r1.

Figure 24:
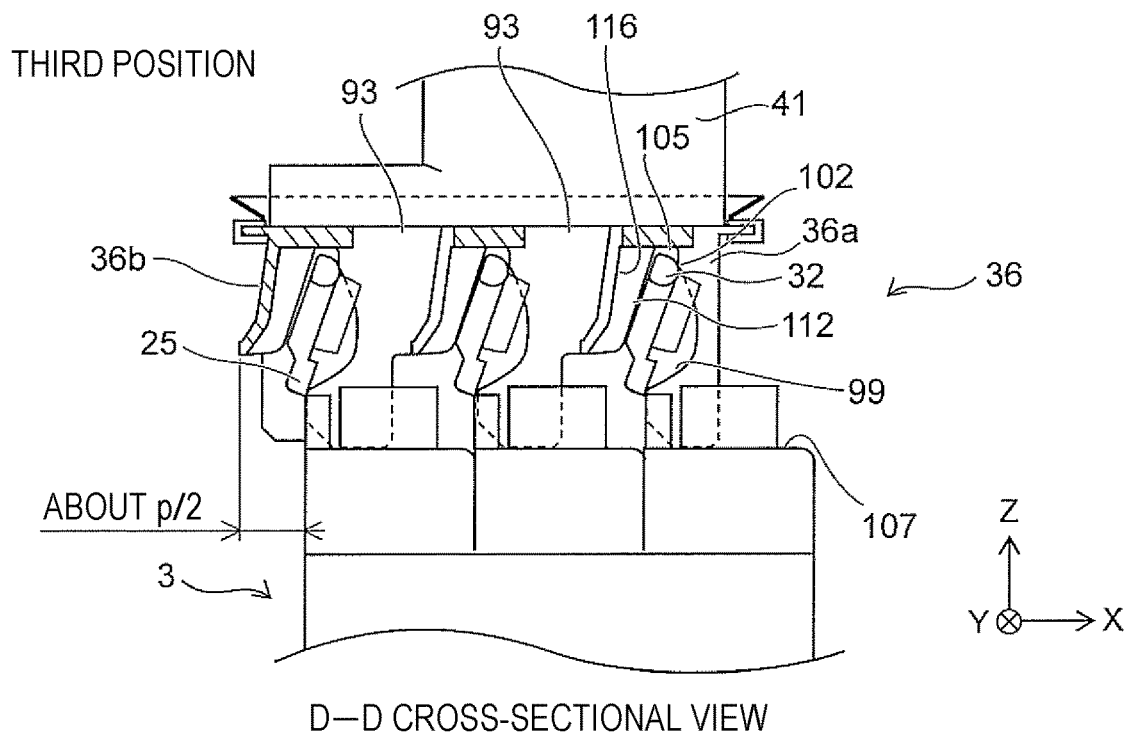
FIG. 24 is a D-D cross-sectional view of FIG. 17(a) in which the lid opening and closing cam member is positioned at the third position.

FIG. 24 shows a state in which the lid 25 is in the fully open state by driving the X-motor 43 to move the lid opening and closing cam member 36 in the most negative X-axis direction. In FIG. 24, the lid opening and closing cam member 36 is at the third position. That is, the second position and the third position have the same positional relationship in the Z-axis direction, but differ only in the position in the X-axis direction. The amount of movement of the lid opening and closing cam member 36 in the negative X-axis direction from the second position to the third position is substantially equal to the pitch p of the container 28.

The lid tip protrusion 32 abuts on the upper end point 102 of the lid opening cam curved surface 99 and is arranged in the space 105 above the upper end point 102. The sixth region 116 of the lid closing cam portion 36b also functions as a stopper for preventing the lid tip protrusion 32 from being further opened from the fully open state.

In the fully open state, the position of the opening portion 29 of the container 28 in the X-axis direction, the position of the upper surface opening 93 of the lid opening and closing cam member 36, and the positions of the dispensing holes 70a to 70c are matched with each other. Thus, the reagent dispensing probe 15 can be lowered into the container 28.

At the beginning of opening of the lid 25, the lid opening cam curved surface 99 opens the lid tip protrusion 32 from below at an angle θ1 and reaches the fully open state at the upper end point 102 via the second region 104 inclined beyond the vertical from the first region 103. By reducing the angle θ1, the component force at the start of opening the lid 25 can be increased, and the opening force of the lid opening and closing cam member 36 can be reduced. Further, when the lid tip protrusion 32 abuts on the second region 104, the amount of movement of the lid opening and closing cam member 36 in the negative X-axis direction is larger than the amount of movement of the lid tip protrusion 32 in the negative X-axis direction. Therefore, the amount of movement of the lid opening and closing cam member 36 can be reduced. That is, it is suitable for miniaturization because the opening force of the lid 25 can be increased and the amount of movement of the lid opening and closing cam member 36 required for fully opening can be reduced.

Here, as described above, the length Wb in the X-axis direction of the reagent container 3 and the length Wc in the X-axis direction of the lid opening and closing cam member 36 are substantially equal, and the amount of movement of the lid opening and closing cam member 36 from the second position to the third position in the negative X-axis direction is substantially equal to the pitch p of the container 28. Therefore, the convex amount of the lid opening and closing cam member 36 from the left end surface of the lid 25 is merely about ½ of the pitch p. Therefore, the distance between the outer circumference of the inner wall of the reagent disk 2 and the reagent container 3 can be reduced, and a small automatic analysis device can be realized.

Next, the operation of closing the lid 25 by the lid opening and closing cam member 36 will be described with reference to FIGS. 25 to 28. FIGS. 25 to 28 are cross-sectional views taken along line D-D of FIG. 17(*a*), showing the relationship between the lid 25 and the lid opening and closing cam member 36 in the operation of closing the lid 25.

Figure 25:
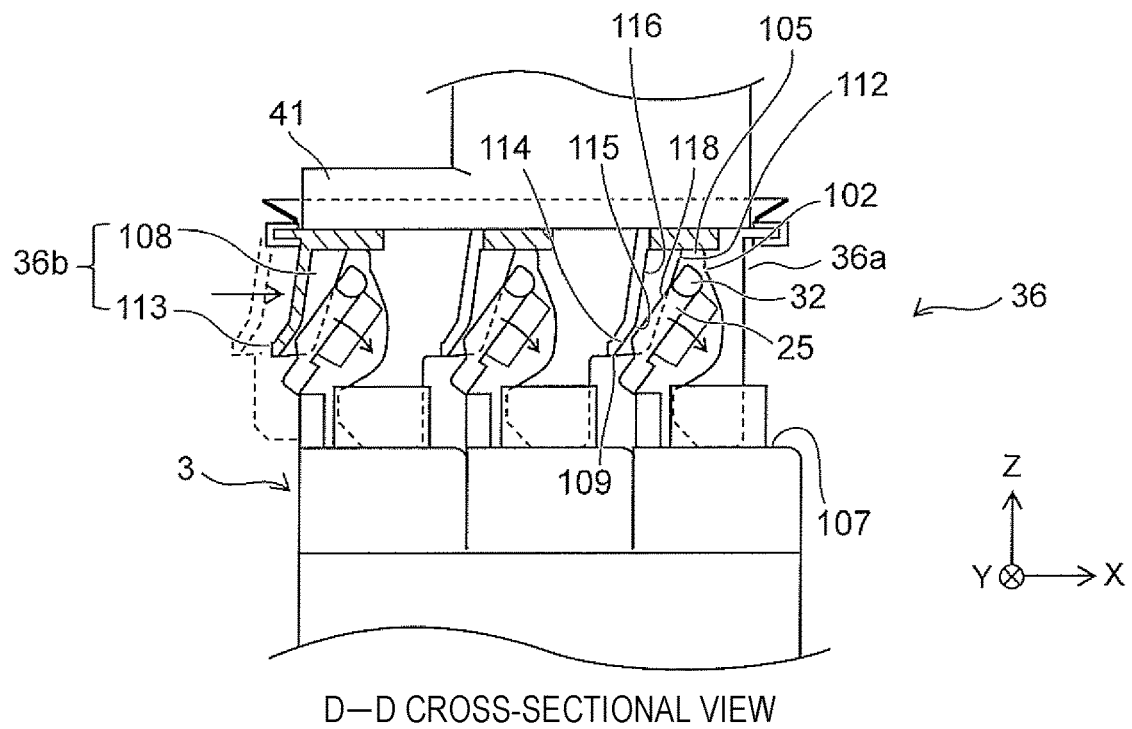
FIG. 25 is a D-D cross-sectional view of FIG. 17(a) in which the lid opening and closing cam member is moving from the third position to the second position.

FIG. 25 shows a state in which the X-motor 43 is driven to move the lid opening and closing cam member 36 from the third position in the positive X-axis direction from the state shown in FIG. 24, and the lid 25 is started to be closed by the lid closing cam portion 36*b*. At this time, the upper surface of the lid tip protrusion 32 comes into contact with the fourth region 112 of the first step 108 and moves in the positive X-axis direction.

Figure 26:
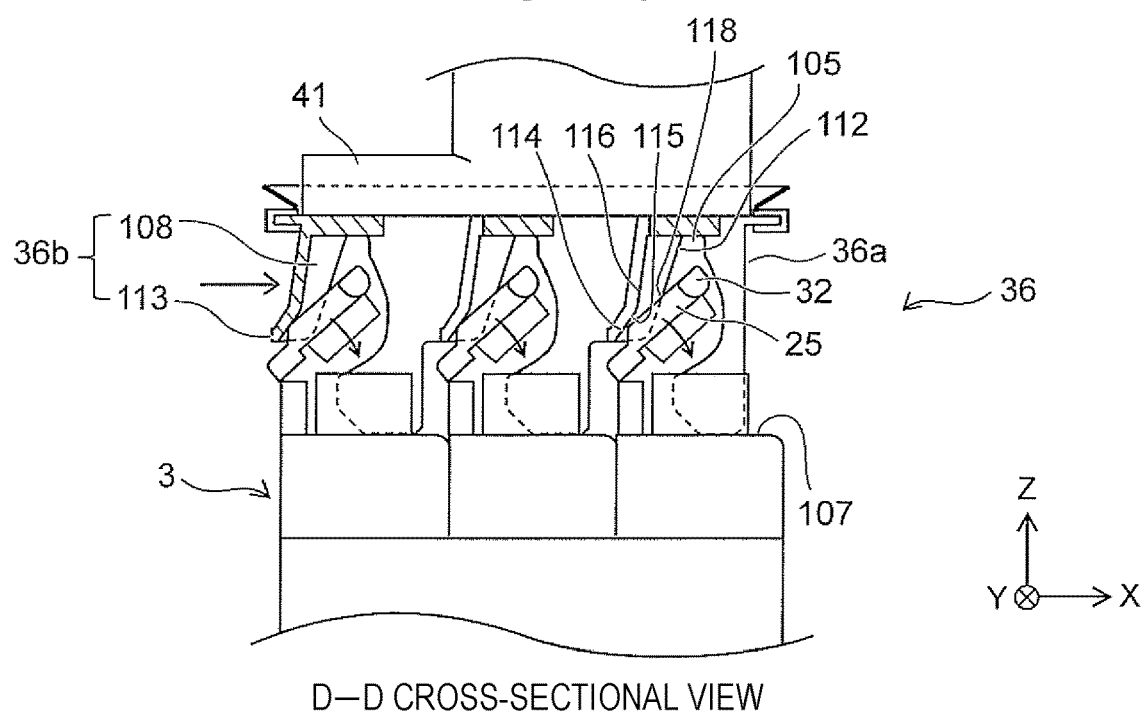
FIG. 26 is a D-D cross-sectional view of FIG. 17(a) in which the lid opening and closing cam member is moving from the third position to the second position.

FIG. 26 shows a state in which the X-motor 43 is further driven to move the lid opening and closing cam member 36 in the positive X-axis direction from the state shown in FIG. 25. At this time, the fifth region 114 below the bent portion 115 of the second step 113 abuts on the lid back surface 118, and the lid tip protrusion 32 separates from the fourth region 112.

Figure 27:
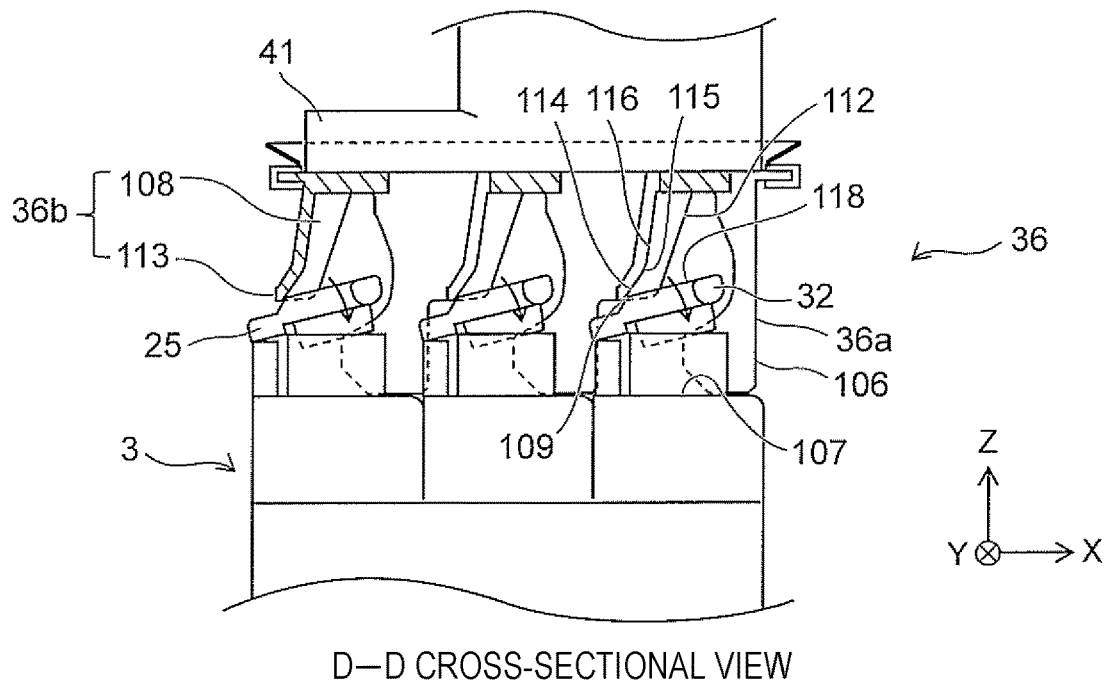
FIG. 27 is a D-D cross-sectional view of FIG. 17(a) in which the lid opening and closing cam member is moving from the third position to the second position.

FIG. 27 shows a state in which the X-motor 43 is further driven to move the lid opening and closing cam member 36 in the positive X-axis direction from the state shown in FIG. 26. At this time, the closed tip portion 109 of the lid closing cam portion 36*b* comes into contact with the lid back surface 118.

Figure 28:
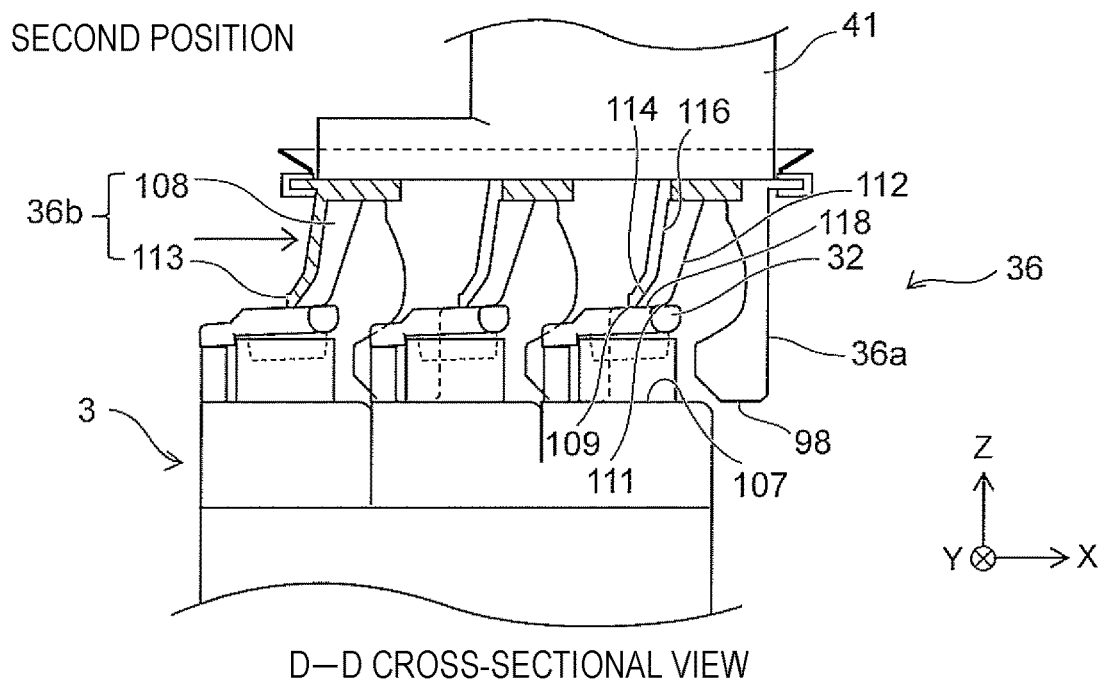
FIG. 28 is a D-D cross-sectional view of FIG. 17(a) in which the lid opening and closing cam member is positioned at the second position.

FIG. 28 shows a state in which the X-motor 43 is further driven to move the lid opening and closing cam member 36 in the positive X-axis direction from the state shown in FIG. 27. In FIG. 28, the lid opening and closing cam member 36 is at the second position. At this time, the closed tip portion 109 of the lid closing cam portion 36*b* abuts on the lid back surface 118 from above, and the bent portion 111 of the first step 108 abuts on the lid tip protrusion 32 from above, and the lid 25 can be closed to be a half-open state.

As described above, the second position is the position where the lid opening and closing cam member 36 is moved downward from the first position and the lid opening and closing cam member bottom portion 98 is in contact with the upper surface 107 of the reagent container 3. Even if the Z-slide frame 41 is raised from this state, the lid opening and closing cam member 36 can be raised to the first position while the lid 25 is in the half-open state without bringing the lid opening and closing cam member 36 and the lid 25 into contact with each other.

As described above, the lid 25 can be opened from the fully closed state or a half-open state to a fully open state by moving the lid opening and closing cam member 36 downward from the first position to the second position and moving the lid opening and closing cam member 36 from the second position to the third position in the negative X-axis direction.

Further, the lid 25 can be changed from the fully open state to the half-open state by moving the lid opening and closing cam member 36 from the third position to the second position in the positive X-axis direction. After that, the lid opening and closing cam member 36 can be returned to the first position by moving it upward from the second position.

As described above, since the lid opening and closing cam member 36 integrally has the lid opening cam portion 36*a* and the lid closing cam portion 36*b*, a plurality of lids 25 can be opened simply by moving the lid opening and closing cam member 36 from the second position to the third position in the negative X-axis direction. The plurality of lids 25 can be closed simply by moving the lid opening and closing cam member 36 from the third position to the second position in the positive X-axis direction. As a result, it is possible to provide an automatic analysis device that is simple in configuration and highly reliable.

After setting the unused reagent container 3 (the lid 25 is in the fully closed state) on the reagent disk 2, the lid 25 that has been opened and closed once is in the half-open state, so the opening force required for the second and subsequent opening operations will be small.

Figure 29:
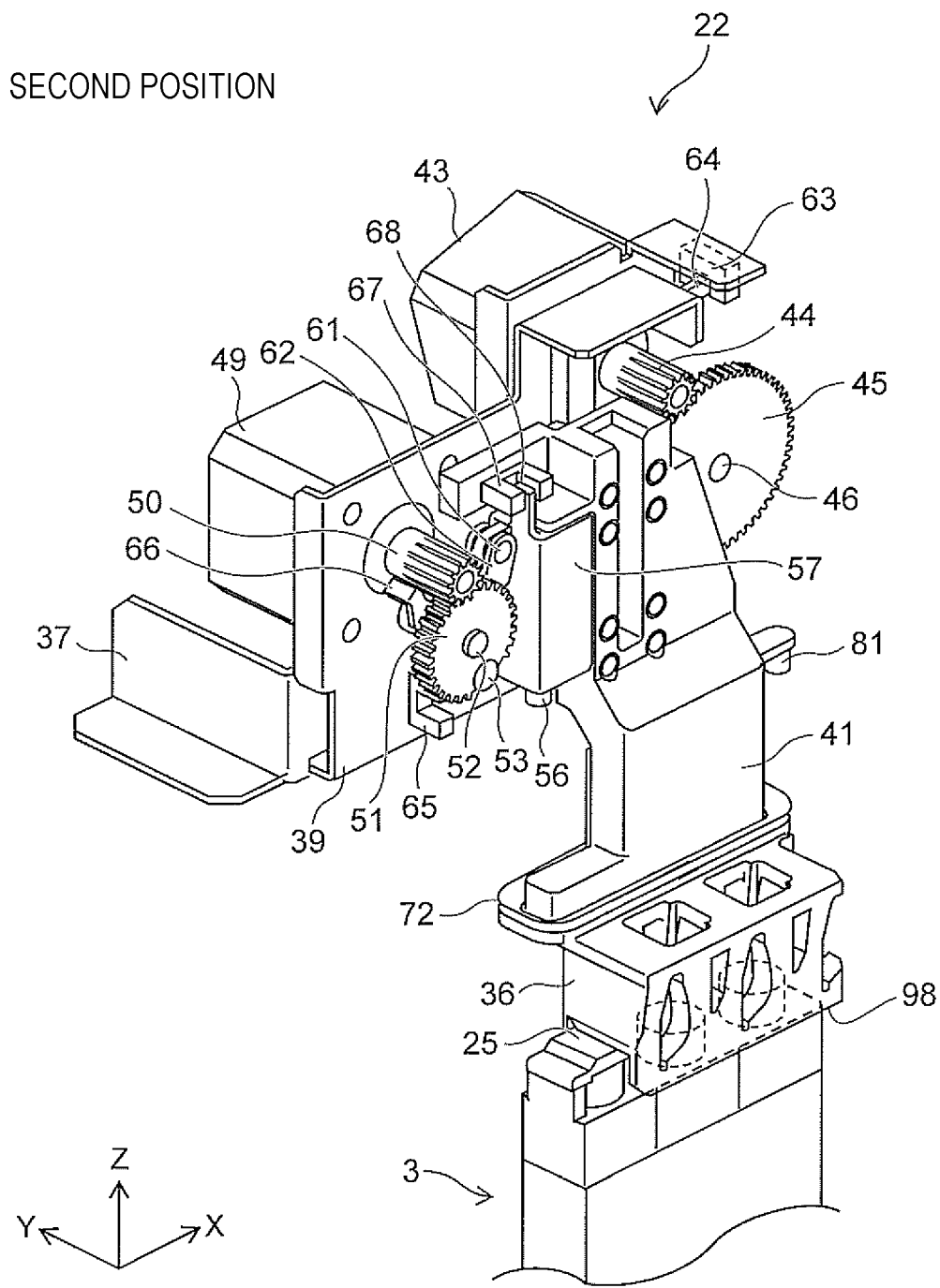
FIG. 29 is a perspective view illustrating the lid opening and closing device in which the lid opening and closing cam member is positioned at the second position.
Figure 30:
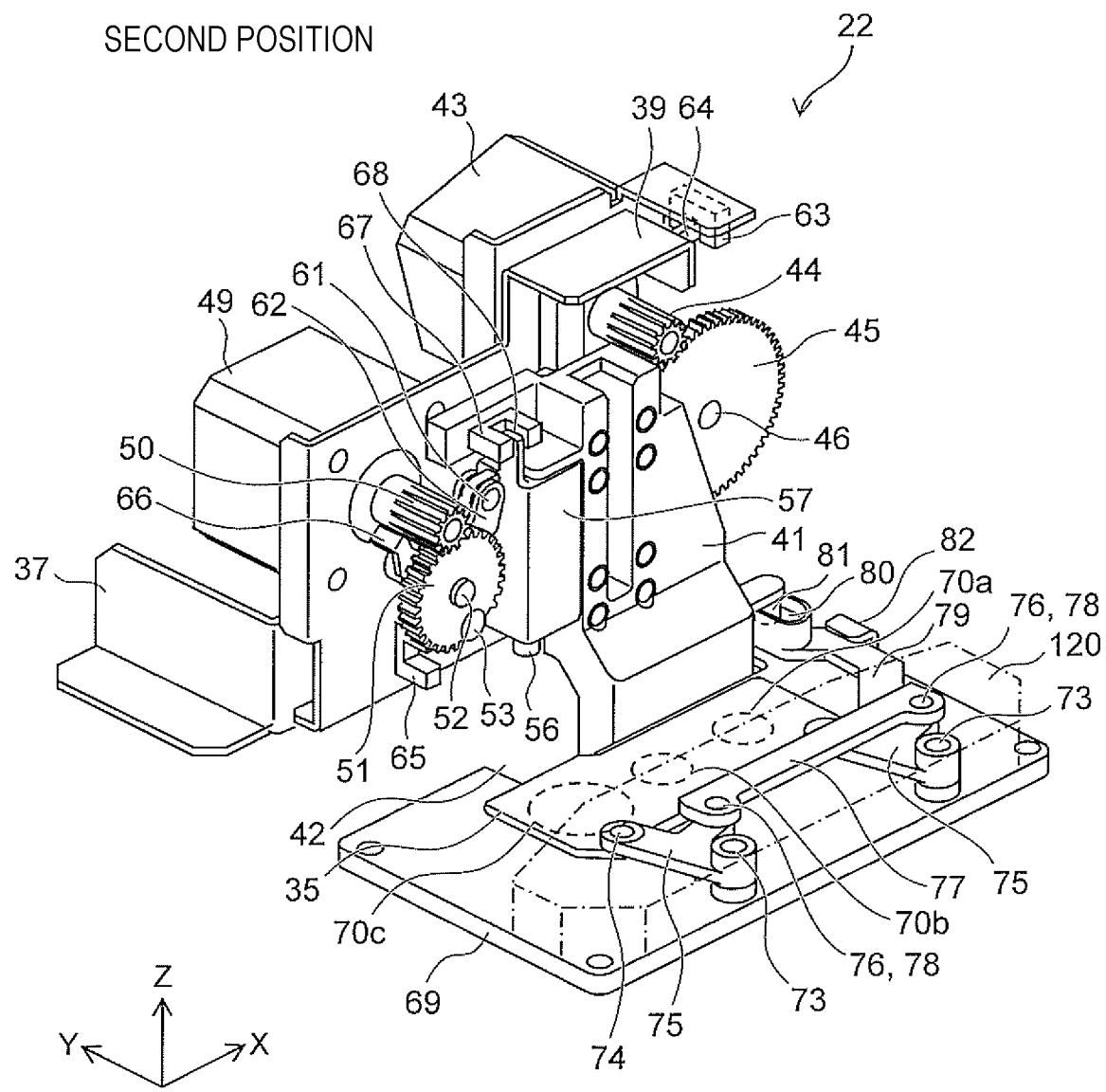
FIG. 30 is a perspective view illustrating the lid opening and closing device in which the lid opening and closing cam member is positioned at the second position.
Figure 31:
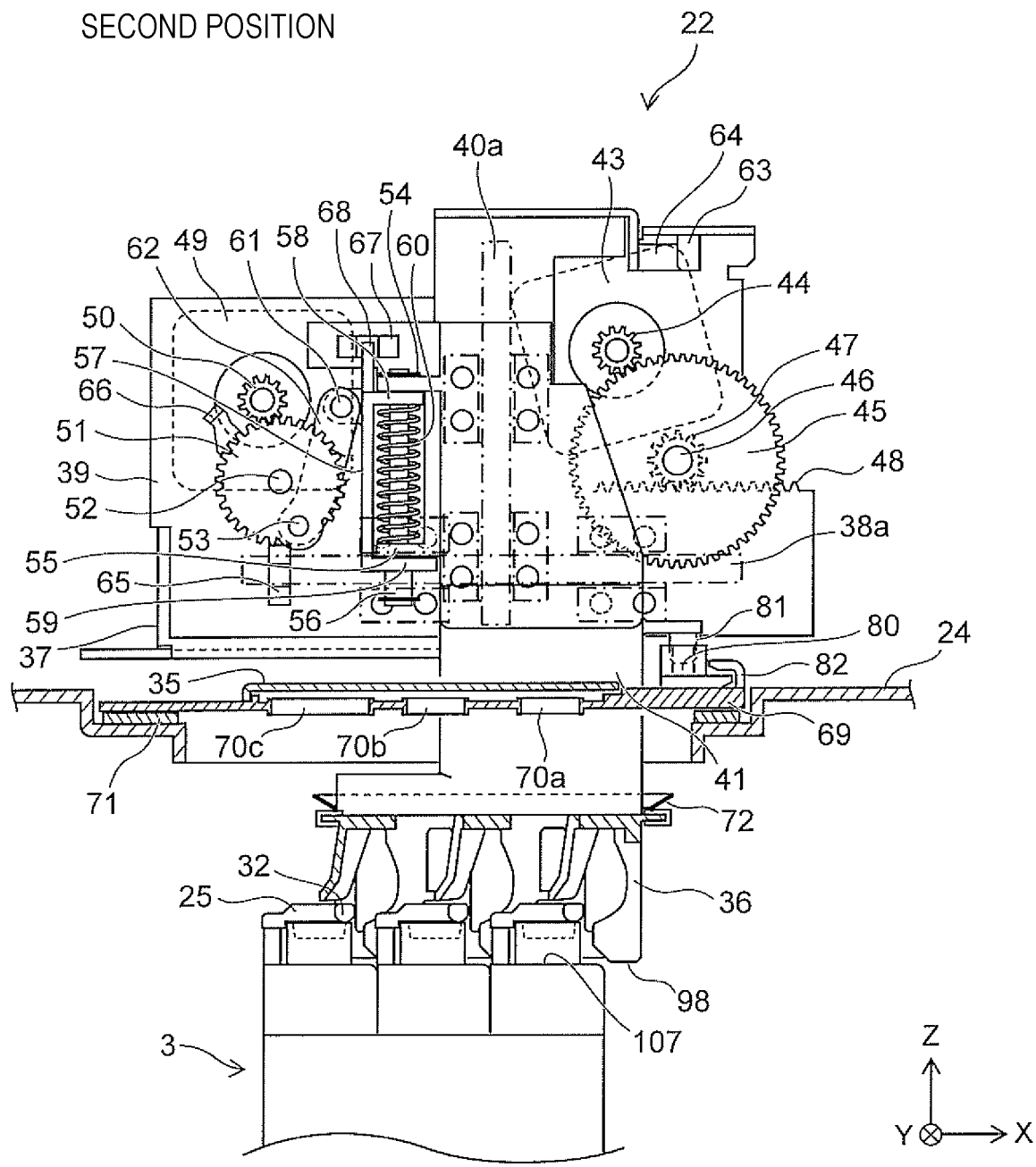
FIG. 31 is a front view illustrating the lid opening and closing device in which the lid opening and closing cam member is positioned at the second position.

Next, a series of operations of the lid opening and closing device 22 in the operation of opening and closing the lid 25 will be described with reference to FIGS. 29 to 37. FIGS. 29 and 30 are perspective views showing the lid opening and closing device 22. FIG. 29 is a diagram in which the reagent cooling box 24 and the dispensing hole cover 69 are omitted, and FIG. 30 is a diagram showing the dispensing hole cover 69, while omitting the configuration below the dispensing hole cover 69. FIG. 31 is a front view showing the lid opening and closing device 22.

FIGS. 29 to 31 show a state in which the lid opening and closing cam member 36 is at the second position. When the lid opening and closing cam member 36 is at the first position, all the detecting units 63, 65, and 67 are in a light-shielding state (OFF). By driving the Z-motor 49 by a predetermined number of steps from the state where the lid opening and closing cam member 36 is at the first position, the lid opening and closing cam member 36 can be lowered to the second position. At this time, the shutter interlocking pin 81 descends together with the Z-slide frame 41 and fits into the shutter interlocking pin receiving portion 80. The slide shutter 35 covers the dispensing holes 70*a* to 70*c*, and the airtight seal 72 descends together with the Z-slide frame 41. The pillar moving opening 42 is open so that the low temperature region inside the reagent cooling box 24 and the room temperature region outside the reagent cooling box 24 communicate with each other.

When the lid opening and closing cam member 36 is at the second position, the first detecting unit 63 is in a light-shielding state (OFF), the second detecting unit 65 is in a light-transmitting state (ON), and the third detecting unit 67 is in a light-shielding state (OFF).

Figure 32:
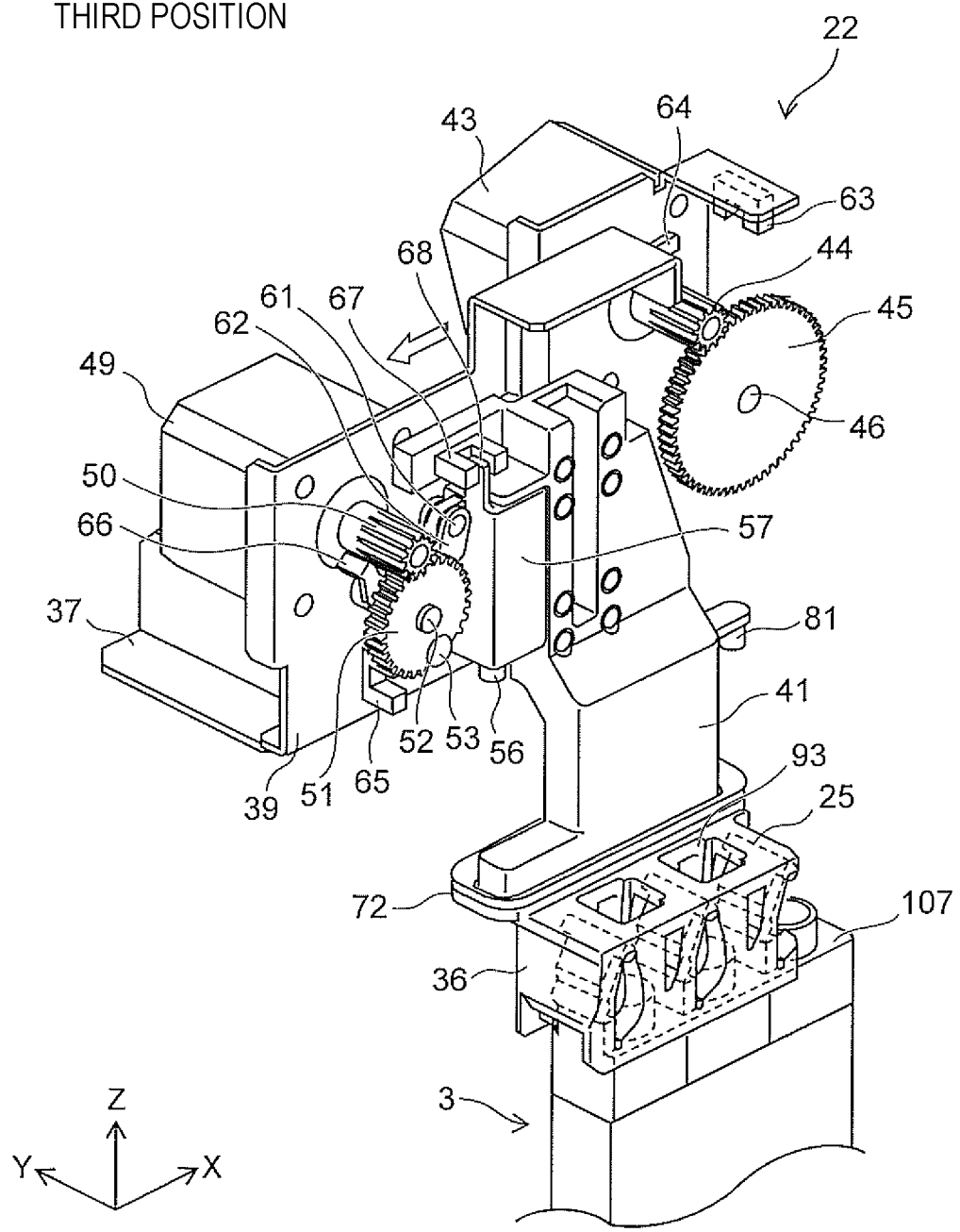
FIG. 32 is a perspective view illustrating the lid opening and closing device in which the lid opening and closing cam member is positioned at the third position.
Figure 33:
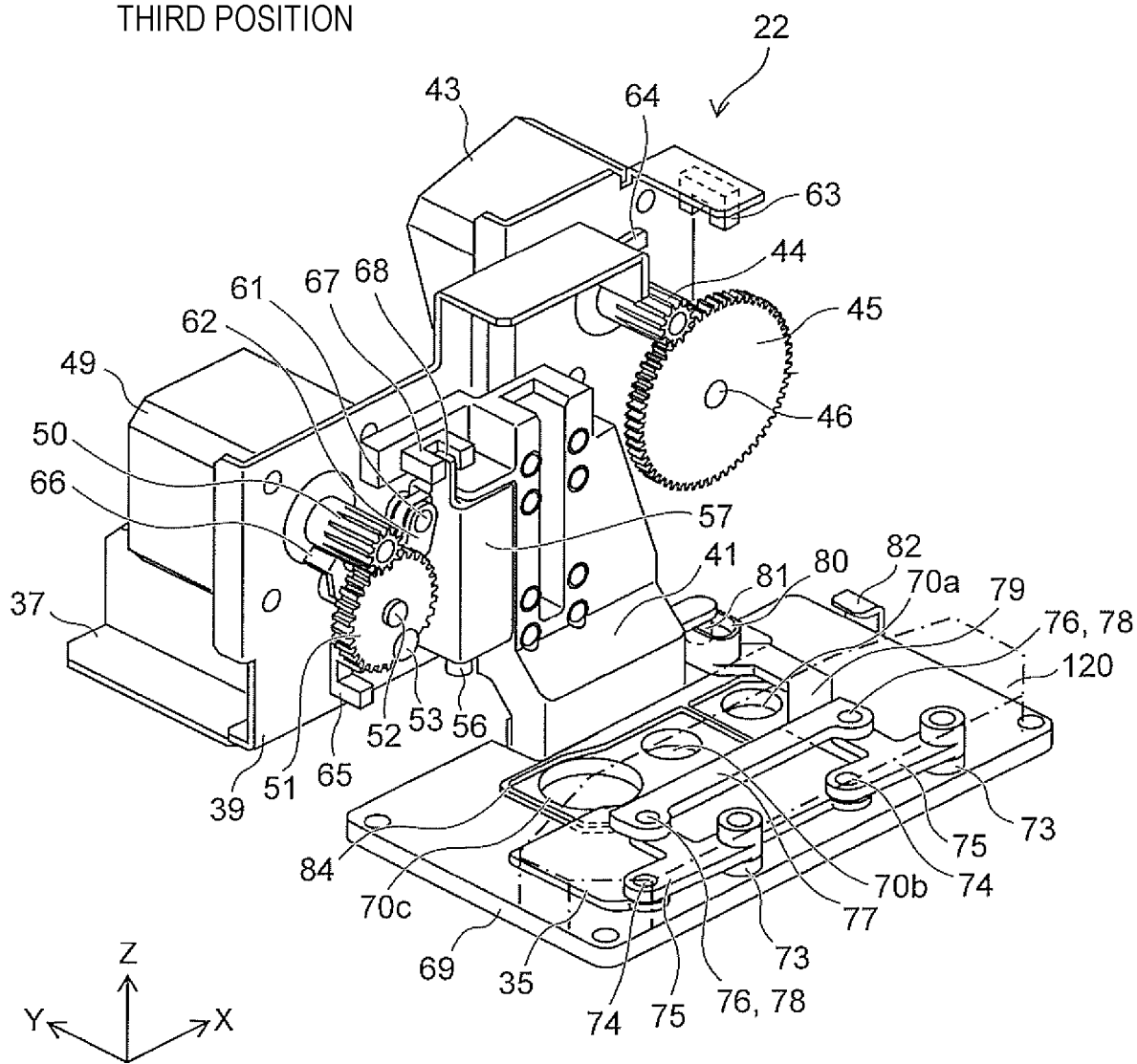
FIG. 33 is a perspective view illustrating the lid opening and closing device in which the lid opening and closing cam member is positioned at the third position.
Figure 34:
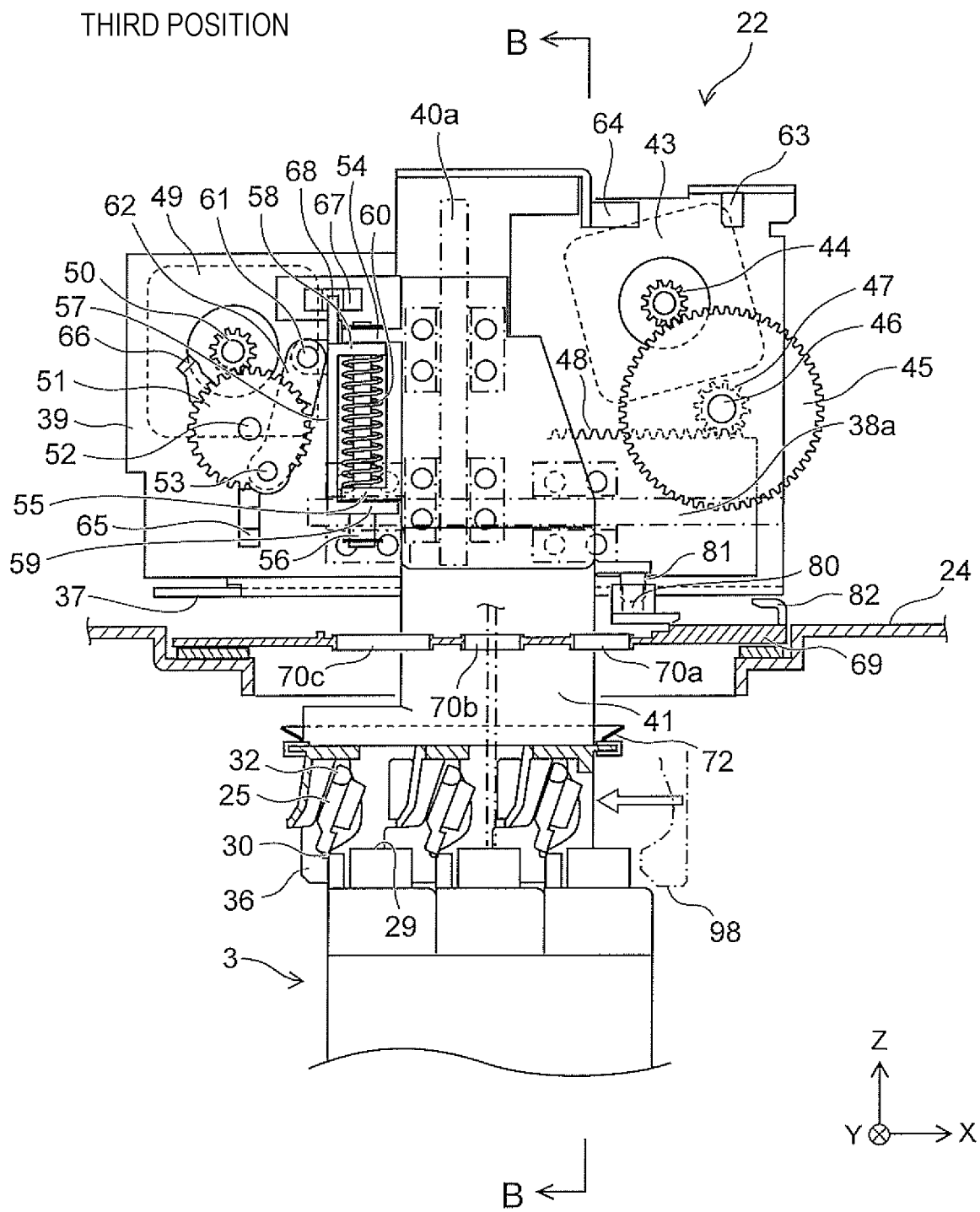
FIG. 34 is a front view illustrating the lid opening and closing device in which the lid opening and closing cam member is positioned at the third position.

FIGS. 32 and 33 are perspective views showing the lid opening and closing device 22. FIG. 32 is a diagram in which the reagent cooling box 24 and the dispensing hole cover 69 are omitted, and FIG. 33 is a diagram showing the dispensing hole cover 69, while omitting the configuration below the dispensing hole cover 69. FIG. 34 is a front view showing the lid opening and closing device 22.

FIGS. 32 to 34 show a state in which the lid opening and closing cam member 36 is at the third position. The lid opening and closing cam member 36 can be moved to the third position by driving the X-motor 43 by a predetermined number of steps from the state where the lid opening and closing cam member 36 is at the second position. The slide shutter 35 moves in conjunction with the X-slide frame 39 because the shutter interlocking pin 81 is fitted to the shutter interlocking pin receiving portion 80, whereby the dispensing holes 70a to 70c are opened. At this time, the lid 25 is in the fully open state.

When the lid opening and closing cam member 36 is at the third position, the first detecting unit 63 is in the light-transmitting state (ON), the second detecting unit 65 is in the light-transmitting state (ON), and the third detecting unit 67 is in the light-shielding state (OFF).

Figure 35:
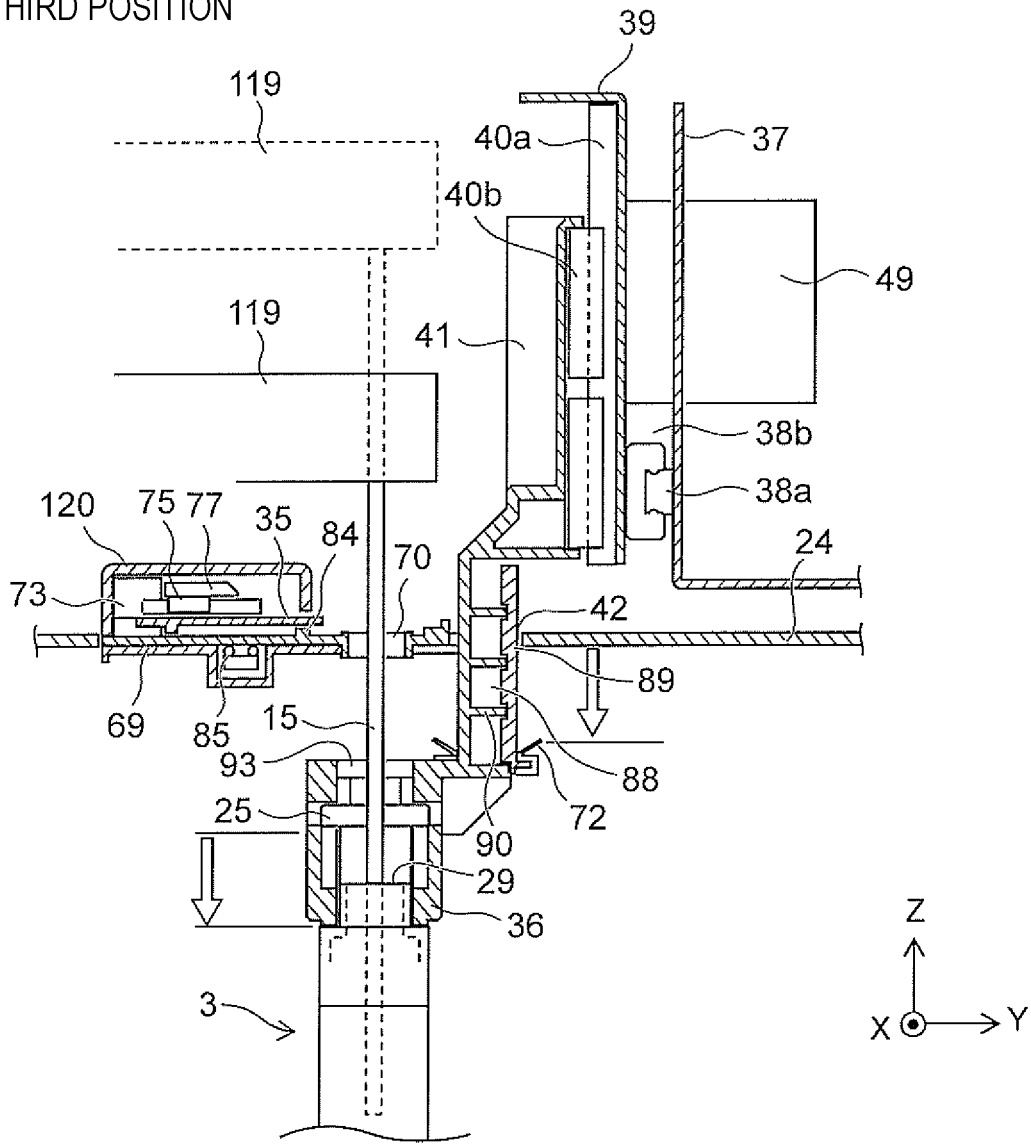
FIG. 35 is a B-B cross-sectional view of FIG. 34 in which the lid opening and closing cam member is positioned at the third position.

FIG. 35 is a cross-sectional view taken along line B-B of FIG. 34, showing a state in which the reagent dispensing probe 15 is inserted inside the container 28. As shown in FIG. 35, the dispensing holes 70a to 70c provided in the dispensing hole cover 69, the upper surface opening 93 provided in the lid opening and closing cam member 36, and the opening portion 29 of the container 28 are at the same position in the X-axis direction. As a result, a reagent dispensing arm 119 can be lowered, and the reagent dispensing probe 15 extended downward from the reagent dispensing arm 119 can be inserted into the container 28 to dispense the reagent solution 27.

At this time, the slide shutter 35 moves from above the dispensing holes 70a to 70c due to the action of the connecting link 77 and is housed inside the link portion cover 120, so that the slide shutter 35 does not hinder the lowering of the reagent dispensing probe 15.

Figure 36:
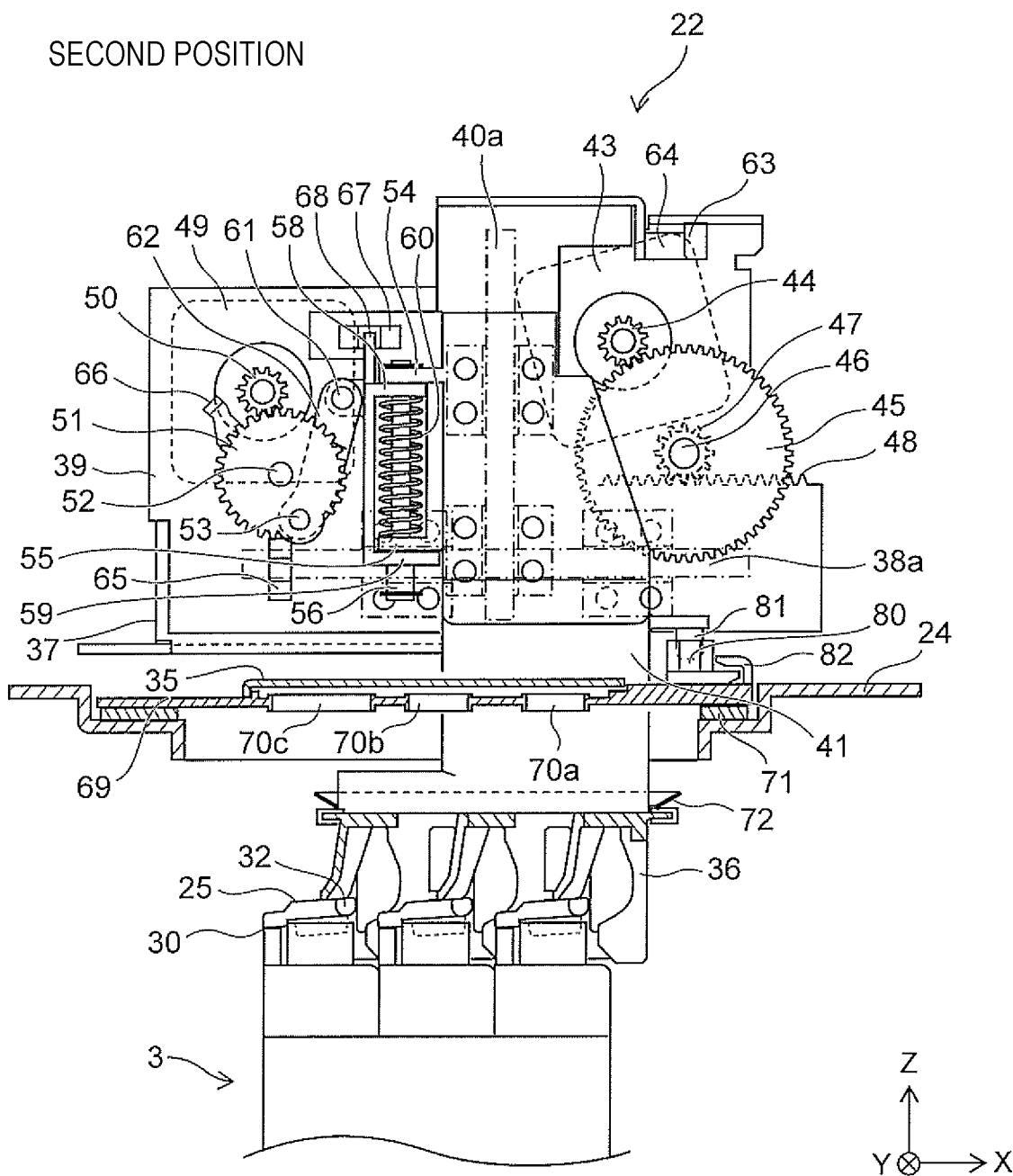
FIG. 36 is a front view illustrating the lid opening and closing device in which the lid opening and closing cam member is positioned at the second position.

FIG. 36 is a front view showing the lid opening and closing device 22, showing a state in which the lid opening and closing cam member 36 is at the second position. By moving the lid opening and closing cam member 36 from the state in which the lid opening and closing cam member 36 is at the third position to the second position, the lid 25 is at the half-open state. In order to prevent evaporation of the reagent solution 27, it is desirable that the lid 25 be further pressed from above and the sealing portion 31 is pushed against the opening portion 29 in the half-open state to bring the opening portion 29 into a fully closed state.

Figure 37:
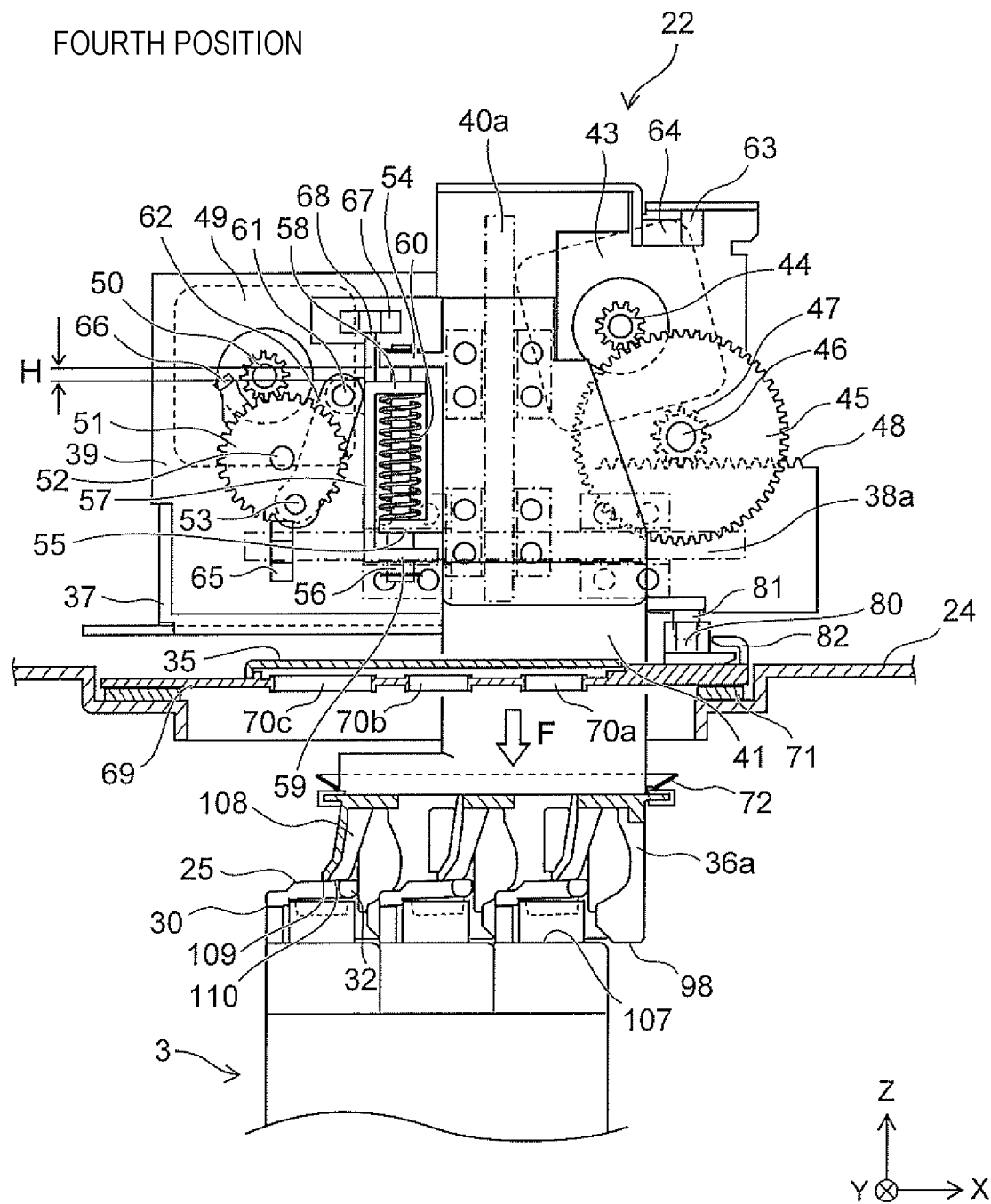
FIG. 37 is a front view illustrating the lid opening and closing device in which the lid opening and closing cam member is positioned at the second position and a force is applied in a direction in which the lid is closed.

FIG. 37 is a front view of the lid opening and closing device 22, showing a state in which the Z-motor 49 is further driven in the descending direction from the state in which the lid opening and closing cam member 36 is at the second position. The crank gear 51 further rotates clockwise together with the crank pin 53 to lower the connecting rod 62, and pushes the slider 57 down by the pushing amount H together with the slider pin 61.

Since the lower end portion of the slider spring 60 abuts on the second protrusion portion 55 of the Z-slide frame 41 and the upper end portion of the slider spring 60 abuts on the first slider protrusion portion 58 of the slider 57, the slider spring 60 is compressed by a pushing amount of H, and a spring reaction force F increases.

The spring reaction force F is applied downward to the Z-slide frame 41 via the second protrusion portion 55, and presses the lid 25 through the third region 110 (lower end portion) of the first step 108. As a result, the lid 25 in the half-open state can be further closed to bring it closer to the fully closed state. In this way, the position of the lid opening and closing cam member 36 further lowered from the second position in the Z-axis direction may be referred to as the "fourth position".

Figure 38:
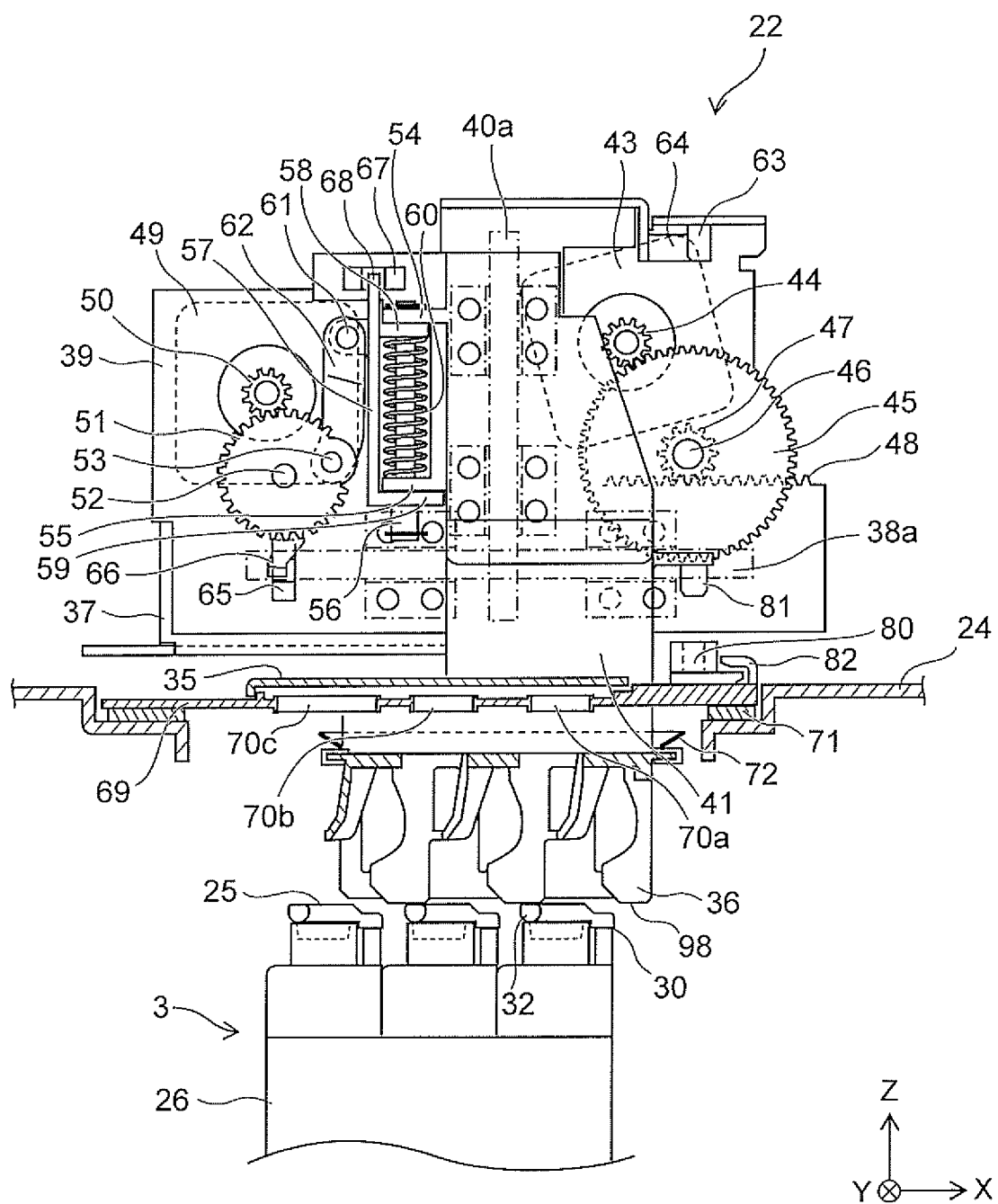
FIG. 38 is a front view illustrating the lid opening and closing device in which the reagent container is reversely set and the lid opening and closing cam member abuts against the lid while being moving downward.
Figure 39:
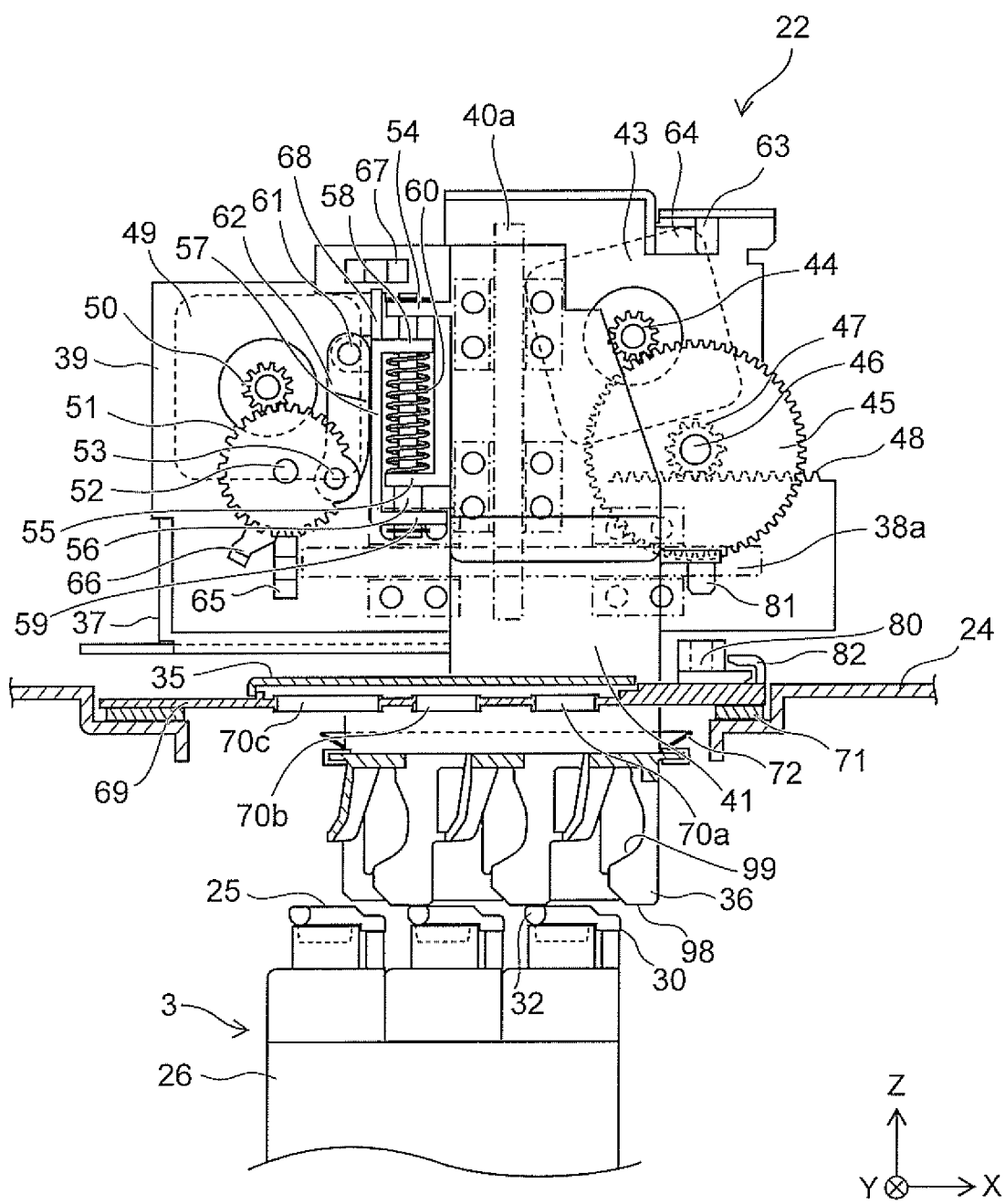
FIG. 39 is a front view illustrating the lid opening and closing device in which the reagent container is reversely set and the lid opening and closing cam member abuts against the lid while being moving downward.

Next, the operation when the reagent container 3 is mistakenly set in the reagent disk 2 in the opposite direction will be described with reference to FIGS. 38 and 39. FIGS. 38 and 39 are front views of the lid opening and closing device 22.

As shown in FIG. 38, when the reagent container 3 is set in the opposite direction, the hinge 30 is arranged on the positive X-axis side of the opening portion 29, and the lid tip protrusion 32 is arranged on the negative X-axis side of the opening portion 29. In this way, when the lid opening and closing cam member 36 is lowered from the first position with the reagent container 3 set in the opposite direction, the lid opening and closing cam member bottom portion 98 comes into contact with the lid tip protrusion 32, and the lid opening and closing cam member 36 is prevented from descending. That is, the Z-slide frame 41 is also prevented from descending.

As shown in FIG. 39, when the Z-motor 49 is further driven in the descending direction from the state of FIG. 38, the crank gear 51 rotates clockwise with the rotation of the Z-motor 49 without the Z-slide frame 41 descending, and the slider 57 descends against the reaction force of the slider spring 60 via the crank pin 53 and the connecting rod 62. That is, the slider 57 descends relative to the Z-slide frame 41.

As described above, since the third detecting unit 67 is provided in the Z-slide frame 41 and the third detecting lever 68 is provided on the slider 57, the third detecting lever 68 descends from the third detecting unit 67 when the slider 57 descends relative to the Z-slide frame 41, and the third detecting unit 67 changes from the light-shielding state (OFF) to the light-transmitting state (ON). In this way, when the third detecting unit 67 changes from the light-shielding state (OFF) to the light-transmitting state (ON) while the lid opening and closing cam member 36 is lowered from the first position to the second position, the host computer 200 can determine that the reagent container 3 is set in the opposite direction. In this case, the host computer 200 displays an abnormality and notifies the operator. After that, the Z-motor 49 is driven in the ascending direction to return the lid opening and closing cam member 36 to the first position.

In this way, the third detecting unit 67 can detect that the reagent container 3 is set in the opposite direction, so that a highly reliable automatic analysis device can be provided.

Next, the operation when the reagent container 3 is not set will be described with reference to FIG. 40. As described above, with the reagent container 3 correctly set, the Z-motor 49 is driven in the descending direction by a predetermined amount to lower the lid opening and closing cam member 36 from the first position to the second position. When the lid opening and closing cam member 36 is further lowered to the fourth position, the lid opening and closing cam member 36 does not lower, but the slider 57 lowers against the reaction force of the slider spring 60, and the third detecting unit 67 changes from the light-shielding state (OFF) to the light-transmitting state (ON).

Figure 40:
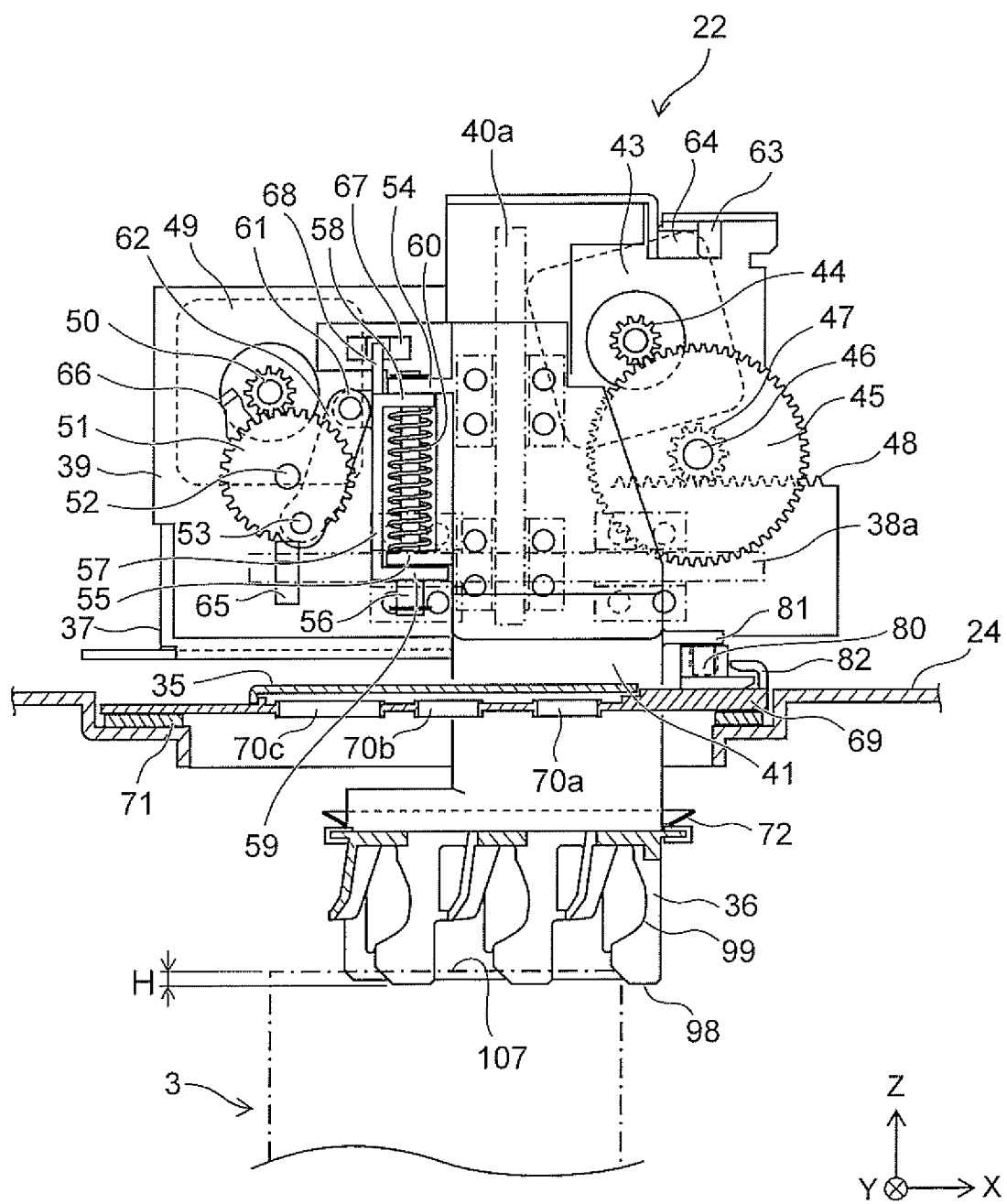
FIG. 40 is a front view illustrating the lid opening and closing device in which the reagent container is not set and the lid opening and closing cam member is positioned at a fourth position.

On the other hand, when the reagent container 3 is not set, as shown in FIG. 40, when the Z-motor 49 is further driven in the descending direction from the state where the lid opening and closing cam member 36 is at the second position, the lid opening and closing cam member 36 is further lowered by the pushing amount H to the fourth position together with the slider 57. Therefore, the third detecting unit 67 remains in the light-shielding state (OFF).

If the third detecting unit 67 remains in the light-shielding state (OFF) when the Z-motor 49 is further driven in the descending direction from the state where the lid opening and closing cam member 36 is at the second position, the host computer 200 determines if it is determined that the reagent container 3 is not set. If the light-shielding state (OFF) changes to the light-transmitting state (ON), it is determined that the reagent container 3 is set correctly.

As described above, since the presence/absence of the reagent container 3 can be determined by the third detecting unit 67, a highly reliable automatic analysis device can be provided.

Figure 41:
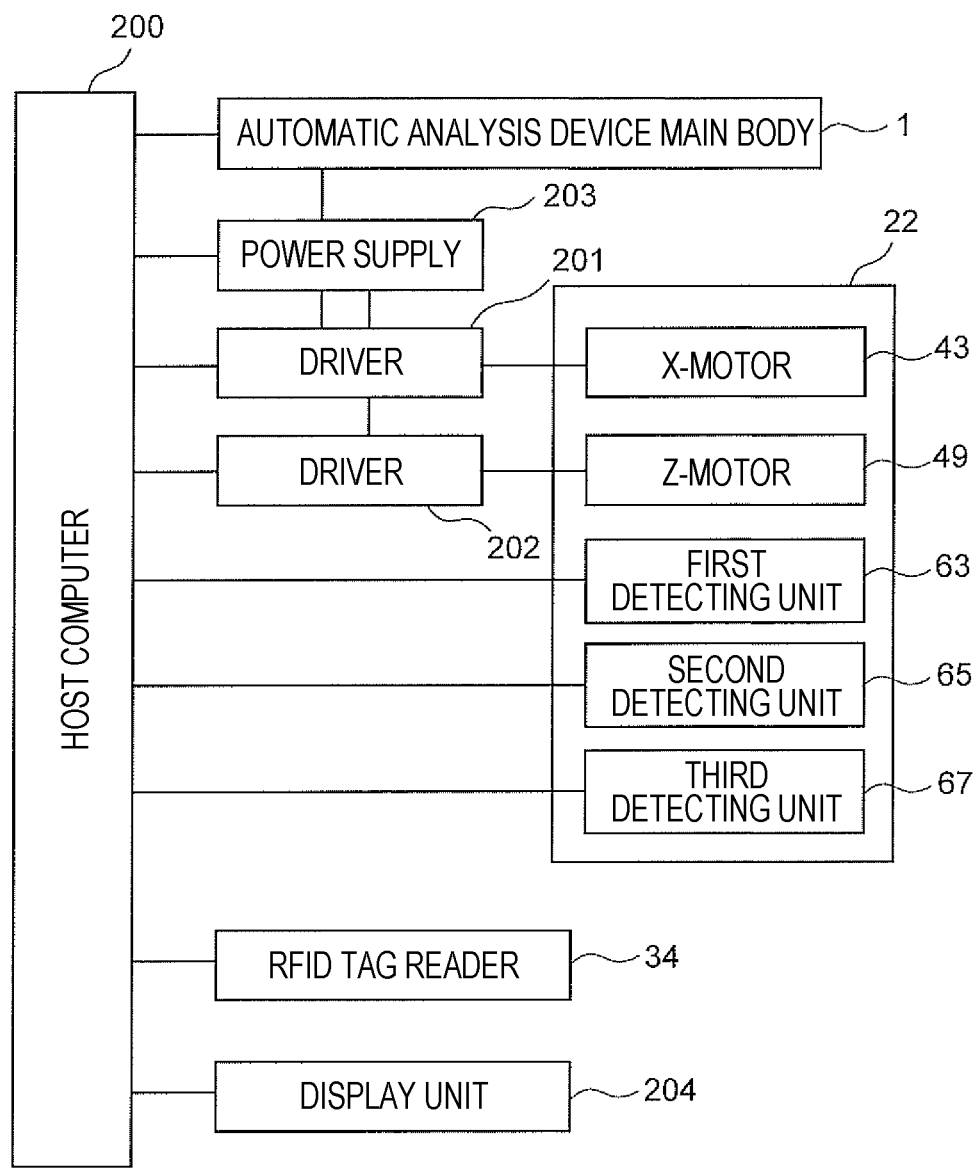
FIG. 41 is a block diagram illustrating the configuration of the automatic analysis device according to the first embodiment.

A hardware configuration for controlling the lid opening and closing device 22 will be described with reference to FIG. 41. FIG. 41 is a block diagram showing the configuration of the automatic analysis device 1. As shown in FIG. 41, the automatic analysis device 1 includes drivers 201 and 202, a power supply 203, a display unit 204, the lid opening and closing device 22, and the RFID tag reader 34, which of these components are connected to a host computer 200.

The driver 201 drives the X-motor 43, and the driver 202 drives the Z-motor 49.

The power supply 203 supplies power to the automatic analysis device 1, the host computer 200, and the drivers 201 and 202.

The host computer 200 controls the operation of the entire automatic analysis device 1 according to a program. Power is supplied from the power supply 203 to the drivers 201 and 202, and the host computer 200 transmits a drive signal to the drivers 201 and 202, whereby the X-motor 43 and the Z-motor 49 are rotationally driven.

The first detecting unit 63, the second detecting unit 65, and the third detecting unit 67 provided in the lid opening and closing device 22 are connected to the host computer 200 and are in the light-transmitting state (ON) and the light-shielding state (OFF), respectively, which is transmitted to the host computer 200.

The RFID tag reader 34 reads the information of the RFID tag 33 provided in the reagent container 3 and transmits it to the host computer 200. The host computer 200 stores, for example, the information of the RFID tag 33 read by the RFID tag reader 34 in a storage unit.

The display unit 204 displays the operating state of the automatic analysis device 1 and an alarm when an abnormality is detected.

Figure 42:
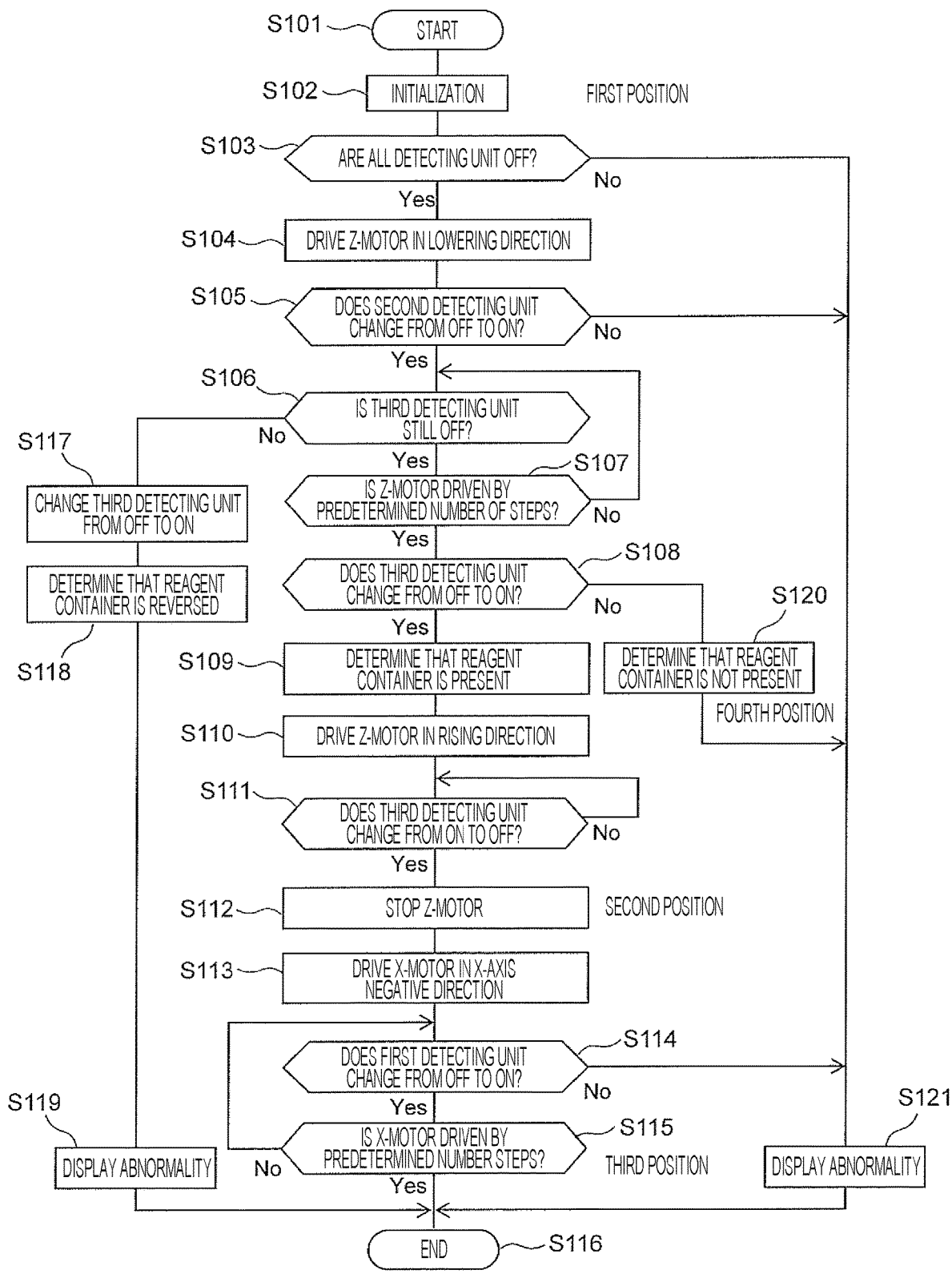
FIG. 42 is a flowchart illustrating an operation of opening the lid using the lid opening and closing device.

Next, the operation process of the lid opening and closing device 22 by the host computer 200 will be described with reference to FIGS. 42 and 43. FIG. 42 is a flowchart showing the operation of opening the lid 25.

In Step S101, the operator turns on the power from the power supply 203 to start the automatic analysis device 1.

In Step S102, the host computer 200 confirms and initializes the state of the automatic analysis device 1. At this time, the host computer 200 transmits a drive signal to the drivers 201 and 202, drives the X-motor 43 and the Z-motor 49, moves the X-slide frame 39 to the X origin position, and moves the Z-slide frame 41 to the Z origin position. As a result, the lid opening and closing cam member 36 is located at the first position.

In Step S103, the host computer 200 confirms the states of the detecting units 63, 65, and 67. When all the detecting unit are OFF (Yes), the host computer 200 determines that the lid opening and closing cam member 36 is at the first position, and the process proceeds to Step S104.

In Step S104, the host computer 200 transmits a drive signal to the driver 202, and drives the Z-motor 49 in the descending direction to lower the Z-slide frame 41.

In Step S105, the host computer 200 determines whether the second detecting unit 65 has changed from OFF to ON, and confirms that the Z-slide frame 41 has been lowered.

When the second detecting unit 65 has changed from OFF to ON (Yes), the process proceeds to Step S106.

In Step S106, the host computer 200 confirms whether the third detecting unit 67 keeps OFF. If the third detecting unit 67 remains OFF (Yes), the process proceeds to Step S107.

In Step S107, the host computer 200 confirms that the Z-motor 49 has been driven in the descending direction by a predetermined number of steps until the lid opening and closing cam member 36 is at the fourth position. When the Z-motor 49 is driven in the descending direction by a predetermined number of steps (Yes), the process proceeds to Step S108.

In Step S108, the host computer 200 determines whether the third detecting unit 67 has changed from OFF to ON. When the third detecting unit 67 has changed from OFF to ON (Yes), the process proceeds to Step S109.

In Step S109, the host computer 200 confirms that the reagent container 3 is set based on the result of Step S108.

In Step S110, the host computer 200 transmits a drive signal to the driver 202, and drives the Z-motor 49 in the ascending direction by a predetermined number of steps.

In Step S111, the host computer 200 determines whether the third detecting unit 67 has changed from ON to OFF. When the third detecting unit 67 changes from ON to OFF (Yes), the process proceeds to Step S112.

In Step S112, the host computer 200 transmits a drive signal to the driver 202 to stop the Z-motor 49. At this time, the lid opening and closing cam member 36 is at the second position.

In Step S113, the host computer 200 transmits a drive signal to the driver 201, drives the X-motor 43 in the negative X-axis direction by a predetermined number of steps, and drives the X-slide frame 39 in the negative X-axis direction.

In Step S114, the host computer 200 determines whether the first detecting unit 63 has changed from OFF to ON, and confirms that the X-slide frame 39 has moved in the negative X-axis direction. When the first detecting unit 63 has changed from OFF to ON (Yes), the process proceeds to Step S115.

In Step S115, the host computer 200 determines whether the X-motor 43 has been driven by a predetermined number of steps. When the X-motor 43 has been driven by a predetermined number of steps (Yes), the process proceeds to Step S116. At this time, the lid opening and closing cam member 36 is at the third position, and the lid 25 is in the fully open state. The slide shutter 35 is at the fully open position, the dispensing holes 70a to 70c are opened, and the reagent dispensing probe 15 can be lowered into the container 28.

In Step S116, the opening of the lid 25 is completed, and the operation of opening the lid 25 is completed. Subsequently, the reagent dispensing probe 15 can be lowered into the container 28 to dispense the reagent.

If No in Step S106, the process proceeds to Step S117, and the third detecting unit 67 detects a change from OFF to ON before the Z-motor 49 is driven in the descending direction by a predetermined number of steps.

In Step S118, the host computer 200 determines that the reagent container 3 has been set in the opposite direction. The host computer 200 does not register the reagent container 3 set in the reverse direction in the system.

In Step S119, the host computer 200 displays on the display unit 204 that the reagent container 3 has been set in the opposite direction, and notifies the operator.

If it is determined in Step S108 that the third detecting unit 67 remains OFF (No), the process proceeds to Step S120, and the host computer 200 determines that the lid opening and closing cam member 36 is at the fourth position and the reagent container 3 is not set.

In Step S121, the host computer 200 displays on the display unit 204 that the reagent container 3 is not set, and notifies the operator.

Although the X-motor 43 is driven in the negative X-axis direction by a predetermined number of steps in Step S114, the process proceeds to Step S121, and the host computer 200 displays an abnormality on the display unit 204 and notifies the operator even if it is determined that the first detecting unit 63 remains OFF and the X-slide frame 39 is not moving in the negative X-axis direction (No).

Figure 43:
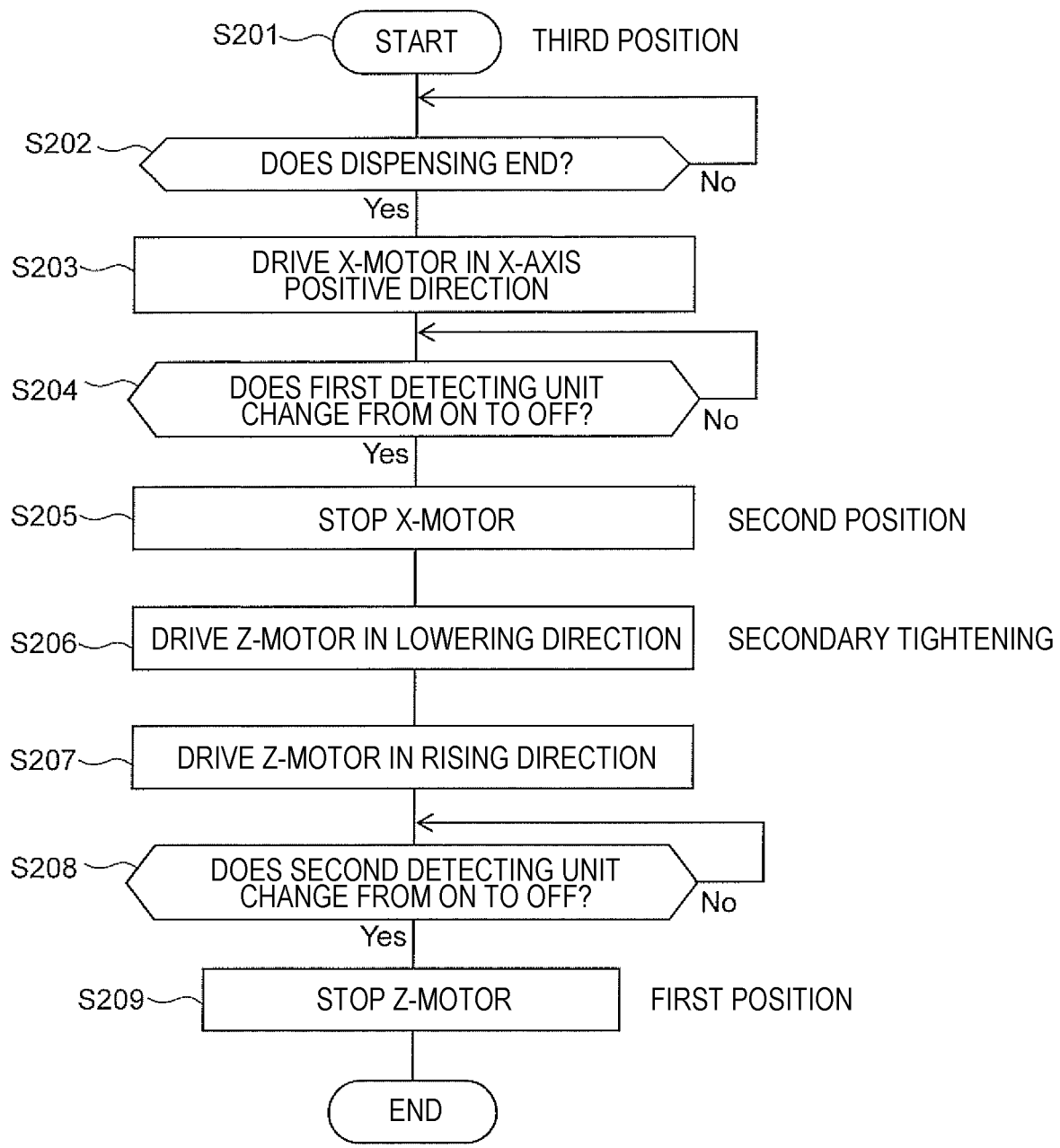
FIG. 43 is a flowchart illustrating an operation of closing the lid using the lid opening and closing device.

FIG. 43 is a flowchart showing the operation of closing the lid 25. In Step S201, the operation of closing the lid 25 is started. At this time, the lid opening and closing cam member 36 is at the third position, and the lid 25 is in the fully open state.

In Step S202, the host computer 200 determines whether the dispensing by the reagent dispensing probe 15 is completed. If the dispensing is completed (Yes), the process proceeds to Step S203.

In Step S203, the host computer 200 transmits a drive signal to the driver 201, drives the X-motor 43 in the positive X-axis direction by a predetermined number of steps, and moves the lid opening and closing cam member 36 in the positive X-axis direction from the third position.

In Step S204, the host computer 200 determines whether the first detecting unit 63 has changed from ON to OFF. When the first detecting unit 63 has changed from ON to OFF (Yes), it can be confirmed that the lid opening and closing cam member 36 is at the second position, so the process proceeds to Step S205. At this time, the lid 25 is in a half-open state.

In Step S205, the host computer 200 transmits a drive signal to the driver 201 to stop the X-motor 43.

In Step S206, the host computer 200 transmits a drive signal to the driver 202, drives the Z-motor 49 in the descending direction, lowers the slider 57 to increase the pushing force of the slider spring 60, and sets the lid 25 to be the fully closed state from the half-open state.

In Step S207, the host computer 200 transmits a drive signal to the driver 202, drives the Z-motor 49 in the ascending direction by a predetermined number of steps, and moves the lid opening and closing cam member 36 upward.

In Step S208, the host computer 200 determines whether the second detecting unit 65 has changed from ON to OFF. When the second detecting unit 65 changes from ON to OFF (Yes), it can be confirmed that the lid opening and closing cam member 36 is at the first position, so the process proceeds to Step S209.

In Step S209, the host computer 200 transmits a drive signal to the driver 202, stops the Z-motor 49, and ends the operation of closing the lid 25.

As described above, in the automatic analysis device 1 according to this embodiment, the lid opening and closing cam member 36 includes the lid opening cam portion 36a and the lid closing cam portion 36b integrally, and is configured to open the lid by the lid opening cam portion 36a when the lid opening and closing cam member 36 moves from the second position to the third position, and to close the lid 25 by the lid closing cam portion 36b when moving from the third position to the second position. As described above, since the lid 25 can be opened and closed only by moving one lid opening and closing cam member 36, the automatic analysis device 1 according to this embodiment can be made by a simple structure and can be miniaturized.

[Modifications]

Further, the disclosure is not limited to the above embodiments, but various modifications may be contained. For example, the above-described embodiments of the disclosure have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

For example, in the above embodiment, three containers 28 are arranged in series in the reagent container 3, but the number of containers 28 in the reagent container 3 is not limited to three, and it may be only one, or may be four or more.

Only a pair of the lid opening cam portion 36a and the lid closing cam portion 36b may be provided on the lid opening and closing cam member 36, and a plurality of containers 28 may be arranged in the reagent container 3. In this case, only one of the plurality of lids 25 may be selected to perform the opening and closing operation, and the lids 25 of the other containers 28 may be sequentially opened/closed.

In the above embodiment, the plurality of lid opening cam curved surfaces 99 provided on the lid opening and closing cam member 36 act on the plurality of lids 25 at the same time to simultaneously perform the operation of opening the lid 25. However, the present invention is not limited to such a configuration. For example, the pitch of the lid opening cam curved surface 99 may be different from the pitch p of the container 28, and the lid opening cam curved surface 99 may perform the opening operation one by one with respect to the lid 25 at different timings. With such a configuration, the maximum value of the opening force when opening the lid 25 can be reduced as compared with the case where three lids 25 are opened at the same time.

Further, the pitch of the lid closing cam portion 36b may be different from the pitch p of the container 28, and the lid closing cam portion 36b may sequentially close the lid 25 one by one at different timings.

In the above embodiment, the X-motor 43 and the Z-motor 49, which are stepping motors, are decelerated by using gears for the movement of the X-slide frame 39 and the movement of the Z-slide frame 41. However, the invention is not limited to such a configuration. For example, a driving force transmitting unit such as a timing belt may be used instead of the gear or in addition to the gear. Further, as the X-motor 43 and the Z-motor 49, a servomotor, or a linear motor or a hydraulic cylinder that performs linear operation may be used.

In the above embodiment, the reagent container 3 does not move when the lid 25 is opened or closed, and the lid opening and closing cam member 36 is moved in the Z-axis direction and the X-axis direction, but the invention is not limited to such a configuration. The lid opening and closing cam member 36 may be fixed and the reagent container 3 may be moved in the Z-axis direction and the X-axis direction to open/close the lid 25.

In the above embodiment, when the lid 25 is closed, the lid opening and closing cam member 36 is moved from the third position to the second position to set the lid 25 in the half-open state, and then the Z-motor 49 is further driven in the descending direction to the fourth position to add the lid 25 with the reaction generated by compressing the slider spring 60 so as to increase the closing force. However, the invention is not limited to such an operation, and the Z-motor 49 may be moved in the ascending direction to return to the first position without further lowering the lid opening and closing cam member 36 from the second position. In this case, Step S206 is omitted from the flowchart of the closing operation shown in FIG. 43.

In the above embodiment, it is configured to perform a step of determining whether the reagent container 3 is set by moving the lid opening and closing cam member 36 from the first position to the second position in order to open the lid 25, and then further lowering it to the fourth position. However, the invention is not limited to such an operation. For example, the step of determining whether the reagent container 3 is set may be omitted, and the lid opening and closing cam member 36 may be moved from the first position to the second position and then moved to the third position.

In this case, in the flowchart of the opening operation shown in FIG. 42, the predetermined number of steps set in Step S107 is the number of steps in which the lid opening and closing cam member 36 moves from the first position to the second position, and S108 to S111 and S120 are omitted.

REFERENCE SIGNS LIST 1 automatic analysis device
2 reagent disk
3 reagent container
4 safety cover
5 sample transport unit
6 sample dispensing unit
7 chip rack
8 transport unit
9 incubator
10 sample dispensing chip
11 sample dispensing chip buffer
12 waste hole
13 stirring unit
14 reaction container
15 reagent dispensing probe
15a reagent dispensing position
16 stirring unit
17 cleaning unit
18 reaction solution dispensing probe
19 detecting portion
20 reagent container loading port
21 housing
22 lid opening and closing device
23 waste box
24 reagent cooling box (reagent storage chamber)
25 lid
26 reagent container case
27 reagent solution
28 container
29 opening portion
30 hinge
31 sealing portion
32 lid tip protrusion
33 RFID tag
34 RFID tag reader
35 slide shutter
36 lid opening and closing cam member (lid opening and closing member)
36a lid opening cam portion (first member)
36b lid closing cam portion (second member)
37 fixed frame
38 X-rail
38a fixed rail
38b slide portion
39 X-slide frame
40 Z-rail
40a fixed rail
40b slide portion
41 Z-slide frame
42 pillar moving opening (opening)
43 X-motor
44 motor pinion
45 idler gear
46 idler support shaft
47 X-pinion
48 rack
49 Z-motor
50 motor pinion
51 crank gear
52 crank gear support shaft
53 crank pin
54 first protrusion portion
55 second protrusion portion
56 slider shaft
57 slider (moving member)
58 first slider protrusion portion
59 second slider protrusion portion
60 slider spring
61 slider pin
62 connecting rod
63 first detecting unit
64 first detecting lever
65 second detecting unit
66 second detecting lever
67 third detecting unit
68 third detecting lever
69 dispensing hole cover
70a to 70c dispensing hole
71 seal
72 airtight seal
73 arm support shaft
74 shutter shaft
75 link arm
76 connecting link shaft
77 connecting link
78 connecting link shaft hole
79 shutter interlocking arm
80 shutter interlocking pin receiving portion
81 shutter interlocking pin
82 arm pressing pawl
83 dispensing hole rib
83a to 83c dispensing hole rib
84 shutter rib
85 heater
86 support portion
87 pillar portion
88 cell
89 pillar back lid
90 rib
91, 92 thread hole
93 upper surface opening
94 corner portion
95 corner portion
96 outer circumferential inner wall
97 inner circumferential outer wall 98 lid opening and closing cam member bottom portion
99 lid opening cam curved surface (curved surface)
100 opening tip portion
101 tip surface
102 upper end point
103 first region (lower end portion of curved surface)
104 second region (upper end portion of curved surface)
105 space
106 opening cam member back surface
107 upper surface
108 first step
109 closing tip portion
110 third region (lower end portion of first step)
111 bent portion
112 fourth region (upper end portion of first step)
113 second step
114 fifth region (lower end portion of second step)
115 bent portion
116 sixth region
117 contact point
118 lid back surface
119 reagent dispensing arm
120 link portion cover
200 host computer
201, 202 driver
203 power supply
204 display unit

The invention claimed is:

1. An automatic analysis device comprising:
a reagent storage chamber that stores a reagent container containing a reagent; and
a lid opening and closing device that includes a lid opening and closing member configured to be movable in a first direction parallel to a vertical direction and to be movable in a second direction perpendicular to the first direction, wherein
the lid opening and closing member includes:
a first member and a second member that are integrated with each other, the first member opening a lid of the reagent container, and the second member closing the lid,
the lid opening and closing member is configured to:
be movable between a first position and a second position, the first position being a position above the reagent container, the second position being a position that is moved down from the first position in the first direction until a bottom surface of the lid opening and closing member comes into contact with the reagent container,
be movable between the second position and a third position being a position that is moved from the second position in the second direction,
in a case where the lid opening and closing member moves from the second position to the third position, the lid is opened by the first member, and
in a case where the lid opening and closing member moves from the third position to the second position, the lid is closed by the second member,
wherein
the lid includes:
a first side that is parallel to a third direction perpendicular to the first direction and the second direction; and
a protrusion portion that is provided on a second side facing the first side and has a longer length than the first side in the second direction,
the protrusion portion is disposed further toward the second side than the first side in the second direction,
the first member has a curved surface that extends in the first direction and is curved in the second direction, and
in a case where the lid opening and closing member moves from the second position to the third position, the protrusion portion sequentially abuts from a lower end portion of the curved surface toward an upper end portion of the curved surface such that the lid is opened.

2. The automatic analysis device according to claim 1, wherein
the second member includes:
a first step that protrudes in the second direction; and
a second step that protrudes in the second direction and has a smaller protrusion amount than the first step, and
in a case where the lid opening and closing member moves from the third position to the second position, the protrusion portion sequentially abuts against an upper end portion of the first step toward a lower end portion of the first step and subsequently an upper end portion of the lid abuts against a lower end portion of the second step such that the lid enters a half-open state.

3. The automatic analysis device according to claim 2, wherein
the lid opening and closing device moves the lid opening and closing member from the third position to the second position such that the lid enters the half-open state, and subsequently moves the lid opening and closing member further downward from the second position such that the upper surface of the lid is pressed by the lower end portion of the first step and the lid is closed further than the half-open state to be closed to a fully-closed state.

4. The automatic analysis device according to claim 1, wherein
the lid opening and closing member is disposed inside the reagent storage chamber.

5. The automatic analysis device according to claim 1, wherein
the lid opening and closing device includes:
a first frame that is movable in the second direction;
a first motor that drives the first frame;
a first transmission unit for transmitting a driving force of the first motor to the first frame;
a second frame that is movable in the first direction,
a second motor that is provided in the first frame and drives the second frame; and
a second transmission unit for transmitting a driving force of the second motor to the second frame, and
the lid opening and closing member is connected to a lower end portion of the second frame so as to be movable in the first direction and the second direction.

6. The automatic analysis device according to claim 5, wherein
the reagent storage chamber further includes an opening through which the second frame passes, and
the lid opening and closing device further includes an airtight seal that blocks the opening.

7. The automatic analysis device according to claim 5, wherein
the second transmission unit includes:
a crankshaft that is provided in the first frame;
a first pin that performs sun-and-planet motion around the crankshaft;
a slider that is provided in the second frame and is movable in the first direction;
a second pin that is provided above the first pin in the slider; and a connecting rod that connects the first pin and the second pin to each other, and in a case where the crankshaft, the first pin, and the second pin are disposed on a substantially straight line, the lid opening and closing member is positioned at the first position.

8. The automatic analysis device according to claim 5, wherein the lid opening and closing device further includes:

a detecting lever that is provided in the first frame; and a detecting unit having a first optical path along which the detecting lever is attachable and detachable, the detecting lever causes the first optical path to enter a light-shielding state when the first frame is moved up to an end in the second direction, and the detecting unit detects a position of the first frame by determining whether or not the first optical path is in the light-shielding state.

9. The automatic analysis device according to claim 5, wherein the lid opening and closing device further includes:

a detecting lever that rotates whenever the second motor is driven; and a detecting unit that is provided in the first frame and has an optical path along which the detecting lever is attachable and detachable, the detecting lever causes the second optical path to enter a light-shielding state when the second frame is moved to an uppermost position in the first direction, and the detecting unit detects a position of the second frame by determining whether or not the second optical path is in the light-shielding state.

10. The automatic analysis device according to claim 5, wherein the lid opening and closing device further includes:

a moving member that is movable in the first direction relative to the second frame;

a detecting lever that is provided in the moving member; and a detecting unit that is provided in the second frame and has an optical path along which the detecting lever is attachable and detachable, in a case where the lid opening and closing member is stopped above the second position by the bottom surface of the lid opening and closing member coming into contact with the lid when the second frame moves downward, the moving member moves downward from the second frame, in a case where the moving member moves downward from the second frame, the detecting lever changes the third optical path from a light-shielding state to a light-transmitting state, and the detecting unit detects whether or not the protrusion portion is disposed further toward the second side than the first side in the second direction based on whether or not the third optical path is still in the light-shielding state when the second frame moves downward.

11. The automatic analysis device according to claim 1, wherein the reagent storage chamber further includes:

a dispensing hole that faces an opening portion of the reagent container; and a dispensing hole opening and closing unit for controlling opening and closing of the dispensing hole, and the dispensing hole opening and closing unit opens the dispensing hole in conjunction with movement of the lid opening and closing member from the second position to the third position and closes the dispensing hole in conjunction with movement of the lid opening and closing member from the third position to the second position.

* * * * *